United States Patent [19]

Chiba et al.

[11] Patent Number: 5,696,593
[45] Date of Patent: Dec. 9, 1997

[54] THERMAL HEAD OF APPARATUS FOR CONTROLLING COLOR PRINTER

[75] Inventors: Kazuhiro Chiba; Noriko Bamba; Jun Someya, all of Nagaokakyo, Japan

[73] Assignee: Mitsubishi Denki Kabushiki Kaisha, Tokyo, Japan

[21] Appl. No.: 469,762

[22] Filed: Jun. 6, 1995

Related U.S. Application Data

[62] Division of Ser. No. 709,025, May 30, 1991, abandoned.

[30] Foreign Application Priority Data

| May 31, 1990 | [JP] | Japan | 2-144825 |
| May 31, 1990 | [JP] | Japan | 2-144826 |
| May 31, 1990 | [JP] | Japan | 2-144827 |
| May 31, 1990 | [JP] | Japan | 2-144828 |
| May 31, 1990 | [JP] | Japan | 2-144829 |
| May 31, 1990 | [JP] | Japan | 2-144830 |
| May 31, 1990 | [JP] | Japan | 2-144831 |
| May 31, 1990 | [JP] | Japan | 2-144832 |
| Jun. 21, 1990 | [JP] | Japan | 2-165234 |
| Jun. 27, 1990 | [JP] | Japan | 2-171917 |

[51] Int. Cl.⁶ .............. H04N 1/23; H04N 5/225; H04N 1/46; G01D 15/10
[52] U.S. Cl. .............. 358/296; 358/909.1; 358/503; 347/188
[58] Field of Search .............. 358/296, 310, 358/332, 335, 345, 909.1; 347/180, 188, 190, 192, 211

[56] References Cited

U.S. PATENT DOCUMENTS

| 4,780,756 | 10/1988 | Shiota et al. | 358/78 |
| 4,786,917 | 11/1988 | Hauschild et al. | |
| 4,965,678 | 10/1990 | Yamada | |
| 5,023,919 | 6/1991 | Wataya | |
| 5,097,343 | 3/1992 | Chiba et al. | 358/296 |
| 5,493,409 | 2/1996 | Maeda et al. | 358/296 |

FOREIGN PATENT DOCUMENTS

| 0029313 | 5/1981 | European Pat. Off. | B41J 31/16 |
| 0256816 | 2/1988 | European Pat. Off. | G06F 15/62 |
| 0267805 | 5/1988 | European Pat. Off. | H04N 1/40 |
| 0272912 | 6/1988 | European Pat. Off. | H01S 3/11 |
| 3235759 | 4/1983 | Germany | H04N 1/00 |
| 3238458 | 5/1983 | Germany | H04N 1/22 |
| 3743837 | 7/1989 | Germany | G02B 26/10 |
| 3905840 | 9/1989 | Germany | H04N 1/00 |
| 59-143657 | 8/1984 | Japan | B41J 3/20 |
| 62-84680 | 4/1987 | Japan . | |
| 62-097482 | 5/1987 | Japan . | |
| 63-179677 | 7/1988 | Japan | H04N 5/91 |
| 64-82858 | 3/1989 | Japan | H04N 5/208 |
| 1-216696 | 8/1989 | Japan | H04N 9/79 |
| 1226293 | 9/1989 | Japan | H04N 9/79 |
| 1238937 | 9/1989 | Japan . | |
| 1290393 | 11/1989 | Japan . | |
| 2-32875 | 2/1990 | Japan | B41J 2/52 |
| 2032875 | 2/1990 | Japan . | |
| 2078392 | 3/1990 | Japan . | |

OTHER PUBLICATIONS

Patent Abstracts of Japan, vol. 13, No. 194 May, 10, 1989.
Patent Abstracts of Japan, vol. 10, No. 018, Jan. 24,1986.
Patent Abstracts of Japan, vol. 007, No. 187, Aug. 16, 1983.
Patent Abstracts of Japan, vol. 004, No. 099, Jul. 16, 1980.
Patent Abstracts of Japan, vol. 13, No. 002, Jan. 6, 1989 and Patent JP-A-63-214 069.
Patent Abstracts of Japan, vol. 13, No. 002, Jan. 6, 1989 (JP-A-63 214 068).

*Primary Examiner*—Eric Frahm

[57] ABSTRACT

A signal processing apparatus for a color printer capable of printing images based on analogue video signals and digital video signals. The apparatus varies at least one of a heating reference time, a number of consecutive heating reference times, and a number of recording element sub-lines based on a type of video signal forming the image to record an image within a predetermined time period.

10 Claims, 72 Drawing Sheets

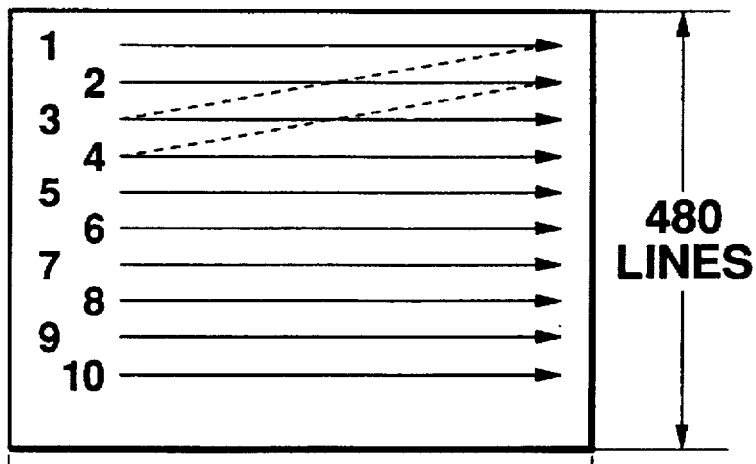
(A) CORRECTING MODE
480 LINES
768 PIXELS
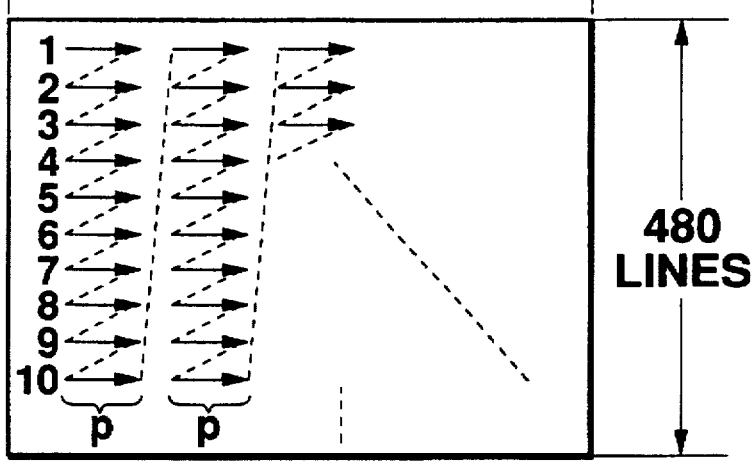
(B) PRINT MODE
480 LINES
Fig. 7

THERMAL HEAD OF APPARATUS FOR CONTROLLING COLOR PRINTER

This application is a divisional of application Ser. No. 07/709,025 filed on May 30, 1991, now abandoned.

BACKGROUND OF THE INVENTION

1. Field of the Invention

This invention relates to a signal processor for a video printer for outputting hard-copy images in full color based on analog video signals and digital video signals.

2. Description of the Related Art

FIG. 71 of the accompanying drawings is a block diagram showing a conventional signal processor for a video printer such as disclosed in Japanese Patent Laid-Open No. 179677/1988.

In FIG. 71, the numerals designate, respectively: 2, a first A/D circuit; 4, an image memory for storing encoded data in a predetermined pixel composition; 6, a D/A converter for restoring the encoded data read from the image memory to an analog video signal; 8, an analog demodulator for demodulating the restored video signal; 10, an analog correction circuit for correcting the demodulated signal; 12, an inverse matrix circuit for restoring the corrected signal to R (red), G (green), and B (blue) signals; 14, an encoder for generating a video signal from the RGB signals; 16, a multiplexer (hereinafter abbreviated as "MPX") for multiplexing RGB signals from the inverse matrix circuit 12; 18, a second A/D circuit for encoding the MPX signal; 20, a line memory for temporarily storing the encoded data; 22, a printing circuit for generating thermal control data in accordance with the encoded data read from the line memory 20 with a thermal head 24 as an object for thermal control. The first A/D circuit 2, the image memory 4, and the D/A converter 6 execute an image-freezing process mode for a desired image; the analog demodulator 8, the analog correction circuit 10, the inverse matrix circuit 12, and the encoder 14 execute a correcting process mode for the frozen image; the MPX 16, the second A/D circuit 18, the line memory 20, printing circuit 22, and the thermal head 24 execute printing process mode.

In operation, input signals in conformity with the NTSC method are encoded in the first A/D converter 2. This encoded data are then stored in the image memory 4 sequentially from its predetermined position for one screen. Thus, the image freezing process is completed.

The frozen image data are thereafter read from the predetermined position of the image memory 4 in a predetermined order so as to be restored to the original video signals.

The video signal is separated into a brightness component Y and a color component (R-Y, B-Y) in the demodulator 8. These separated signals enter the analog correction circuit 10 to undergo a correction for their amplitude value or the like, thereby providing a desired brightness and hue. The corrected signal is converted into three signals each representing R, G, and B. These RGB signals are converted into video signals in conformity with the NTSC method to be outputted as monitor signals. Therefore, the correction can be carried out with reference to the displayed monitor image on the screen. This is the outline of the image correction process.

Meanwhile, the RGB signals are multiplexed in the MPX 16 and encoded again in the second A/D converter 18. This encoded data is temporarily stored in the line memory 20, and the process operation name displayed on the screen will be changed to "printing operation." Specifically, a predetermined number of lines, with the number of pixels in the longitudinal direction of the image aspect (approximately 480 pixels in the NTSC method) as one line, are temporarily stored in the line memory 20. The RGB data read from the line memory 20 will be transferred to the printing circuit 22. The printing circuit 22 executes the converting process of RGB data into thermal control data for converting Y (yellow), M (magenta), and C (cyan) inks into density data, and for controlling the gradient etc., thereby controlling the heating value of the thermal head per pixel units. By performing this thermal control operation in two dimensions, a hard-copy image of a single ink color can be obtained. A final full-colored hard-copy image can be obtained by repeating the correction process and the printing process several number of times corresponding to the number of the ink colors. This is the outline of the printing process.

Thus, the conventional apparatus, provided with an image freezing means and a correcting process means, can generate a desired hard-copy image.

Such a conventional signal processor, however, requires execution of both the encoding process and the A/D process twice in the same apparatus (assuming also the hard-copying process as a D/A process in a broad sense), which causes image quality degradation due to the reduced S/N ratio, and poor reliability and high price resulting from the compositional redundancy of the circuits. Further, there was also a disadvantage that a hard-copy of a graphic image, in which a single pixel is expressed by using RGB data, cannot be realized.

Also, there was an inconvenience that only a single type of input signal, such as of NTSC type, is applicable.

Also, since only a pictorial image in conformity with the NTSC method can be frozen in the image memory, graphic images generated by an external computer like a personal computer could not be hard-copied.

Further, such an apparatus for hard-copying was required to furnish means for storing each RGB data, and means for quickly A/D converting a non-interlaced image having been set at discretion, thereby resulting in expensive apparatus.

FIG. 72 shows a general composition of a conventional image recording apparatus. In FIG. 72, the numerals designate respectively: 26, input terminals for the R, G, B image data; 28, an image memory for freezing the image data; 30, a color converter for converting the RGB data into ink density data of Y, M, and C; 32, a head driver for generating thermal printing head data; 34, a thermal head for heating in accordance with the head data; 36, an ink sheet on which the YMC inks are coated in surface order; 38, a recording paper; 40, a platen roller for applying a predetermined pressure on the recording paper; 42, a mechanism driver for sequentially controlling the mechanism; 44, a controller for controlling the whole system; 46, a printer section.

In operation, the RGB image data for one pixel inputted to the terminal 26 is stored at a predetermined address under the address control by the controller 44. Upon applying the same process on all the pixels, the freezing process for a desired image is completed. This frozen data are then read therefrom under the same address control of the controller 44, and transferred to the color converter 30. The color converter 30 converts the RGB data into YMC ink density data. This YMC ink density data will be transferred to the head driver 32 for being converted into thermal printing head data for the purpose of gradation control. At this time, among the YMC ink density data, only one suiting to the ink selected for printing is processed in the head driver 32. The thermal printing head data are then transferred to the thermal head 34 where it is converted into transcripting heat. The printing process per pixel unit is applied to all the pixels in one line. The subject line is sequentially transferred by feeding the recording paper 38 and the ink sheet by the mechanism driver 42 to undertake the printing operation for each line. A two dimensional recording is carried out with a single ink. This process is sequentially repeated three times to render a colored hard copy of a desired image. The controller 44 controls the rough and fine operations in this printing process.

The color converter 30, the head driver 32, and the thermal head 34 are disclosed more in detail in Japanese Patent Laid-Open No. 216696/1989.

FIG. 73 shows a thermal controlling method for a conventional thermal head 34. In FIG. 73, the numerals designate respectively: 48, an input terminal for basic clock signals (hereinafter referred as "CLK"); 50, a T controller; 52, a C controller; 54, a B controller; 56, a S controller; 58, a L controller; 60, a printing terminating signal (hereinafter referred as "END") for one ink.

FIG. 74 shows a two-dimensional time progress of the printing controlling method according to FIG. 73. T controller 50 divides the frequency of the CLK supplied through the input terminal 48 by t, thereby generating a heating reference time T. The controller C divides this heating reference time by C to generate a continuous heating time T*C. The B controller 54 repeats the generating operation for the number of Block division B, and controls a sub-line composed of T*C*B. S controller 56 divides the frequency of the sub-line by S and controls one line composed of T*C*B*S. The respective pixel is thermal-controlled by T*C*S, and ink transference in accordance with the pixel data is carried out. The L controller 58 divides the frequency of the line by 1, and outputs recording terminating signal END per ink to the terminal 60.

In FIG. 74, C is set to 4, B is set to 3, S is set to 4, and the numerals 1, 2, 3, . . . 10, 11, 12 are the order of heating. The thermal head 34 is divided into a block I of resistors 1–160, a block II of resistors 161–320, a block III of resistors 321–480. There is a relationship Z=Y*B where Z=number of resistors formed in the thermal head; Y=number of resistors formed in a single block.

The aforementioned printing operation is based on the equation P=T*C*B*S*L where:

T; heating reference time;

C; continuous number of heating reference time;

B; number of divided blocks of the thermal head resistance;

S; number of sub-lines

L; number of all lines for recording.

This recording operation is repeated three times for each ink color to provide a desired full-color hard copy image.

With respect to the pixel composition of an image, a graphic image made by a presently-used personal computer usually has 480 lines and 640 pixels, making great account of the square dot rule.

To the contrary, in a pictorial image of NTSC method, it tends to shift to a composition of 480 lines and 768 pixels as the digital demodulating technique develops.

In order to record these pixels in a same apparatus, the recording operation must be carried out for 640 lines or 768 lines where 480 pixels constitute one line.

According to such a conventional image recording apparatus, it is necessary to change the image receiving paper and ink sheet feeding speed when the images to be recorded are mutually the same in the copy-size but different in number of pixels. As a result, the printer section would become complicated, thereby increasing the production cost.

FIG. 75 shows essential parts of a conventional image recording apparatus where a semiconductor laser energy melts the ink coated on the ink film so as to transfer it to a recording media, as disclosed in Japanese Patent Laid-Open No. 143657/1984.

In FIG. 75, the numeral designate respectively: 62, a semiconductor laser; 64, a light deflecting means, such as a rotary polygon mirror; 66, an ink film; 68, a recording media.

In operation, a light beam emitted from the semiconductor laser 62 is: strength-modulated through the image data; reflectively deflected by the light deflecting means 64; and scanned in the direction of the arrow X on the ink film 66 as a main scan, while simultaneously the ink film 66 and the recording media are fed in the direction of the arrow Y perpendicular to the direction X as a secondary scan.

The light beam emitted onto the ink film 66 melts the coated ink at the emitted portion and the melted ink is then transferred to the recording media. The ink is transferred to the recording media 68 two-dimensionally by repeating the main and secondary scans, thereby rendering a desired two-dimensional image.

FIG. 76 shows a conventional image signal processing apparatus disclosed in Japanese Patent Laid-Open No. 82858/1989, where the numerals designate respectively: 70, a digital image data input terminal; 72, a non-linear circuit for level compression or level extension; 74, an outline signal generating circuit for generating outline signal, for example by differentiation; 76, a delay circuit; 78, a full adder; 80, an output terminal for corrected result data.

In operation, digital data inputted through the input terminal 70 are supplied to the non-linear circuit 72 for level compression or level extension. Non-linearly processed data are then inputted to the outline signal generating circuit 74 which generates an outline signal by applying a differentiation etc. thereon. The full adder 78 calculates the sum of the outline signal data from the outline signal generating circuit 74 and the delayed signal data from the delay circuit 76, and outputs the resulted data through the output terminal 80. This process is executed for all the pixel data, thereby providing image data having an emphasized outline.

FIG. 77 shows a portion of digital image data where the high-frequency component is emphasized by e.g. a two-dimensional digital filter for enhancing the sharpness of the image, in a quantized-image recording apparatus. In FIG. 77, PN*M is the subject pixel, while P(N−1)*M, PN*(M−1), PN*(M+1), P(N+1)*M are adjacent pixels thereto. The outline emphasis is performed by executing the following calculation from the above five pixels to obtain the outline corrected value DN*M:

$$DN*M=(3/2)*PN*M-(1/8)\{P(N-1)*M+PN*(M-1)+PN*(M+1)+P(N+1)*M\}$$

where DN*M=PN*M in case of all the pixel values being the same, and DN*M=(3/2)*PN*M in case of all the pixel values except PN*M being zero. Namely, the independent pixels become emphasized. All pixel values are assumed to be positive in this example.

According to the conventional image recording apparatus as shown in FIG. 75, however, a very large-output semiconductor laser like of several hundreds mW has been required to increase the recording speed because the ink-melting heat totally depends on the semiconductor laser light energy. Since such a high-power semiconductor laser typically emits multi-mode light having an irregular lateral mode, this results in unsteady recording dots. Further, the difficulty of manufacturing a high-output and coherent semiconductor laser has made it quite expensive and short-lived.

Further, since the conventional image signal processing apparatus such as for outline correction shown in FIG. 76 has executed the same signal processing on all pixel data, it has been impossible to execute image processing on only a random part area desired by the user.

In addition, such a signal processing apparatus for correcting the outline of the image as shown in FIG. 77 has been able to emphasize not only the outline of the image, but also the noise component depending on the image characteristics, thereby making it difficult to obtain a desired image.

SUMMARY OF THE INVENTION

It is therefore an object of this invention to provide a signal processing apparatus for a video printer which comprises a digital modulating means, a digital demodulating means, and a digital image correcting means, etc., and is capable of executing the image freezing process, the image correcting process and the image printing mode and executing hard-copy of a graphic image.

It is another object of this invention to provide a signal processing apparatus for a video printer which is capable of performing all the image freezing process, the image calculating process, and the image printing process with a single encoding process by adopting the digital demodulating method using an image calculating means, and is capable of processing, as its input video signals, both the NTSC method-based video signal and the video signal including independently inputted brightness/color signals.

It is another object of this invention to provide a signal processing apparatus for a video printer which is capable of printing a variety of images by changing the recording time per one line with a constant feeding velocities of the image received paper and the ink sheet.

It is another object of this invention to provide an image signal processing apparatus which is capable of recording an image in stable dots without need of excessively expensive and high-powered coherent semiconductor laser, and capable of performing the image processing on a desired area designated in random, and capable of providing a preferable image for the user by emphasizing the outline and not the noise component.

(a) According to the signal processing apparatus of this invention, a signal processor for a video printer capable of outputting hard copy images in full color, comprises, encoding means for encoding video signals in conformity to NTSC (National Television System Committee) broadcast method or video signals separately supplied as a brightness signal and a color signal, directly to video data, memory means for freezing the generated video data, decoding means for decoding brightness data and color data from the video data, brightness data/color data adjusting means for adjusting the data to provide an image desired by the user, means for generating a monitor video signal from the adjusted data, means for performing printing operation based on the corrected data, means for reproducing/generating synchronizing signals or reference clock signals from inputted video signals, and controlling means for performing the whole sequence operation control, mode control, and correction parameter generation, thereby being able to output hard-copy image for both the analog input image and the digital input image.

In short, this invention comprises means for receiving both analog video signals and image data represented in RGB, which generates video data by the encoding means for the analog video signals and the encoding means (modulating means) for the image data represented in RGB. Both types of the video data are stored in the same image memory, and the hard-copy process is performed for the both types of the data.

The encoding means of this invention generates video data in conformity with the NTSC broadcast method from the RGB data, thereby reducing the data amount.

Further, the digital correcting means enables the user to perform the correction on the frozen image desirably and stably at low cost.

(b) According to this invention, a signal processing apparatus for a video printer comprises a plurality of image calculating means and selecting means for selecting any one of the calculating means, thereby enabling to treat both types of signals, those in conformity with NTSC method and those in separate form of brightness signal and color signals.

The image calculating means of this invention contributes to realize adjustment-free operation, high-performance, and cost reduction of the demodulating process. Also, it helps to perform image calculating process in conformity with the types of input signals.

(c) According to this invention, a signal processing apparatus for a video printer capable of outputting hard-copy images in full-color, comprises, encoding means for encoding video signals in conformity with NTSC type, or video signals input separately to brightness signal and color signal, directly into video data, memory means for freezing the video data at least for a screen, decoding means for decoding brightness data and color data from the video data, brightness data/color data correcting means for the preferable adjustment on the image by the user, means for generating monitor video signals from the corrected data, means for performing printing based on the corrected data, means for reproducing synchronous signals and reference clock signals from the inputted video signals, and controlling means for controlling the whole sequence operation of the apparatus and the operation modes, and generating parameters for the correcting calculation.

In short, this apparatus includes digital demodulating means for the video signals, and digital correcting means for a freezing image, whereby the time-dividing process is carried out in correction mode and printing mode.

The digital demodulating means according to this invention contributes to realize adjustment-free, high-performance, and cost reduction of the demodulating process.

Further, the digital correcting means enables the user to desirably correct the frozen image at a low cost with stability.

(d) According to one aspect of this invention, a signal processing apparatus for a video printer capable of outputting hard-copy images in full-color, comprises, storing means for storing brightness data and color data having been encoded or generated by calculation, means for converting the brightness data and the color data read from the storing means into RGB data, means for generating corrected data having adjusted contrast, hue, and saturation of the RGB data, means for generating a monitor signal from the corrected data, and means for converting the corrected data into heat data for driving a thermal head.

According to another aspect of this invention, a signal processing apparatus for a video printer capable of outputting hard-copy images in full-color, comprises, storing means for storing brightness data and color data having been encoded or generated by calculation, means for separating the video data read from the storing means into brightness data and color data, means for generating RGB data from the separated brightness data and the color data, means for converting the RGB data into corrected data, means for generating a monitor signal from the corrected data, and means for converting the corrected data into heat data for driving a thermal head.

According to another aspect of this invention, a signal processing apparatus for a video printer capable of outputting hard-copy images in full-color, comprises, means for storing video data having been encoded or generated by calculation, means for separating the video data read from the storing means into brightness data and color data, means for generating RGB data from the separated brightness data and the color data, means for generating corrected data from the RGB data, means for generating video data for monitoring from the corrected data, means for generating a monitor signal from the video data, and means for converting the corrected data into heat data for driving a thermal head.

According to another aspect of this invention, a signal processing apparatus for a video printer capable of outputting hard-copy images in full-color, comprises, means for storing brightness data and color data having been encoded or generated by calculation, means for converting the brightness data and the color data read from the storing means, means for converting the RGB data into corrected data, means for generating video data for monitoring from the corrected data, means for generating a monitor signal from the video data, and means for converting the corrected data into head data for driving a thermal head.

The digital processing means of this invention contributes not only to scale-down the circuits by reducing the number of analog processing means of the equivalent functions, but to stabilize the functions of the apparatus by eliminating the temperature fluctuation and the change with the passage of time. Further, it becomes possible to execute positive value calculation by locating the restoring means before the correcting calculation means, thereby simplifying the calculating circuit.

(e) According to this invention, a signal processing apparatus for a video printer, comprises, means for receiving RGB data outputted from an external computer or the like, means for encoding the received RGB image data into video data in conformity with NTSC standards, means for storing the video data, means for decoding the video data read from the memory means to restore them to the original RGB data, and printing means.

Further, the printing system according to this invention comprises, means for generating video data in conformity with NTSC standards in an external computer or the like, means for outputting the video data, means for receiving the video data in the video printer, means for storing the video data, means for restoring the RGB image data, and printing means.

The encoding means of this invention generates video data (Y/C) represented as follows:

Y=α*R+β*G+γ*B

C=δ*(B−Y) SIN (2 πfsct)+ε*(R−Y) COS (2 πfsct)

Y/C=Y+C fsct: color sub-carrier frequency.

This process compresses the memory capacity for the original RGB image data into ⅓. The decoding means separates brightness data (Y) and color data (C) from the video data (Y/C), and restores the RGB image data therefrom.

In addition, the digital interface means not only eliminates the necessity of providing high-speed A/D converting means, but also enables data transfer without degradation.

(f) According to this invention, a signal processing apparatus for a video printer, comprises, means for receiving RGB data outputted from an external computer, means for encoding the received RGB image data into brightness data and color data, means for storing the brightness data and the color data, means for decoding the data read from the storing means to restore the original RGB image data, and printing means.

Further, according to this invention, the printing system comprises, means for encoding RGB data into brightness data and color data for an external computer or the like, means for outputting the brightness data and the color data, means for receiving the brightness data and the color data in the video printer, means for storing the video data, means for decoding the RGB data for restoration, and means for printing.

The encoding means of this invention generates the brightness data (Y) and the color data (C) represented:

Y=αR+β*G+γ*B

C=(B−Y) SIN (2 πfsct)+(R+Y) COS (2 πfsct)

where fsct=color sub-carrier frequency. This process compresses the memory capacity for the original RGB image data into ⅔. Further, the decoding means restores the RGB data from the brightness data (Y) and the color data (C).

In addition, the digital interface means not only eliminates the necessity of providing the high-speed A/D converting means, but also enables data transfer without degradation.

(g) According to this invention, a signal processing apparatus for a video printer, capable of outputting hard-copy images in full-color, comprises, means for generating a brightness signal Y, and a color signal C time-dividedly multiplexed of the R-Y signal and B-Y signal, encoding means for generating brightness data Y and color data C by A/D converting the R-Y signal and the B-Y signal, and controlling the output of these data in three-state mode, means for storing the encoded data, means for correcting the Y data and the C data read from the storing means by applying a digital calculation on them to render desired image data, means for generating monitor video signal, means for printing the image by controlling the heat of a thermal head, means for reproducing a synchronous signal and a clock signal from the inputted video signal, and means for generating or controlling the correction coefficient from input sequence operation data for the entire apparatus and input correction amount.

In short, each of the following two groups are coupled to the same data bus respectively:

(A) The output of A/D converter having a three-state output function;
The input/output of the image storing means image;
The input of the image correcting means;

(B) The output of the image correcting means;
The input of the D/A converting means for image restoration;
The input of the image printing means.

The image correcting means of this invention executes the same correcting calculation time-dividedly in the image correcting mode and the printing mode. And by reviewing the corrected state in the monitor screen, desirable hard-copy image can be obtained.

(h) According to this invention, a signal processing apparatus for a video printer comprises, means for generating a brightness signal Y and a color signal C made by time-dividedly multiplexing the R-Y signal and the B-Y signal, means for generating the brightness data Y and the color data C by A/D converting the brightness signal and the color signal, and controlling the output of these data in three modes, means for transferring the Y data and the C data without applying any process thereon in the freeze mode of the image, and correcting the Y data and the C data to desired image data by applying digital calculation thereon in the correcting mode and the print mode, means for storing the desired image in desired pixel composition, means for generating monitor video signal, means for generating video signal by encoding the two or the three signals, and means for executing heat control of the thermal head to print the image, means for reproducing the synchronous signal and the reference signal from the inputted video signal, and means for commanding or controlling the correcting values etc. based on the entire inputted sequence operation data or the correcting value.

In short, the components: (1) an output of the A/D converter having three output states; (2) a digital correcting means for selecting the operation mode; (3) a printing means; and (4) a D/A converter, are coupled to the same data bus, and are controlled in accordance with the freezing process, the correcting process, and the printing process, thereby realizing desired operation.

The correcting circuit of this invention also has a function of controlling the flowing of the data, in addition to the image data correcting function.

(i) According to this invention, a image recording apparatus for performing hard-copying process for a desired image, comprises, a plurality of means for recording the image with a relationship represented by the following formula:

$$P=T*C*B*S*L$$

where

P: recording time for one color

T: reference heating time

C: continuing number of the reference heating time T

B: number of divided blocks of the thermal head

S: number of sub-lines

L: number of all lines of record, wherein more than two types of images, having the same number of pixels for one side while different number of pixels for the other side, are hard-copied in the same size and same time, by controlling the recording parameters as T1*C1*B1*S1*L1=T2*C2*B2*S2*L2 (1: image 1, 2: image 2).

The parameters in this invention are the reference heating time T, the continuing number of the reference heating time T, and the number of sub-lines S. The number of divided blocks of the thermal head B is set in a fixed value.

(j) According to this invention, an image recording apparatus is composed such that: laser light generated in a light resonator is intensity-modulated in accordance with the output of a printing signal generator; the intensity-modulated laser light is converted into heat energy; and an image is formed on a recording media by means of the converted heat.

Further according to this invention, an image signal processing apparatus designates a processing area of quantized data stored in a memory, and performs special process on the designated area data for image correction.

Still further according to this invention, an image signal processing apparatus: extracts a high-frequency component of digital image data; calculates correcting data from a correcting coefficient or a judging coefficient being capable of set at a desired value together with the extracted value; adds the calculated correcting data to the target pixel data; and digitally emphasizes the outline of the image.

In this invention, non-coherent light is converted into coherent light by the light resonator, and the image recording is carried out with this coherent light, thereby the convergence of the light can be enhanced to render dot-stable image recording.

Further in this invention, it becomes possible to apply the special process exclusively on the data located in an area designated by the user.

Still further in this invention, the smoothing process and the emphasizing process are performed by adding/subtracting the extracted value of the high-frequency component of the digital image data to/from the correcting data calculated from the freely-established correcting coefficient or judging coefficient. Thus, the user can desirably correct the outline of the image.

The above and other advantages, features and additional objects of this invention will be manifest to those versed in the art upon making reference to the following detailed description and the accompanying drawings in which a structural embodiment incorporating the principles of this invention is shown by way of illustrative example.

BRIEF DESCRIPTION OF THE DRAWINGS

FIG. 7 is a schematic view showing the difference in data reading method between correcting mode and print mode;

DETAILED DESCRIPTION

Figure 1:
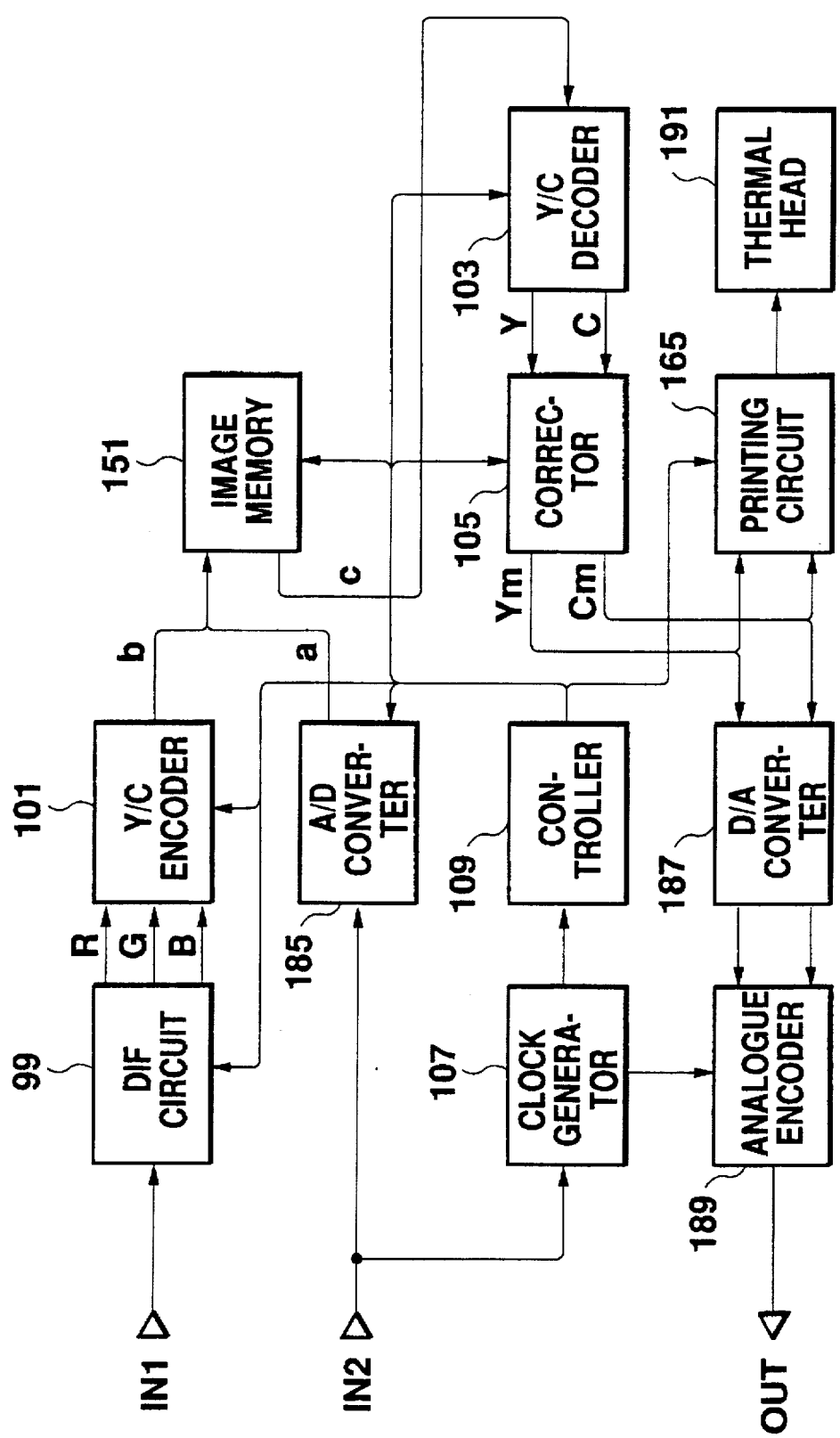
FIG. 1 is a block diagram showing an example of a signal processing apparatus according to this invention.

FIG. 1 of the accompanying drawings shows an example of a signal processing apparatus for a video printer according to this invention in block diagram.

In FIG. 1, the numerals designate, respectively: 99, a DIF (digital interface) circuit for receiving and processing RGB data; 101, a Y/C encoder for generating video data Y/C in conformity with NTSC standards from the RGB image data; 103, a Y/C decoder for separating brightness data Y and color data C from the video data Y/C; 105, a corrector for correcting both data Y and C to a desirable image by calculation; 107, a clock generator comprising means for reproducing a synchronizing signal or a reference clock signal from an input video signal; 109, a controller for generating controlling data for an entire sequence control or part control, and controlling signals. Other components not mentioned above are the same as in the conventional apparatus.

Figure 2:
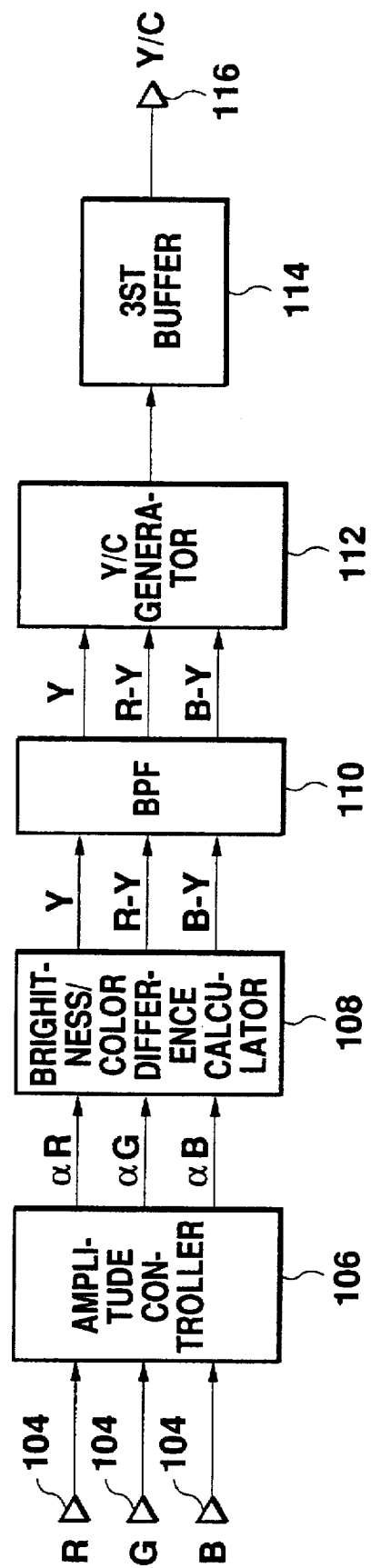
FIG. 2 is a block diagram showing an example of a Y/C encoder for digitally modulating the image data according to this invention.

FIG. 2 shows an embodiment of the Y/C encoder 101 for digitally modulating the image data. In FIG. 2, the numerals designate, respectively: 104, input terminals for the RGB data; 106, an amplitude controller for multiplying the amplitude value of the RGB data by "alpha"; 108, a brightness/ color difference calculator for generating brightness data Y, and color difference data R-Y, B-Y in conformity with NTSC standards; 110, a BPF (band pass filter) for limiting the band of the generated data; 112, a Y/C generator for generating video data Y/C from the brightness/color difference data; 114, a 3ST buffer for controlling the output state in accordance with the mode; 116, an output terminal for the video data Y/C.

Figure 3:
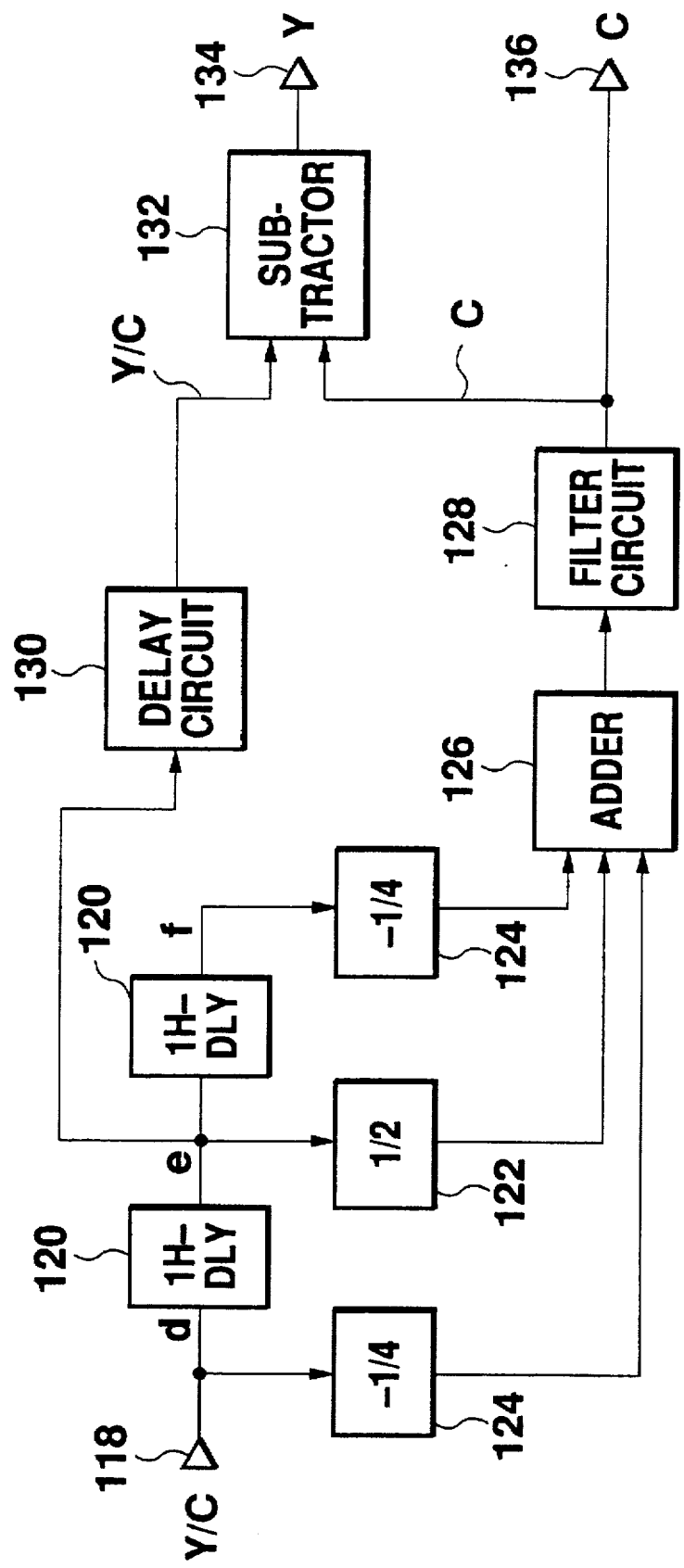
FIG. 3 is a block diagram showing an example of a Y/C decoder for separating brightness data Y and color data C from video data Y/C according to this invention.

FIG. 3 shows an example of a Y/C decoder 103 for separating the brightness data Y and the color data C from the video data Y/C. In FIG. 3, the numerals designate, respectively: 118, an input terminal for the video data Y/C read from the image memory 151; 120, a delay element for 1H (H: time for scanning one horizontal scanning line) (hereinafter referred as "1H-DLY"); 122, 1/2 multiplier; 124, (−1/4) multiplier; 126, an adder; 128, a filter circuit; 130, a delay circuit for timing adjustment; 132, a subtractor; 134, an output terminal for the brightness data Y; and 136, an output terminal for the color data C.

Figure 4:
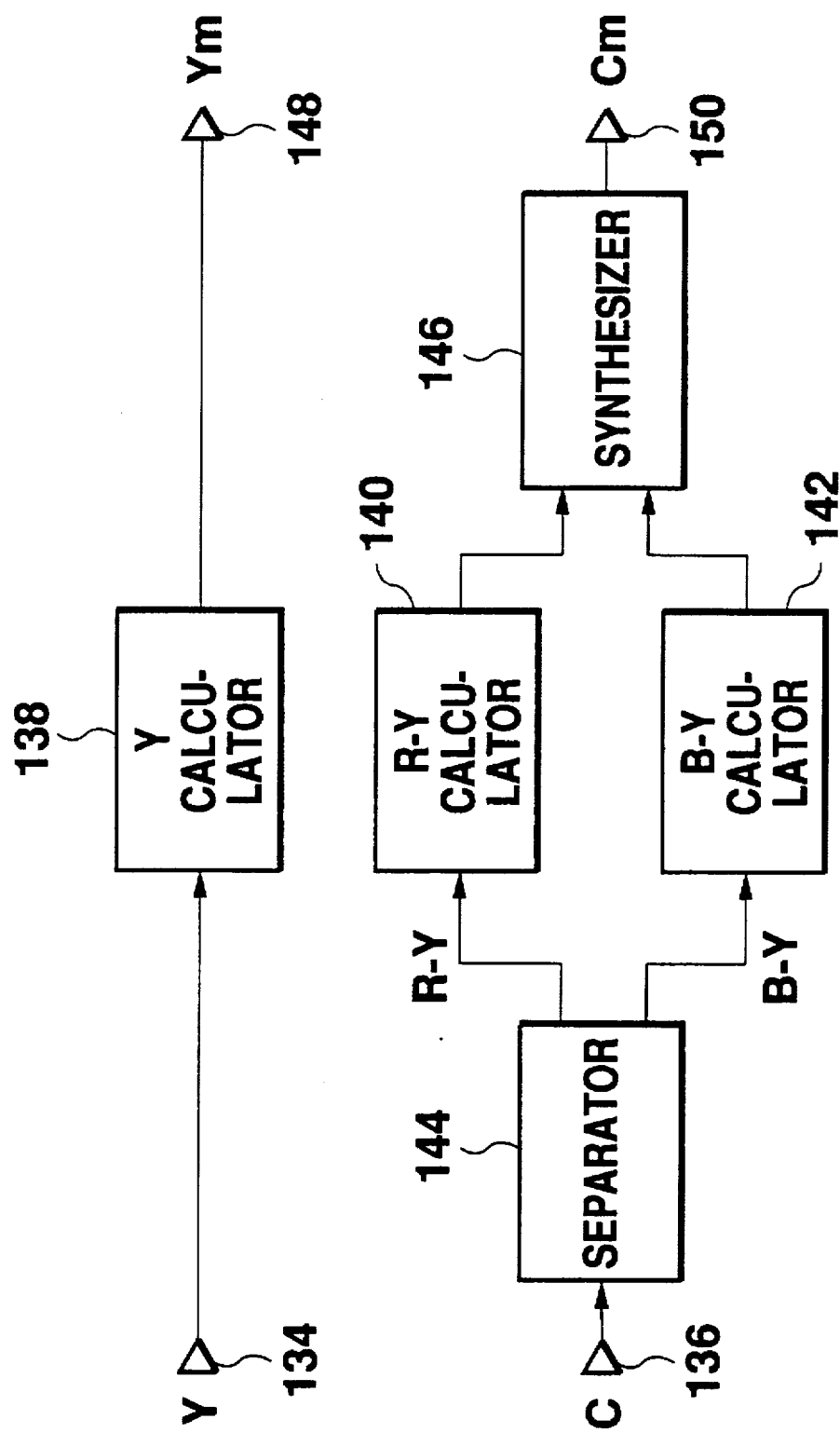
FIG. 4 is a block diagram showing an example of a corrector for desirably adjusting the image according to this invention.

FIG. 4 shows an example of a corrector 105 for desirably correcting the image. In FIG. 4, the numerals designate, respectively: 138, a Y calculator; 140, a R-Y calculator; 142, a B-Y calculator; 144, a separator for separating R-Y and B-Y color difference data from the color data C; 146, a time-divided synthesizer for the calculated data of the R-Y and the B-Y; 148 and 150, output terminals for the corrected data Ym and the color data Cm.

Figure 5:
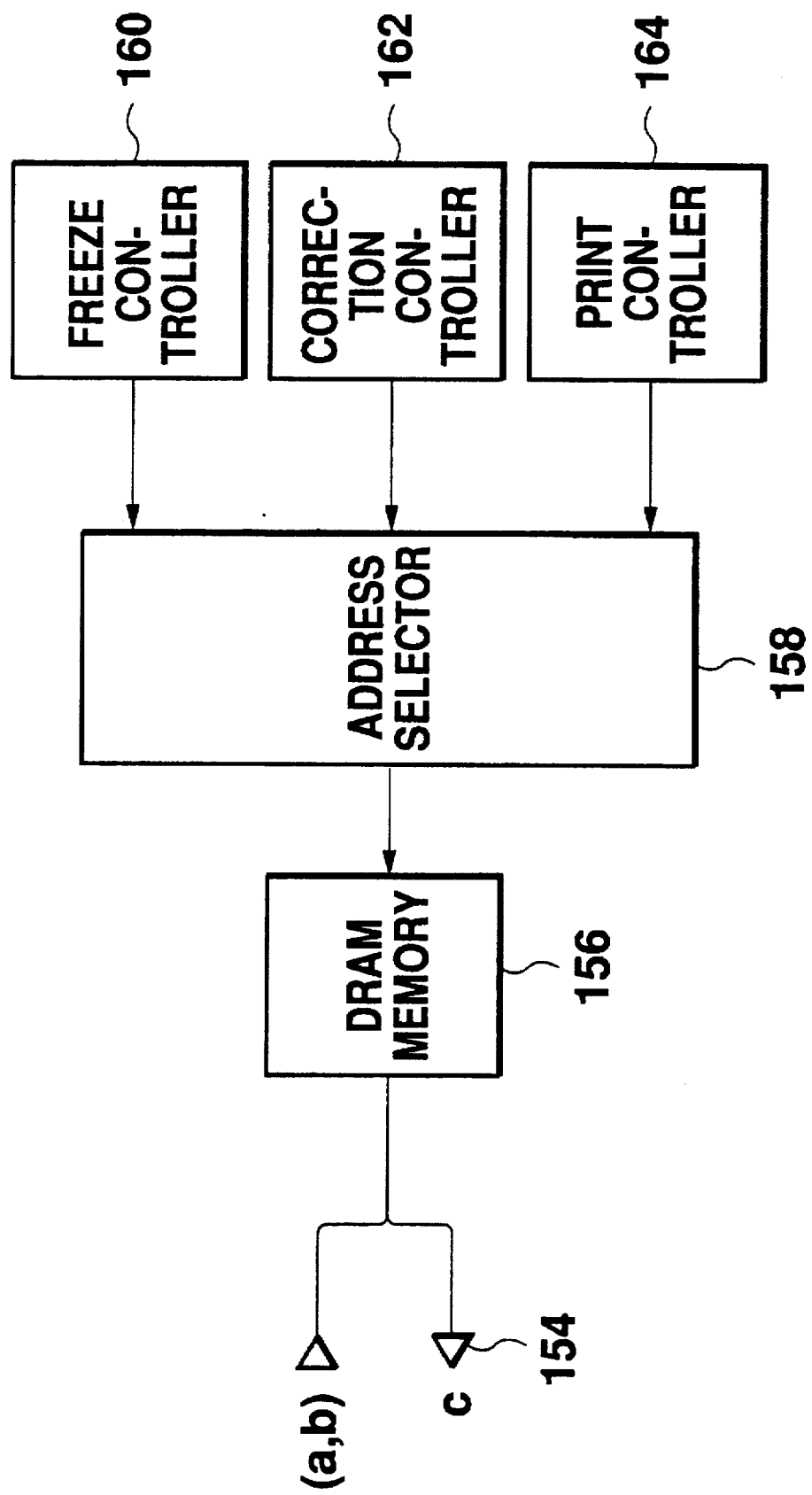
FIG. 5 is a schematic view showing an example of an image memory composition.

FIG. 5 shows a general composition of the image memory 151. In FIG. 5, the numerals designate, respectively: 154, input/output terminals for the video data Y/C (a, b, c); 156, a DRAM memory; 158, an address selector; 160, a freeze controller; 162, a correcting controller for managing the addresses of the correcting mode; and 164, a printing controller for managing the addresses of the printing mode.

Figure 6:
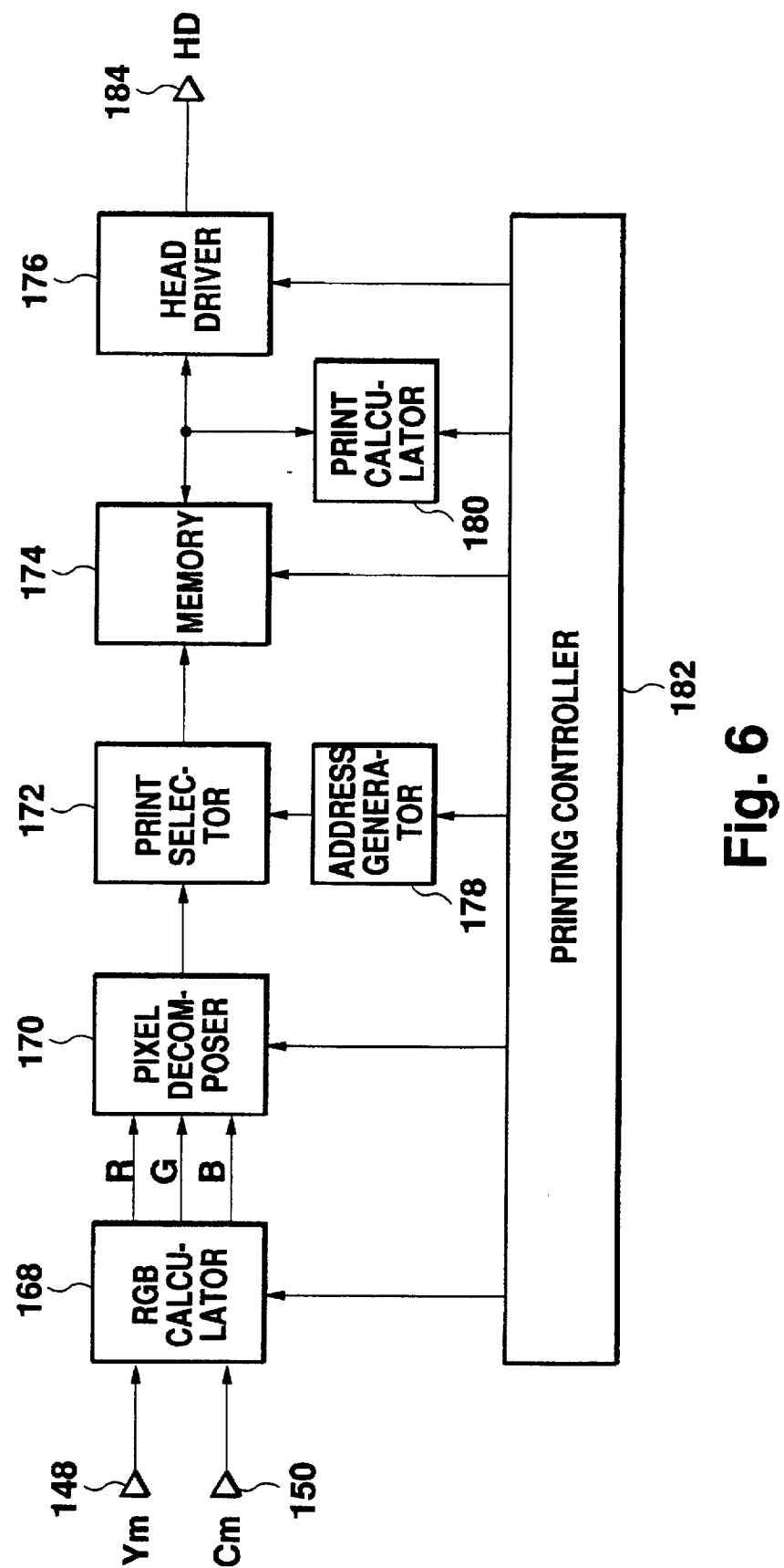
FIG. 6 is a block diagram showing an example of a printing circuit according to this invention.

FIG. 6 shows an example of the printing circuit 165. In FIG. 6, the numerals designate, respectively: 168, a RGB calculator; 170, a pixel decomposer for color conversion; 172, a print selector; 174, a memory composed of SRAM and ROM; 176, a head driver; 178, an address generator for printing process; 180, a printing calculator; 182, printing controller; and 184, an output terminal of the head data HD.

The operation of this invention will be now described.

To start up, in video signal input mode, the output terminal of the Y/C encoder 101 is previously set in off state of three states. An analog video signal Y/C inputted to the terminal is directly encoded in the A/D converter 185 to video data Y/C (a).

The conditions for this encoding operation: number of quantized bits=8 bits; sampled frequency=4*fsc (fsc: 3.58 MHz); pixel composition=768 (H)*480 (V). The image memory 151 stores the data for one screen from a predetermined position in a predetermined order. At this time, the address data from the freeze controller 160 in FIG. 5 is selected by the address selector and inputted to the DRAM memory 156. In other words, the DRAM memory 156 is under control of the freeze controller 160.

Next, digital RGB image data input mode will be described. In this mode, the output state of the A/D converter 185 is set to off state of the three states. The digital RGB data generated in e.g. an external computer is inputted to the terminal IN1, and then supplied to the DIF circuit 99 for reception and rearrangement. This received data is input to the Y/C encoder 101 to be converted into the video data Y/C therein.

This conversion process will be now explained with reference to FIG. 2. In FIG. 2, the RGB data per pixel inputted to the terminal is multiplied by α in the amplitude controller. The brightness/color difference calculator generates brightness data Y and color difference data R-Y, B-Y in conformity with NTSC method, from the amplitude controlled data. For example, the brightness data Y can be expressed as follows:

$$Y=0.3(\alpha R)+0.59(\alpha G)+0.11(\alpha B)$$

Similarly, R-Y and B-Y also can be calculated using above Y. The BPF 110 limits the band width of these brightness data and color difference data by a low-pass-filter characteristic. The Y/C generator 112 generates color data C which is made by time-dividedly multiplexing the color difference data R-Y and B-Y alternately, and renders video data Y/C by adding the brightness data thereto. The 3ST buffer 114 outputs video data Y/C in on state. This video data Y/C (b) is written to the image memory 152 under the address control by the freeze controller 160. Upon executing above-mentioned process repeatedly an image composing one screen, the RGB image data freezing process terminates.

With the above operation, it is possible to freeze the desired image in both the analog video signal input mode and the digital RGB data input mode. To shift to the next mode, both outputs of the Y/C encoder 101 and the A/D converter 185 are turned off. The frozen data in the image memory 151 is read (c) under the address control of the correcting controller 162 in FIG. 5, and then transferred to the Y/C decoder 103. The video data Y/C inputted through the input terminal 118 of the Y/C decoder 103 shown in FIG. 3 is delayed by the 1H-DLY 120 which adjusts the pixel positions for three lines including contiguous upper and lower lines so as to be data f, e, and d. These data are put into calculation in the (1/2) multiplier 23 and the (−1/4) multiplier 124. The adder 126 calculates s=0.5 e−0.25 (d+f). The filter circuit 128 having a band-pass property eliminates unnecessary components except the color data C from the s row of the data. These output data are output from the terminal 136 as color data.

Meanwhile, the video data Y/C and the color data C of the target pixel having been adjusted for timing in the delay circuit 130 are supplied to the subtractor 132 for executing the calculation Y=Y/C−C, the result of which will be outputted through the terminal 134 as brightness data Y.

Thus, the video data Y/C have been separated into the brightness data Y and the color data C.

Both separated data are transferred to the corrector 105 shown in FIG. 4, where the Y calculator 138 executes an amplitude value calculation or off-set value addition or subtraction on the brightness data Y so as to output desirably corrected brightness data Ym through the terminal 148. The separator 144 separates R-Y data and B-Y data from the inputted color data C. The R-Y calculator 140 and the B-Y calculator 142 calculates an amplitude value or an off-set value of the data, respectively, to correct to a desirable data. The synthesizer 146 synthesizes the corrected data by time-divided multiplexing, and outputs the corrected color data Cm through the terminal 150. Each of the calculators 140,142 receives calculation parameter from the controller 109.

Thus, desirably corrected brightness data Ym and color data Cm are obtained.

These corrected data will be restored to analog signals in the D/A converter 187.

The encoder circuit 189 generates a video signal Y/C from the restored signal and outputs it as a monitor signal. In this time, the encoder circuit 189 adds a synchronizing signal (m) restored (in case of video signal input mode) or generated (RGB image data input mode) in the clock generator 107 to the restored signal, thereby rendering a video signal in conformity with NTSC standards.

Referring to the monitor image, the user can change the correcting calculation parameters of the controller 109 equipped with man/machine interface means to execute correcting process with them in the corrector 105 for obtaining desired image quality (changed brightness distribution, hue, and saturation). This correcting process is carried out in the synchronizing signal period of the video section. Thus, the correcting mode has been generally described.

Next, the printing mode will be mentioned.

FIG. 7 shows a difference in the data reading method between the correcting mode and the printing mode.

As shown in (A) of FIG. 7, the video data are read out in the order of 1-3-5- . . . 2-4 at line unit composed of 768 pixels in the correcting mode. In the printing mode as shown in (B), the video data are read from the 1st line to the 480th line per q lines (q=1 or 2) at an unit of p pixels in one line, and subsequently, the next p pixels are read in the same manner. Such reading out process is performed for one screen.

Figure 8:
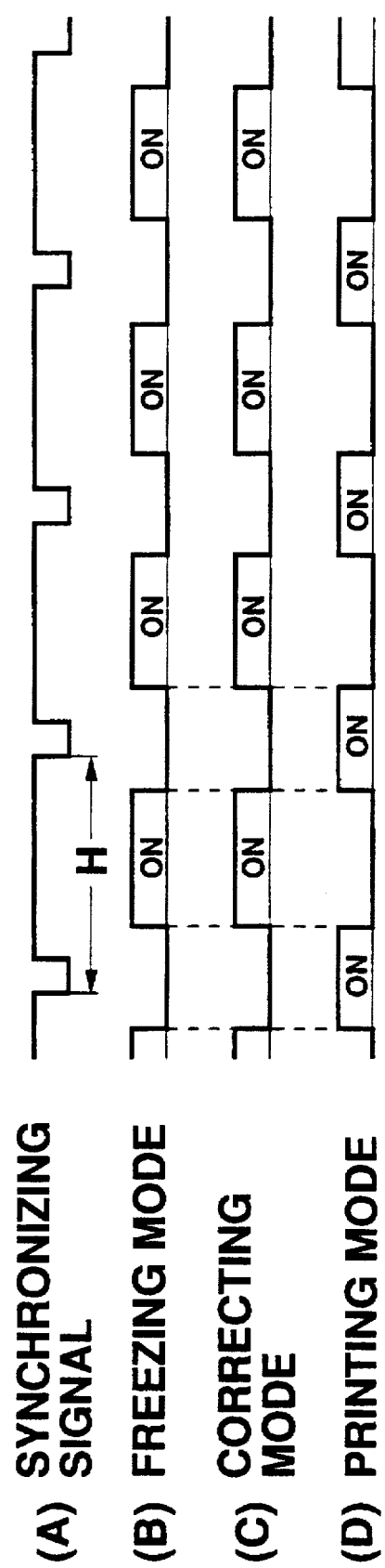
FIG. 8 is a schematic view showing the operational position relationship of the synchronizing signal to the respective mode.

FIG. 8 shows a relationship between the synchronizing signal and the motion position for each of the modes. In FIG. 8, the code (A) designates a synchronizing signal representing one horizontal scanning period by H, while the codes (B), (C), and (D) designate the freezing mode, the correcting mode, and the printing mode, respectively, where the motion positions are represented by ON. It is understood that the correcting mode and the printing mode are time-dividedly acting.

The printing mode will now be described with reference to the FIG. 7 and FIG. 8.

The video data, read under the address control by the printing controller shown in FIG. 5, will be inputted to the Y/C decoder 103. In the same manner as the correcting mode, it is separated into the brightness data Y and the color data C.

However, it is necessary to satisfy the condition of $p \geq r$ where r is the number of pixels required for the calculation in the filter circuit.

The 1H-DLY 120 and the delay circuit 130 can execute the process properly in accordance with the value of p. The resulting two data are then processed in the same manner as in the correcting mode in the corrector 105, and transferred to the printing circuit 165 as corrected data Ym, Cm. At this time, the D/A circuit 187 does not receive the corrected data.

In operation of the printing circuit 165, the inputted brightness data Ym and the color data Cm are restored to the RGB data in the RGB calculator 168. This RGB data is decomposed in the pixel decomposer 170 into achromatic data and chromatic data. These two data are converted into YMC ink density data in the print calculator 180 which adds the table converting ROM data of the print selector 172 and the memory 174 to the partial data obtained by the table conversion. The ink density data is temporarily stored in the memory 174 for time axis adjustment under the control of the address generator 178.

The ink density data read from the memory 174 at a predetermined timing will be transferred to the head driver 176 and converted into heat controlling data HD (Head Data) for the thermal head.

The head data HD is transferred to the thermal head 191 where the thermal transference is executed. Such an entire sequence is controlled by the printing controller 182. The detailed composition of the printing circuit is disclosed by the applicants in Japanese Patent Laid-Open No. 64-216696. In a presently used video printing apparatus, the sublimating dye inks Y, M, a and C are sequentially thermal-transferred. Therefore, the printing mode is repeated three times for each ink to obtain the hard-copy of the desired image. This is the general process of the printing mode.

Figure 9:
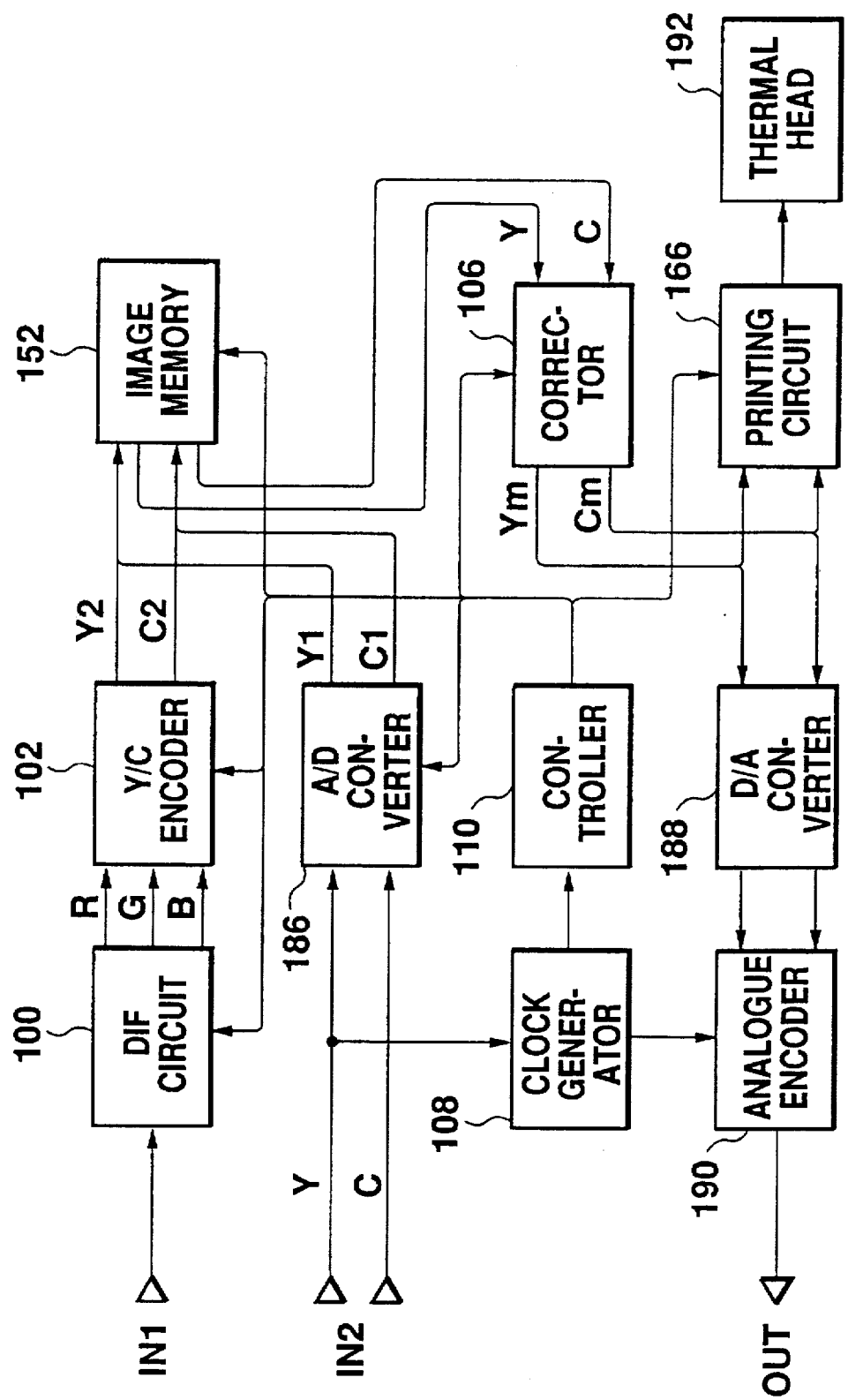
FIG. 9 is a block diagram showing another example of a signal processing apparatus for a video printer according to this invention.

FIG. 9 shows another embodiment of the signal processing apparatus for a video printer according to this invention.

Figure 10:
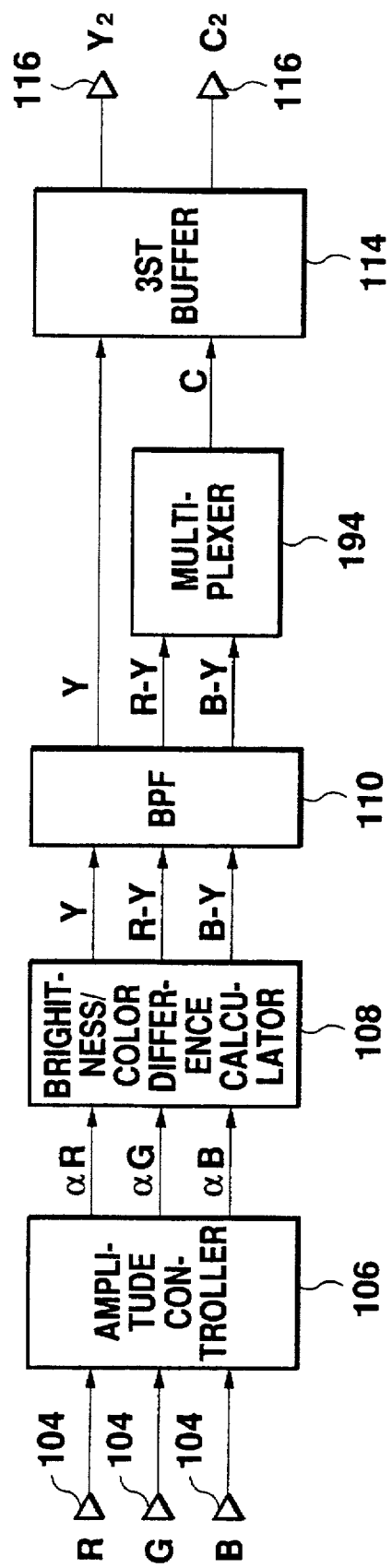
FIG. 10 is a block diagram showing another example of the Y/C encoder according to this invention.

In this embodiment, the Y/C encoder 102 is modified as shown in FIG. 10. In FIG. 10, the numeral 194 designates a multiplexer for time-dividedly multiplexing the color difference data R-Y and B-Y to generate color data C. Other components are the same as those in FIG. 2. The operation for brightness signal input mode and color signal input mode in this apparatus will be now described.

The brightness signal Y and the color signal C inputted to the terminal IN2 are directly encoded respectively in the A/D converter 186 to become brightness data Y1 and color data C1. These data are sequentially written in the image memory 152. In this mode, the output of the Y/C encoder 102 is turned off. The aforementioned process is repeated for one screen, and thus the freezing process in analog signal input terminates.

Next, digital RGB image data input mode will be described. For performing this mode, the output of the A/D converter 186 is turned off. The digital RGB image data inputted through the terminal IN1 will be received by the DIF circuit 100, and thereafter transferred to the Y/C encoder 102 as RGB data for one pixel. The Y/C encoder 102 has a composition shown in FIG. 10 and outputs brightness data Y2 and color data C2 through the terminal 116. These data are sequentially written in the added image memory 152. Upon completing this process for the data of one screen, the RGB data freezing process terminates.

In both the correcting mode and the printing mode, the brightness data Y and the color data C read from the image memory 152 are transferred to the corrector 106, and the same process as in the embodiment of FIG. 1 will be executed. Thus, the desired hard-copy image is obtained.

When a video signal is encoded directly, it is usual to sample at a speed four times larger than the color sub-carrier frequency. This is because, at this speed, the clock signals can be generated easily and the demodulation can be performed easily based on the diagonally modulated color signal. In this case, the number of effective pixels per one line is 768 pixels approximately.

Accordingly, a screen has 768 pixels (horizontal)×480 pixels (vertical). On the contrary, the presently common graphic image is in conformity with Square Dot Rule of 640 pixels (horizontal)×480 pixels (vertical). In the printing mode, since the printing is performed with 480 pixels per one line, the longitudinal side of the output image can be aligned. The lateral side, however, cannot be aligned, and should be attended. For this purpose, a controlling data having the number of pixels as a variable is transmitted to the printer mechanism section incorporating the thermal head 192. The printer mechanism section selects the paper feeding velocity of 640 dots as a standard (e.g. code 0) from the controlling data for controlling the paper feeding velocity of 768 dots of code 1. If this 768 dots is represented as M, M is multiplied by 640. Thus, the controlling data for discriminating the number of lines and the paper feeding velocity are controlled by being mutually corresponded, thereby aligning the size in the lateral direction. Of course, it is necessary to set the ink film feeding speed equal to that of the paper.

Although the pixel composition of the image is selected as 480×768 in the shown embodiment, other composition e.g. 400×640 can also be used. Further, the embodiment according to the FIGS. 2–6 is not limited to the illustrated composition, but it can adopt other desirable circuits suited for embodying the subject of this invention. Also, the monitor signal generator is not limited to the one which is shown, but other composition e.g., of outputting separated brightness signal and color signal, can be employed. Further, the DIF circuit 100 and the Y/C encoder 102 can be comprised of a software means like of microcomputer taking account of the interface speed with a external computer.

As mentioned above, according to this invention, both images being inputted in analog video signal and being inputted in digital form can be frozen in the same memory. In consequence, both types of the full-color hard copy image can be selectively outputted, thereby realizing a printer apparatus having enhanced operativity, image quality, and cost performance with a signal processing section easy to be composed as LSI.

Another embodiment of this invention is now described with reference to FIG. 11.

Figure 11:
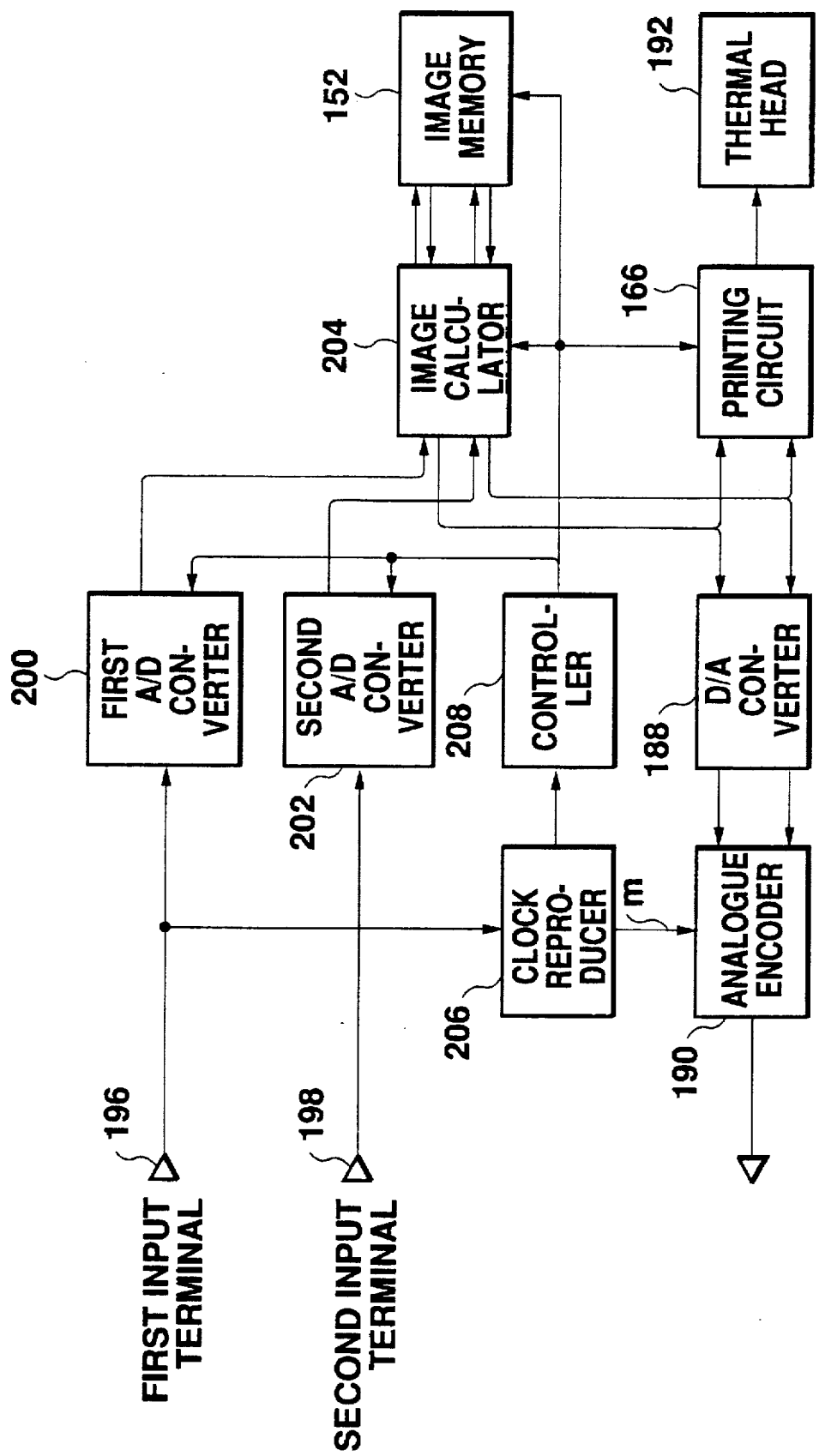
FIG. 11 is a block diagram showing an example of a signal processing apparatus for a video printer according to this invention.

In FIG. 11, the numerals designate respectively: 196 and 198, video signal input terminals; 200 and 202, A/D converters for encoding the video signal; 204, an image calculator for executing calculations on the image data; 206, a clock reproducer for generating a reference clock signals and synchronizing signals from the input video signals; 208, a controller for generating controlling data for the entire sequence control and partial control or control signals. The other components are the same as shown in the conventional apparatus, though the numerals are different.

Figure 12:
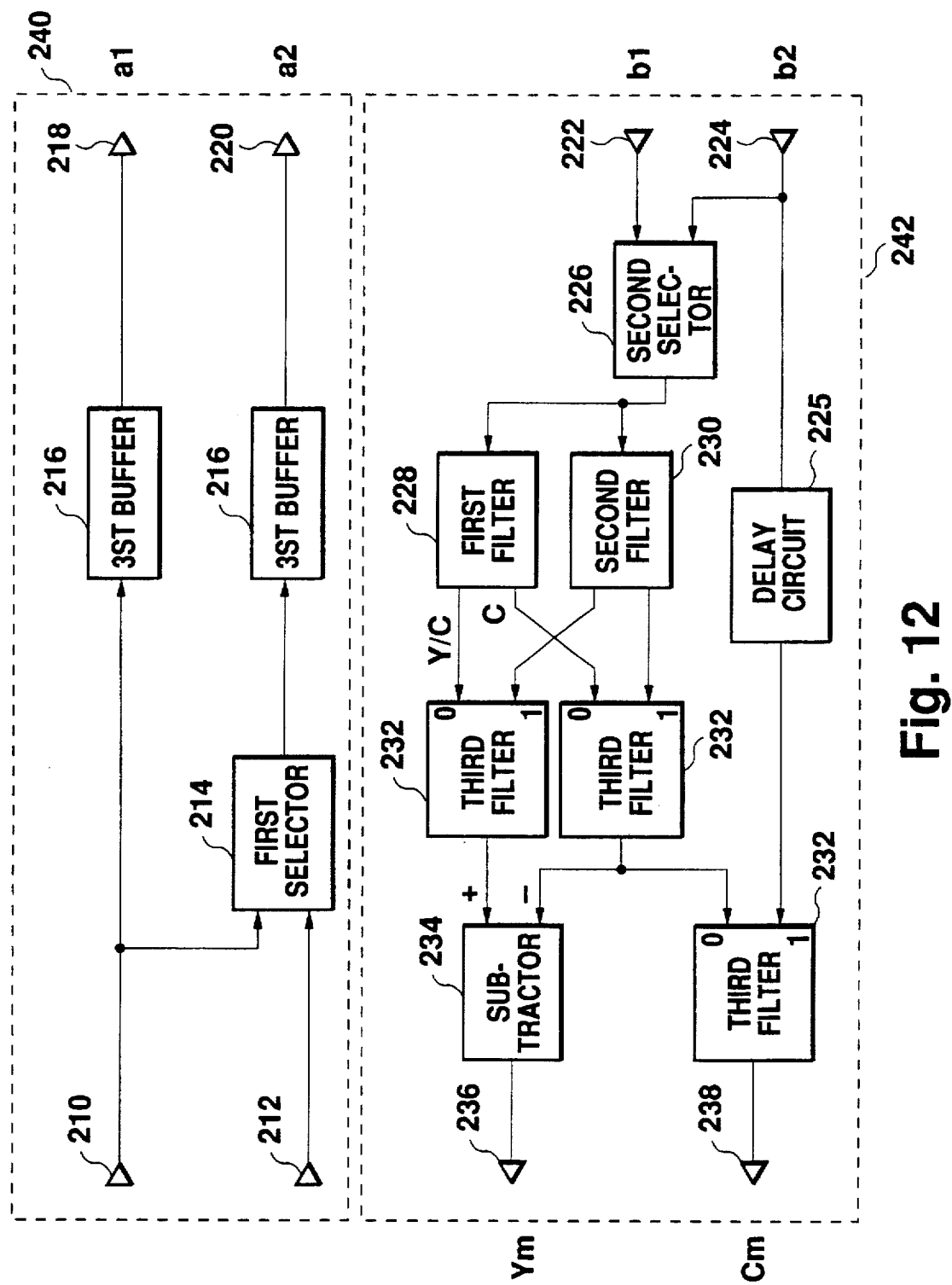
FIG. 12 is a block diagram showing an example of a image calculator according to this invention.

FIG. 12 shows an embodiment of the image calculator 204.

In FIG. 12, the numerals designate respectively: 210 and 212, video data input terminal; 214, 226 and 232, first-third selectors for selecting either one of the inputted data; 216,
3ST (three states) buffer; 218, 220, 222 and 224, connecting terminal with the image memory 152; 228, a first filter e.g. for extracting the color data from the video data; 230, a second filter e.g. for emphasizing the high-frequency band of the image; 238, a color data output terminal; 240, writing block of the image calculator; and 242, a read-out block of the image calculator.

Figure 13:
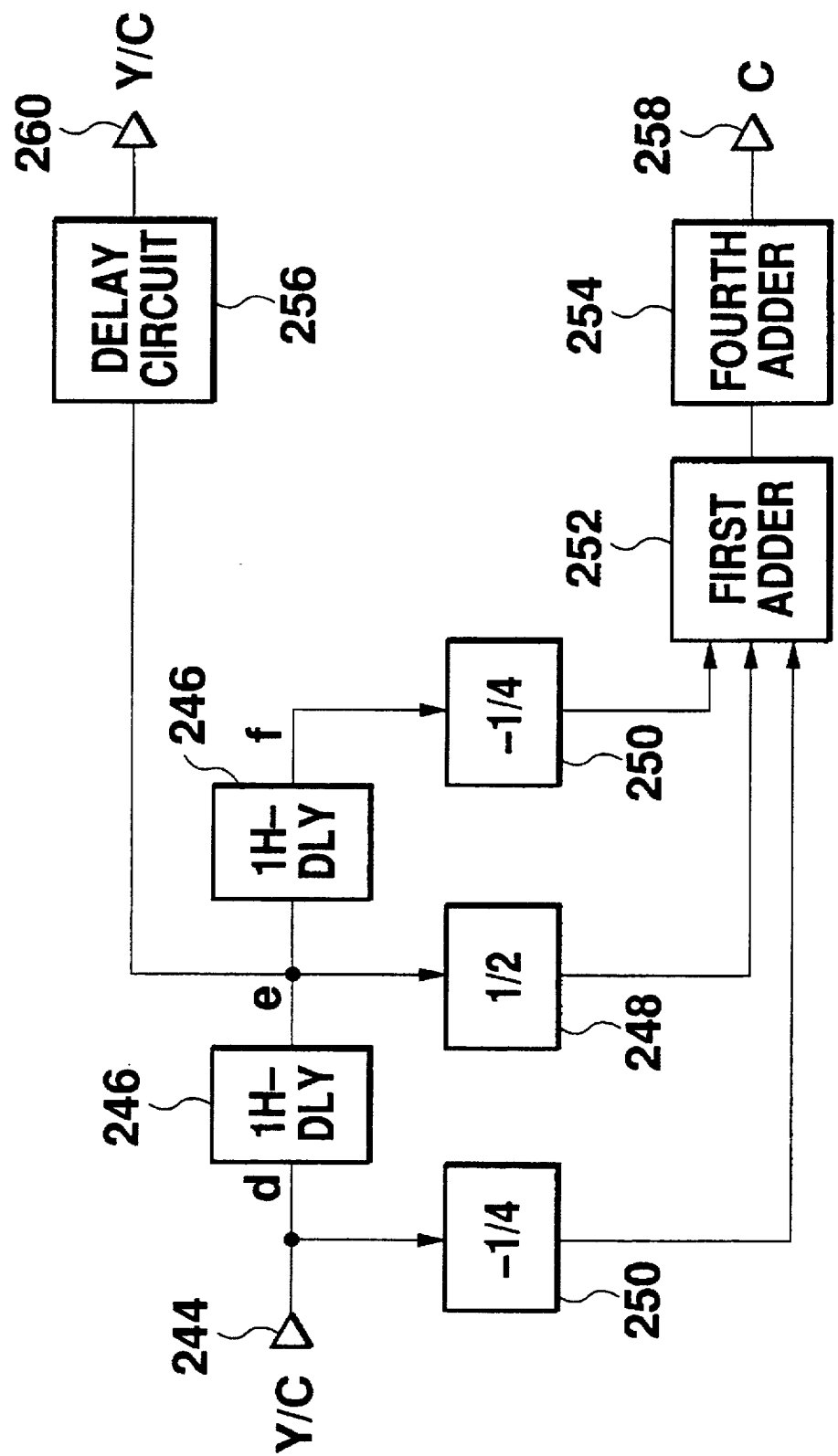
FIG. 13 is a block diagram showing an example of a filter for separating the color data and the brightness data from video data in conformity with NTSC standards according to this invention.

FIG. 13 shows an embodiment of the first filter 228 for extracting the color data from the video data.

In FIG. 13, the numerals designate respectively: 244, a video data input terminal; 246, a delay element for 1H (H: a time required for scanning one horizontal scanning line) (hereinafter referred as "1H-DLY"); 248, (1/2) multiplier; 250, (−1/4) multiplier; 252, a first adder; 254, a fourth filter having a band-pass property; 256, a delay circuit; 258, a color data output terminal; and 260, an output terminal for target video data having been timing-adjusted.

Figure 14:
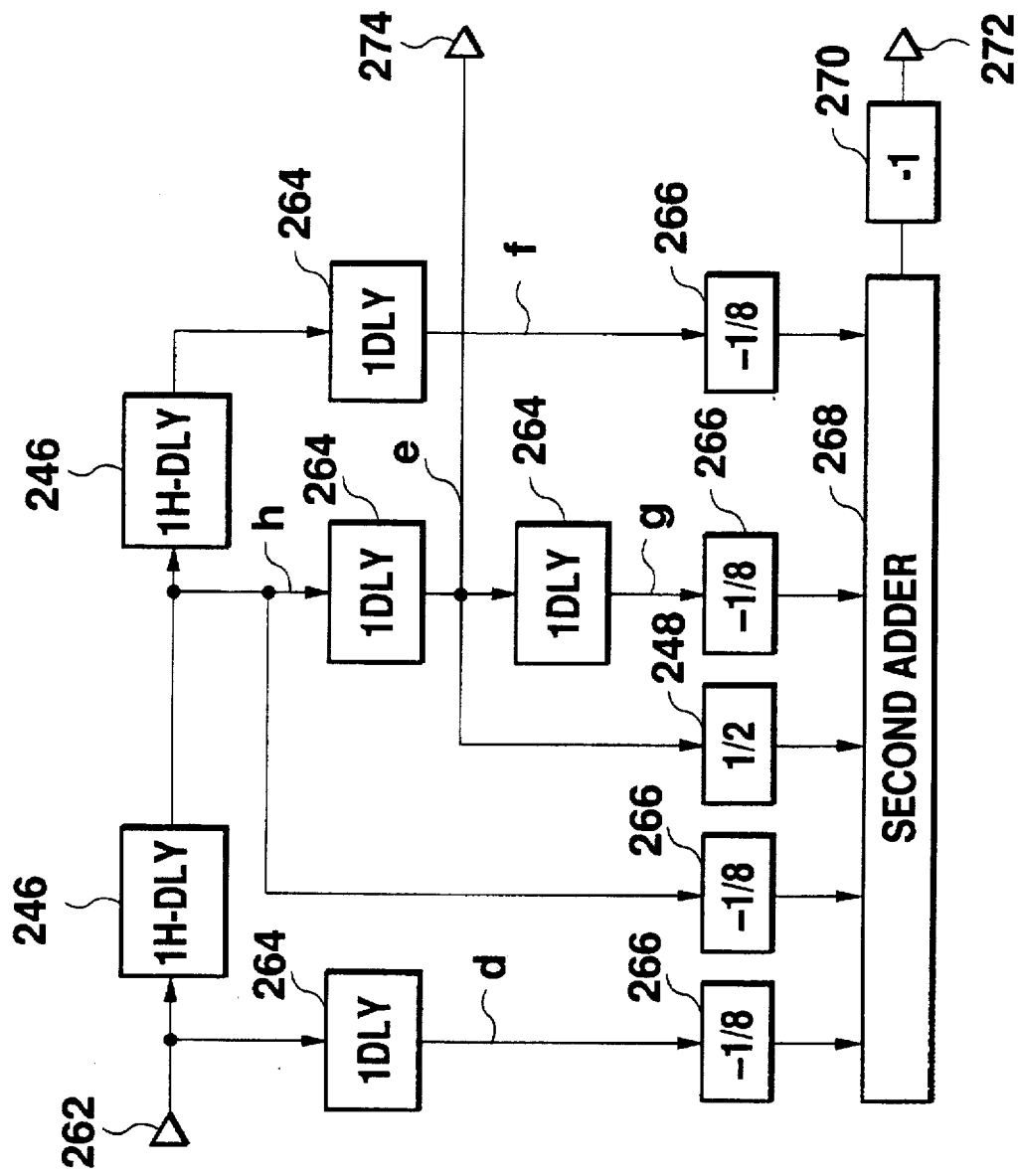
FIG. 14 is a block diagram showing an example of a filter for e.g. emphasizing the outline of an image according to this invention.

FIG. 14 shows an embodiment of the second filter 230 e.g. for emphasizing the outline of an image.

In FIG. 14, the numerals designate respectively: 262, an input terminal e.g. for brightness data; 264, a delay element for a pixel (hereinafter referred as 1DLY); 266, a (−1/8) multiplier; 268, a second adder; 270, a (−1) multiplier; 272, a output terminal for the calculated result; and 274, an output terminal for target brightness data having been timing-adjusted.

Figure 15:
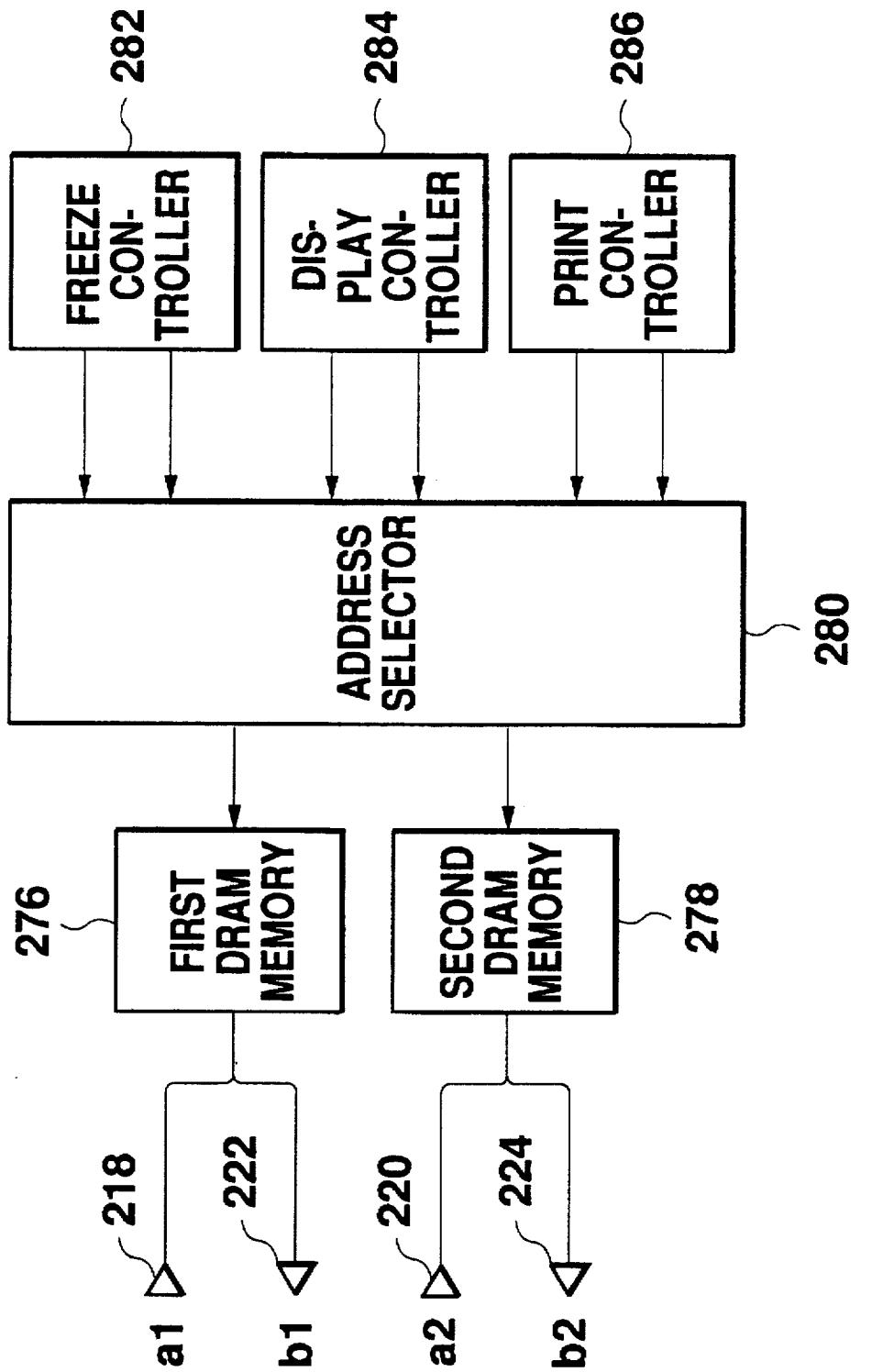
FIG. 15 is a block diagram showing an example of a general composition of an image memory according to this invention.

FIG. 15 shows an embodiment of the image memory 152.

In FIG. 15, the numerals designate respectively: 276 and 278, DRAM memories; 280, an address selector; 282, a freeze controller for controlling the address data for the freezing mode of the image; 284, a display controller for controlling the address of the display mode; and 286, a printing controller for controlling the addresses for the printing mode.

Since the printing circuit 116 has the same composition as that shown in FIG. 6, its description and illustration are omitted.

In operation, in the input mode of the image signal Y/C in conformity with NTSC method, the signal Y/C is inputted to the input terminal 196. The input signal Y/C is directly encoded to the first A/D converter 200. The conditions for this encoding operation are:

quantizing number of bits=8 bits, sampling frequency= 4*fsc (fsc: sub-carrier frequency=3.58 MHz)

pixel composition 768 (H)*480 (V).

The encoding data is called video data Y/C.

The video data Y/C are inputted to the input terminal 210 of the image calculator 204, and transferred to the image memory 152 through the first selector 214 and the 3ST buffer 216 from the coupling terminals 218, 220. These data are stored in the image memory 152 sequentially in a predetermined order from a predetermined address.

At this time, the address data of the freeze controller 282 are selected in the address selector 280 and inputted to the first DRAM memory 276 and the second DRAM memory 278. The video data Y/C are temporarily stored in either one of the first DRAM memory 276 or the second DRAM memory 278. Namely, the first DRAM memory 276 and the second DRAM memory 278 are controlled by the freeze controller 282. In this first input mode, it is possible to freeze at least two images.

In a second input mode where the input signal is composed of the brightness signal and the color signal, the brightness signal is inputted to the first input terminal 196 and directly encoded in the first A/D converter 200, while the color signal is inputted to the second input terminal 198 and directly encoded in the second A/D converter 202, so as to be brightness data Y and color data C respectively. The conditions for the encoding process are the same as in the case of the video signal Y/C.

The brightness data Y are inputted through the input terminal 210 of the image calculator 204, and transferred to the image memory 152 through the 3ST buffer 216 from the coupling terminal 218. Meanwhile, the color data C are inputted through the input terminal 212 of the image calculator 204, and transferred to the image memory 152 through the first selector 214 and the 3ST buffer 216 from the coupling terminal 220.

At this time, the address data of the freezing controller 282 are selected in the address selector 280 and inputted to the first DRAM memory 276 and the second DRAM memory 278. The brightness data Y and the color data C are temporarily stored in the first DRAM memory 276 and the second DRAM memory 278 in a predetermined order from a predetermined address for one screen simultaneously. Namely, in this second input mode, at least one image can be frozen.

Figure 18:
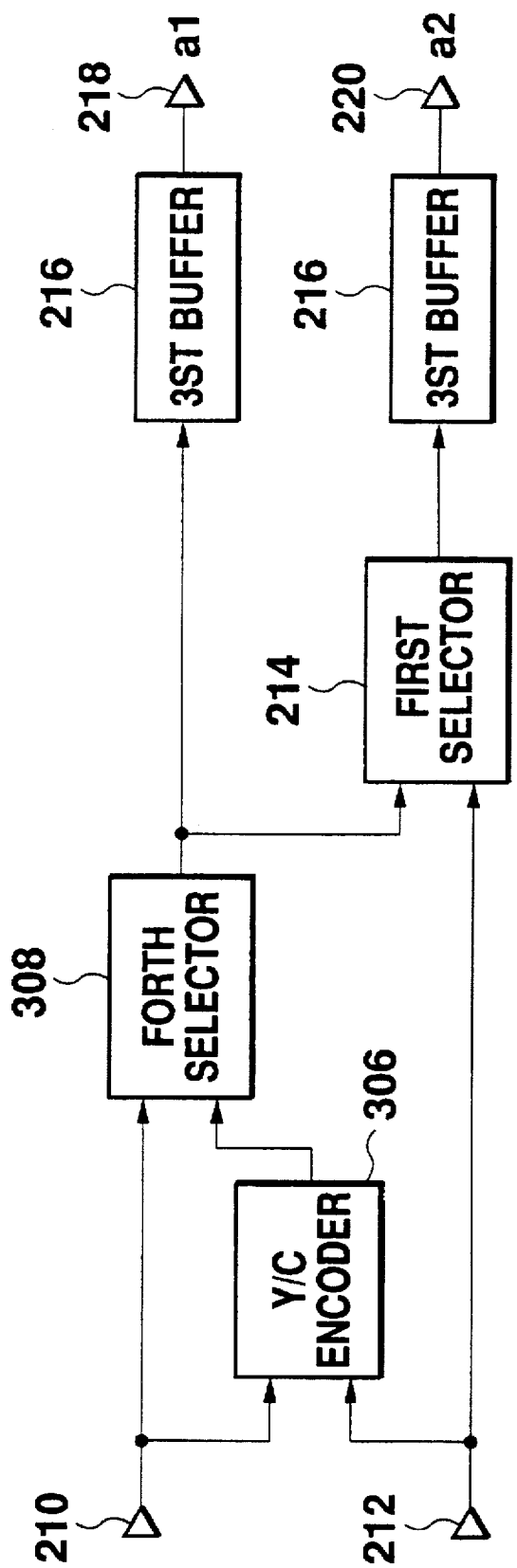
FIG. 18 is a block diagram showing an example of a writing block of an image calculator according to this invention.

Although in above-mentioned embodiment the image calculator 204 was composed as shown in FIG. 12, alternatively it can be composed as shown in FIG. 18.

FIG. 18 shows another embodiment of the writing block 240 of the image calculator 204. In FIG. 18, the numeral 306 designates a Y/C encoder for calculating the video data Y/C in conformity with NTSC from the brightness data Y the color data C, and the numeral 308 designates a fourth selector for selecting either one of the both inputs.

In operation of the first input mode, the video signal Y/C is directly encoded in the first A/D converter 200, and the encoded video data Y/C are inputted to the input terminal 210. The fourth selector 308 and the first selector 214 selects the video data Y/C, which will pass through the 3ST buffer 216 and are outputted from the coupling terminals 218, 220, and stored in the image memory 152 as aforementioned.

In operation of the second mode, the brightness and color signals are encoded in the first A/D converter 200 as in the aforementioned embodiment. The encoded data Y are inputted through the input terminal 210 shown in FIG. 18, while the color data C are inputted through the input terminal 212. The Y/C encoder 206 calculates video data Y/C in conformity with NTSC standards from the brightness data Y and the color data C.

When the fourth selector 308 selects the brightness data Y and the first selector 214 selects the color data C, the brightness data Y and the color data C are supplied to the image memory 152 from the coupling terminals 218 and 220 through the 3ST buffer 216.

At this time, the address data of the freeze controller 282 in FIG. 15 are selected in the address selector 53 and inputted to the first DRAM memory 276 and to the second DRAM memory 278, and temporarily stored therein from a predetermined address in a predetermined order.

Also, when the fourth selector 308 selects the output video data Y/C of the Y/C encoder 91, the video data Y/C are transferred from the coupling terminals 218 and 220 to the image memory 336 through the 3ST buffer 328, and are stored therein from a predetermined address in a predetermined order.

At this time, the address data of the freeze controller 282 in FIG. 15 are selected in the address controller 280 and inputted to the first DRAM memory 276 and second DRAM memory 278. The video data Y/C are stored in either of the first DRAM memory 276 or the second DRAM memory 278.

Namely, by composing the writing block 240 of the image calculator 204 as shown in FIG. 18, it becomes possible to select either of the case where the input data comprises the brightness data Y and the color data C or the case where the video data Y/C are calculated and stored. Here, the video data Y/C are compressed to ½ of the sum of the brightness data Y and the color data C.

With the above operation, the freezing mode of the desired image terminates.

Then, the output of the 3ST buffer 216 is turned off.

When the freezing data of the image memory 152 is the video data Y/C, this video data Y/C are read under the address control by the display controller 284 in FIG. 15, and transferred to the image calculator 204.

The second selector 226 selects either of the video data Y/C of the first DRAM memory 276 inputted from the input terminal 222 of the image calculator 204 or the video data Y/C of the second DRAM memory 278.

The selected video data Y/C are delayed in the 1H-DLY 246 of the first filter 228 shown in FIG. 13 to become data f, e, and d. These data are put into calculation in (1/2) multiplier 248 and the (−1/4) multiplier 250. The adder 252 executes the calculation s=0.5*e−0.25(d+f) to eliminate the unnecessary component except the color data C from the data s row by the fourth filter 254 having a band-pass property. The output data are outputted from the output terminal 258 as color data C, while the "e" is timing-adjusted in the delay circuit 256 to be outputted as target video data Y/C from the output terminal 260 to the third selector 232. Thus outputted video data Y/C and the color data C are selected in the third selector 232, and the subtractor 234 executes the calculation Ym=Y/C−C. With this operation, the brightness data Y/color data C separating process terminates. And, the brightness data Ym and the color data Cm are outputted from the output terminals 236 and 238 respectively. Namely, the image calculator 204 separates the brightness data Ym and the color data Cm from the video data Y/C having been temporarily stored video data Y/C.

Meanwhile, when the freezing data of the image memory 152 are comprised of the brightness data Y and the color data C, the brightness data Y are read from the DRAM 276 under address control by the display controller 284 (b1) and the color data C are read from the second DRAM memory 278 (b2), and the both data are transferred to the image calculator 204.

The second selector 226 of the image calculator 204 shown in FIG. 12 selects the brightness data Y supplied through the coupling terminal 222 and transfers them to the second filter 230.

The selected brightness data Y are delayed in the 1H-DLY 246 and the 1DLY 264 to become data d, e, f, g, and h. These data are put into calculation in the (1/2) multiplier 248 and the (−1/8) multiplier 266. The adder 252 executes the calculation s=0.5*e−0.125(d+f+g+h ), and the (−1) multiplier 270 outputs (−s) from the output terminal 272 and outputs "e" as target brightness data Y through the output terminal 274. The third selector 232 selects the input "1" side when the read data are comprised of the brightness data Y and the color data C. The brightness data Y and (−s) outputted from the filter 230 are selected in the third selector 232, and put into the calculation Ym=Y−(−s ) in the subtractor 234 and thereafter outputted through the output terminal 236. On the contrary, the color data C outputted through the coupling terminal 274 are timing-adjusted in the delay circuit 225 and outputted as data Cm through the third selector 232 from the output terminal 238. Namely, the image calculator 204 has emphasized the outline of the brightness data Y temporarily stored in the image memory 152.

With the above-mentioned operation of the image calculator 204, the brightness data Ym and the color data Cm having been separated from the video data Y/C, or the brightness data Ym and the color data Cm having been outline-emphasized are obtained. These brightness data Ym and the color data Cm are restored to analog signals in the D/A circuit 188. The encoder 190 generates video signal Y/C and outputs as monitor signal. By adding a synchronizing signal (m) reproduced in the clock reproducer 206 or the like thereto, a video signal being in conformity with NTSC standards can be obtained. This is the description of the display mode.

The description for the printing mode is omitted because of being the same as the aforementioned embodiment according to FIGS. 7 and 8.

Figure 16:
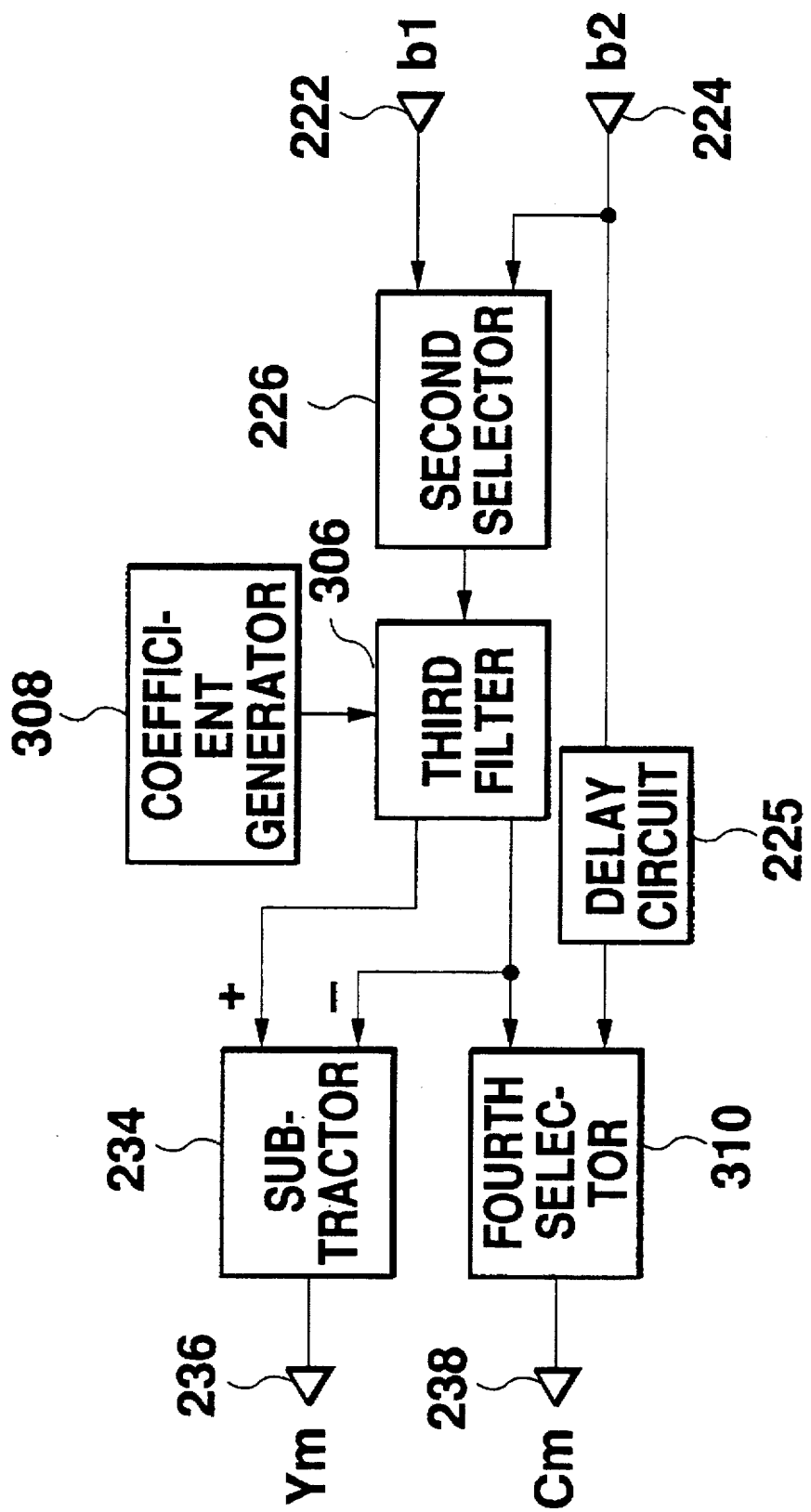
FIG. 16 is a block diagram showing an example of a read-out block of an image calculator according to this invention.

Although the image calculator 204 has been composed as shown in FIG. 12, alternatively it is also possible to adopt the composition shown as FIG. 16.

In FIG. 16, the numerals designate respectively: 306, a third filter; 308, a coefficient generator; and 310, a fourth selector for selecting either one of the two inputs.

Figure 17:
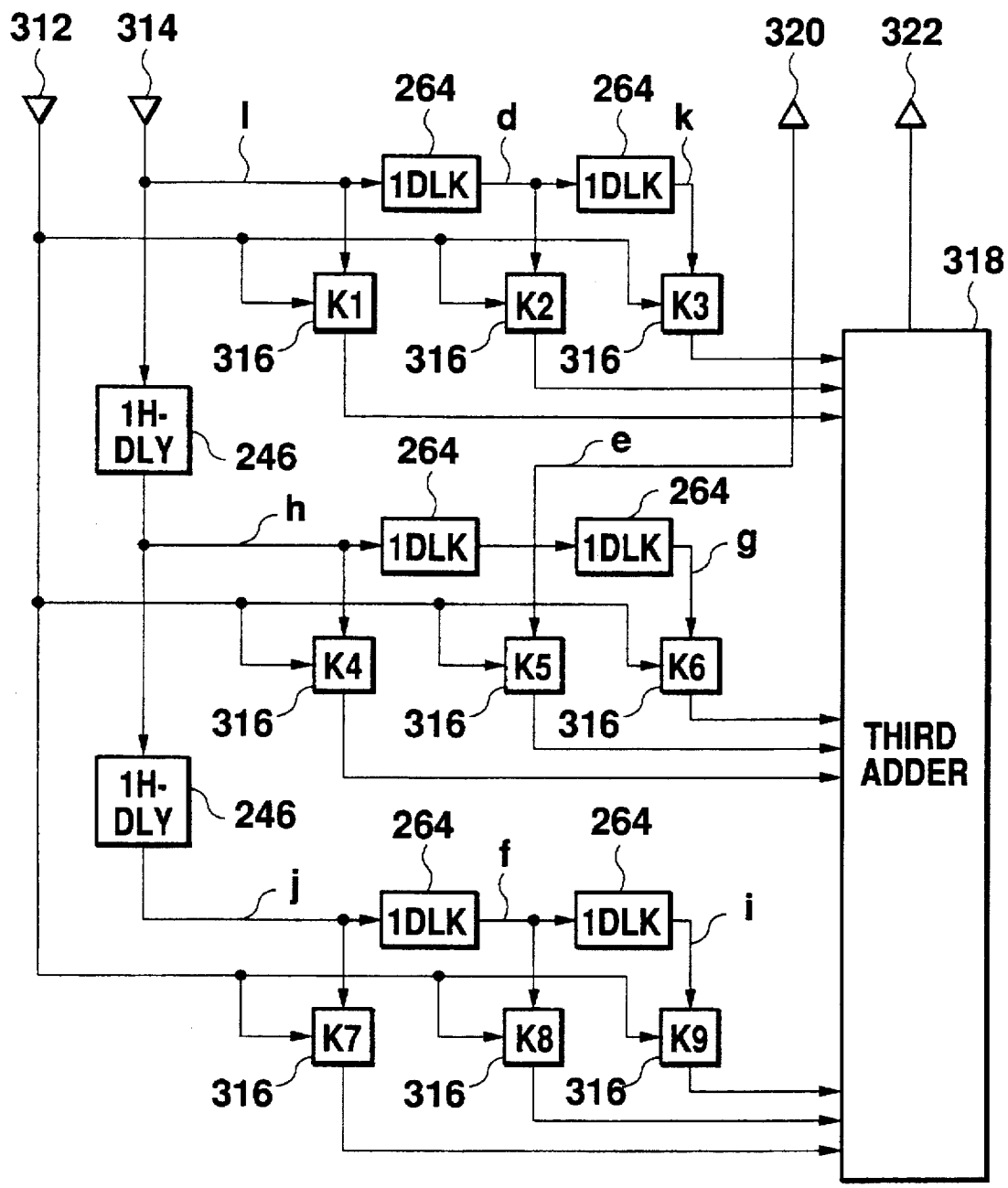
FIG. 17 is a block diagram showing an example of a filter capable of designating a coefficient according to this invention.

FIG. 17 shows an embodiment of the third filter 306. In FIG. 17, the numerals designate respectively: 312, an input terminal of a multiplying coefficient from the coefficient generator 308; 314, an input terminal for the video data Y/C or the brightness data Y; 316, a multiplier for designating the multiplying coefficients (K1–K9) by the coefficient generator 308; 318, a third adder; 320, an output terminal for a target pixel; 322, an output terminal for the added result of the third adder 318.

The operation of the image generator 204 will be now explained, and explanation of the other components are omitted because of being the same as in the aforementioned embodiment.

The video data Y/C read out from the image memory 152 are input to the input terminal 81 of the third filter 306 through the second selector 226. The video data Y/C are converted into data d, e, f, g, h, i, j, k, l in the 1H-DLY 246 and the 1DLK 264. A signal supplied through the input terminal 312 designates the multiplying coefficients K1–K9. And, the multiplier 316 and the third adder 318 execute the following calculation:

$$s = K1*1 + K2*d + K3*k + \\ K4*h + K5*e + K6*g + \\ K7*j + K8*f + K9*i.$$

If the third filter 306 has the same property as the first filter 228, the multiplying coefficient are usually set but not limited to the following lists.

K1=0
K2=−¼
K3=0
K4=0
K5=½
K6=0
K7=0
K8=−¼
K9=0

The calculated result s is outputted as the color data C through the output terminal 322, and the result e is outputted as the target video data Y/C through the output terminal 320.

The subtractor 234 executes the calculation Ym=Y/C−C to provide the video data Y/C and the color data C, and outputs as color data Cm through the output terminal 238.

Meanwhile, when the brightness data Y and the color data C are read from the image memory 152, the brightness data Y inputted through the input terminal are inputted to the input terminal 314 of the third filter 306 through the second selector 226. The brightness data Y are converted into data d, e, f, g, h, i, j, k, l in the 1H-DLY 246 and the 1DLK 264. Signals supplied through the input terminal 312 designate the multiplying coefficients K1–K9 of the multiplier 316. And the multiplier 316 and the third adder 318 execute the calculations $$S = K1*1 + K2*d + K3*k + \\ K4*h + K5*e + K6*g + \\ K7*j + K8*f + K9*i.$$

The multiplying coefficients are set, but not limited, as follows when the property of the third filter 306 is the same as in the filter 228 in FIG. 13:

K1=0
K2=
K3=0
K4=⅛
K5=
K6=⅛
K7=0
K8=⅛
K9=0

The calculated result s, and the "e" as a target brightness data Y are outputted through the output terminal 322. The subtractor 234 executes the calculation Ym=Y−s and outputs this brightness data Ym through the output terminal 236, while the fourth selector 310 receives the color data C having been inputted through the coupling terminal 224 and timing-adjusted in the delay circuit 225 to output as color data Cm through the output terminal 238.

The subsequent operations are the same as in the display mode and the printing mode of the aforementioned embodiment.

Although in the shown embodiment the first filter 228 has been composed as shown in FIG. 13, alternatively it is also possible to adopt any other technique capable of separating the brightness data and the color data from the video data.

Also, other types of filters than that of the second filter 230 for outline emphasis, such as filters which performs image smoothing or noise elimination for the brightness data Y, can be used.

Further, other types of the third filter 306 than that in the shown embodiment, having a desired composition and coefficient can be used.

Furthermore, the delay means is not essential because it can be replaced by the equivalent function of the read address signal of the memory.

As mentioned above, according to this invention, the signal processing apparatus can provide a full-colored hardcopy image corresponding to both of the input video signal in conformity with the NTSC standards and the input video signal separated into the brightness signal and the color signal by a single encoding operation. As a result, it is possible to realize an economic printing apparatus having a signal processing section easy to be composed as a LSI and a high-quality image.

Figure 19:
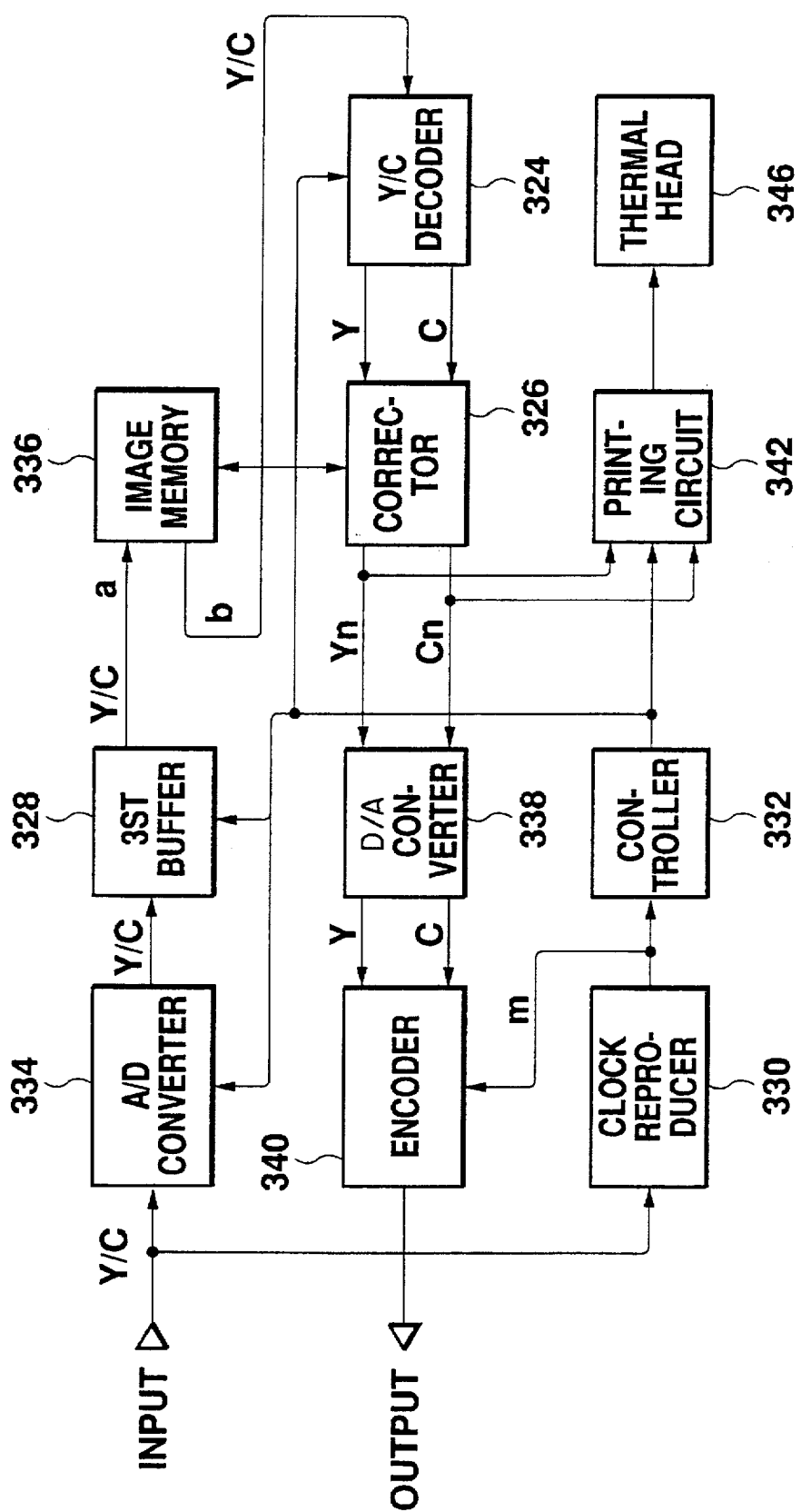
FIG. 19 is a block diagram showing an example of a signal processing apparatus for a video printer according to this invention.

FIG. 19 shows a signal processing apparatus for a video printer according to another embodiment of this invention.

In FIG. 19, the numerals designate respectively: 324, a Y/C decoder for separating video data Y/C into brightness data Y and color data C; 326, a corrector for correcting both of these data by calculation for a desired image; 328, a 3ST output buffer; 330, a clock reproducer for reproducing synchronizing signal or reference clock signal; and 332, a controller for controlling the entire sequence of the apparatus or the controlling data of the components. The components similar to those in the aforementioned embodiments are omitted to be described.

Figure 20:
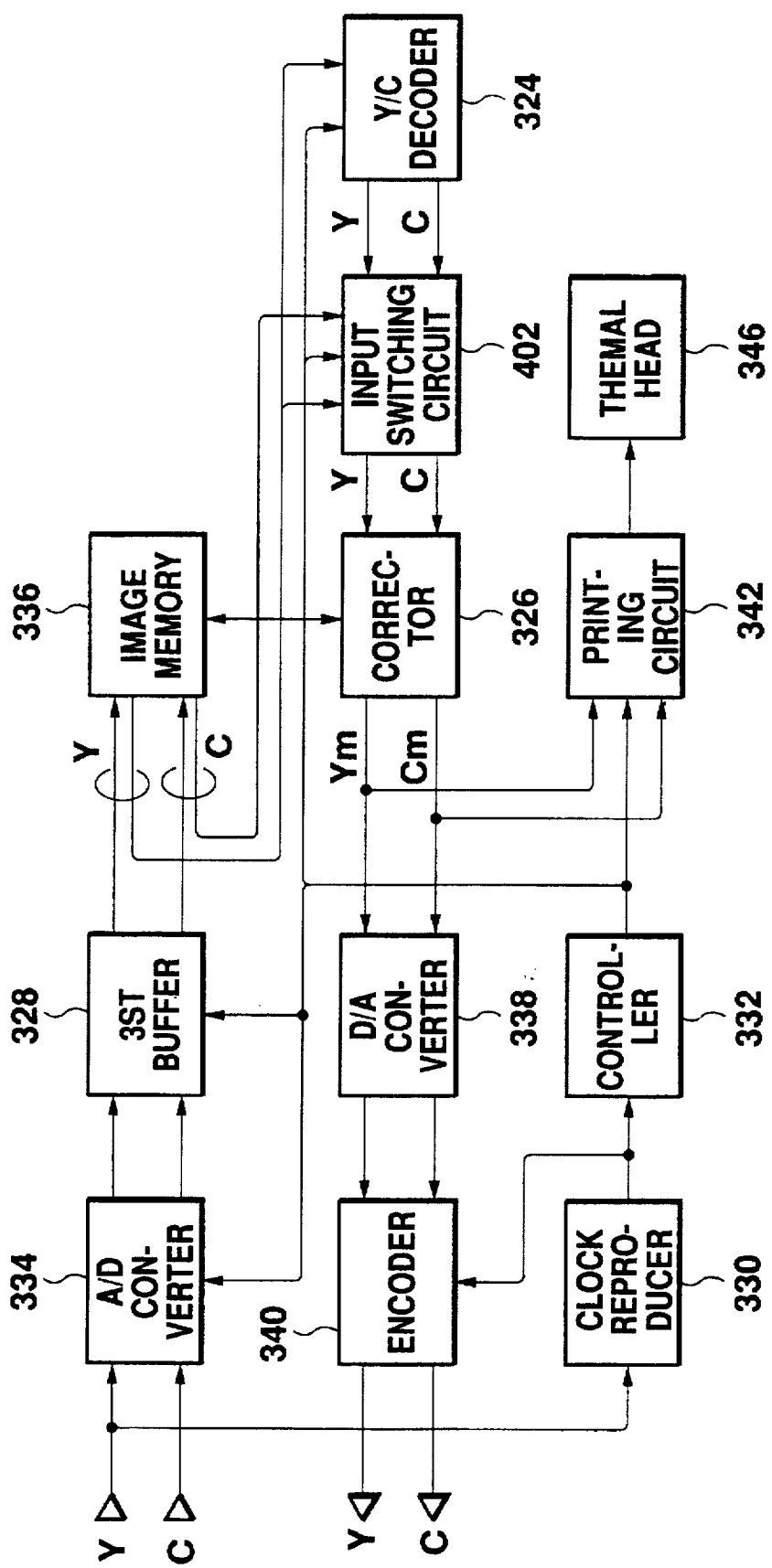
FIG. 20 is a block diagram showing an example of a signal processing apparatus for a video printer according to this invention.

FIG. 20 is a block diagram showing a signal processing apparatus according to another embodiment of this invention.

In FIG. 20, the numeral 402 designates an input switching circuit for changing the data transmitting path depending on the cases of inputting video signal Y/C or inputting two separate signals. The other components are the same as those in FIG. 19.

In operation, the separate input analog compound (i.e., composite) video signals Y and C are encoded in the A/D circuit 334 respectively. These encoded data pass through the 3ST buffer 328 and transferred to the image memory 336, and written in a predetermined position under the address control by the freeze controller 388. Upon completion of the same process for one screen, the freezing mode terminates.

The input switching circuit 402 for the correcting mode and the printing mode selects and outputs the data read from the image memory 336. The encoder 340 adds a synchronizing signal to the restored video signal Y, and outputs this along with the color signal C. The other operations are the same as aforementioned embodiments and omitted to be described.

In this embodiment, the Y/C decoder and the corrector etc. can be composed in any other form than in the shown embodiment in accordance with the function and the purpose.

Further, the functions of 3ST buffer 321 can be integrated into the A/D circuit 334.

As mentioned above, according to this invention, it is possible to provide a full-color hard-copy image by only a single encoding operation, with a high image quality and a signal processing section easy to be formed in LSI.

Figure 21:
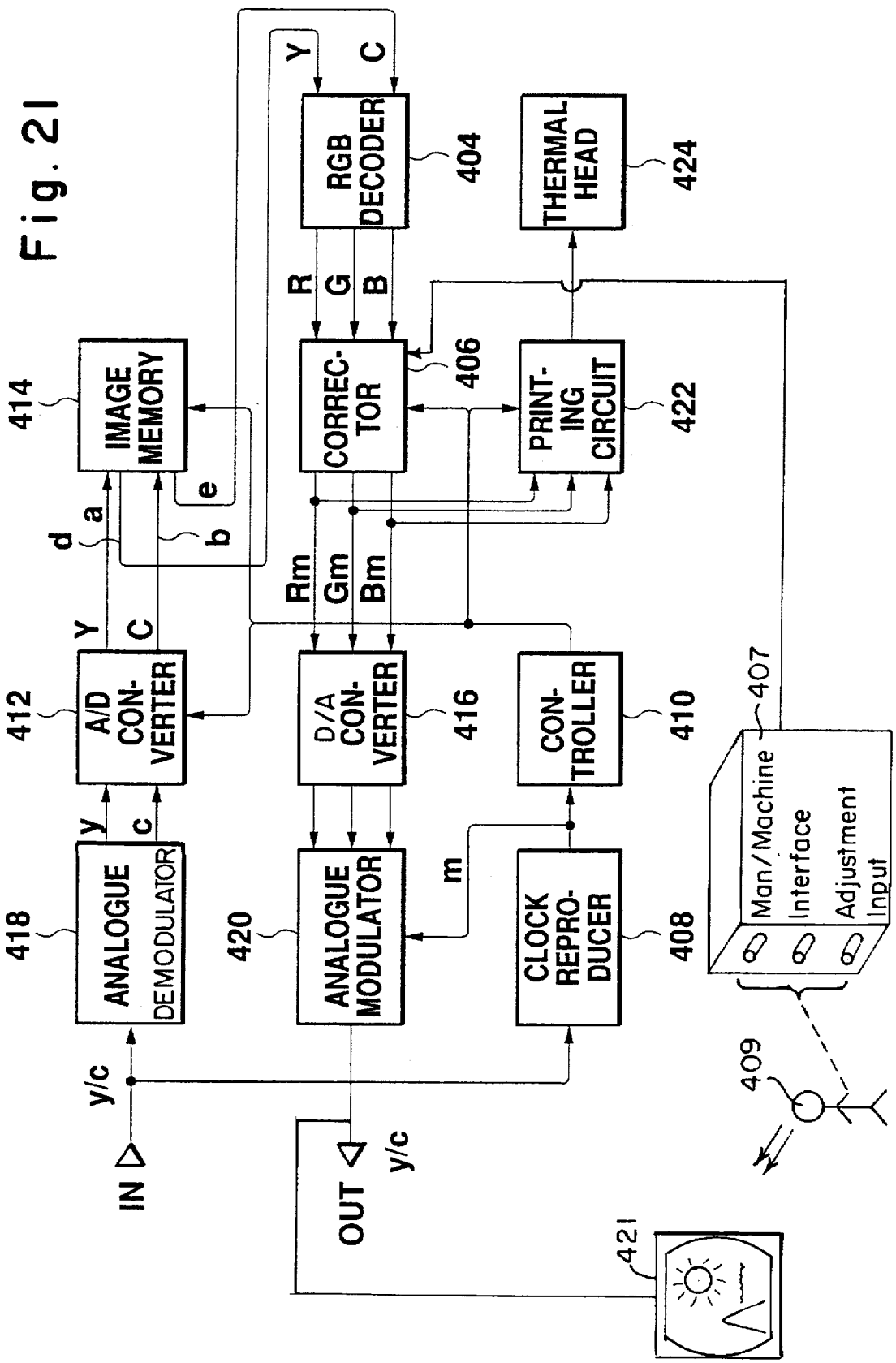
FIGS. 21, 26 and 27 are block diagram showing examples of a signal processing apparatus for a video printer according to this invention.

FIG. 21 is a signal processing apparatus for a video printer according to another embodiment of this invention. In FIG. 21, the numerals designate respectively: 404, a RGB decoder for restoring RGB image data; 406, a corrector for regulating the contrast, the hue, and the saturation of the RGB data; 408, a clock reproducing circuit for reproducing a synchronizing signal and a reference clock signal from input video signal; and 410, a controlling circuit for controlling the sequence of the entire apparatus or for generating controlling data for the parts or the controlling signals. The other components are the same as those shown in the aforementioned embodiments.

Figure 22:
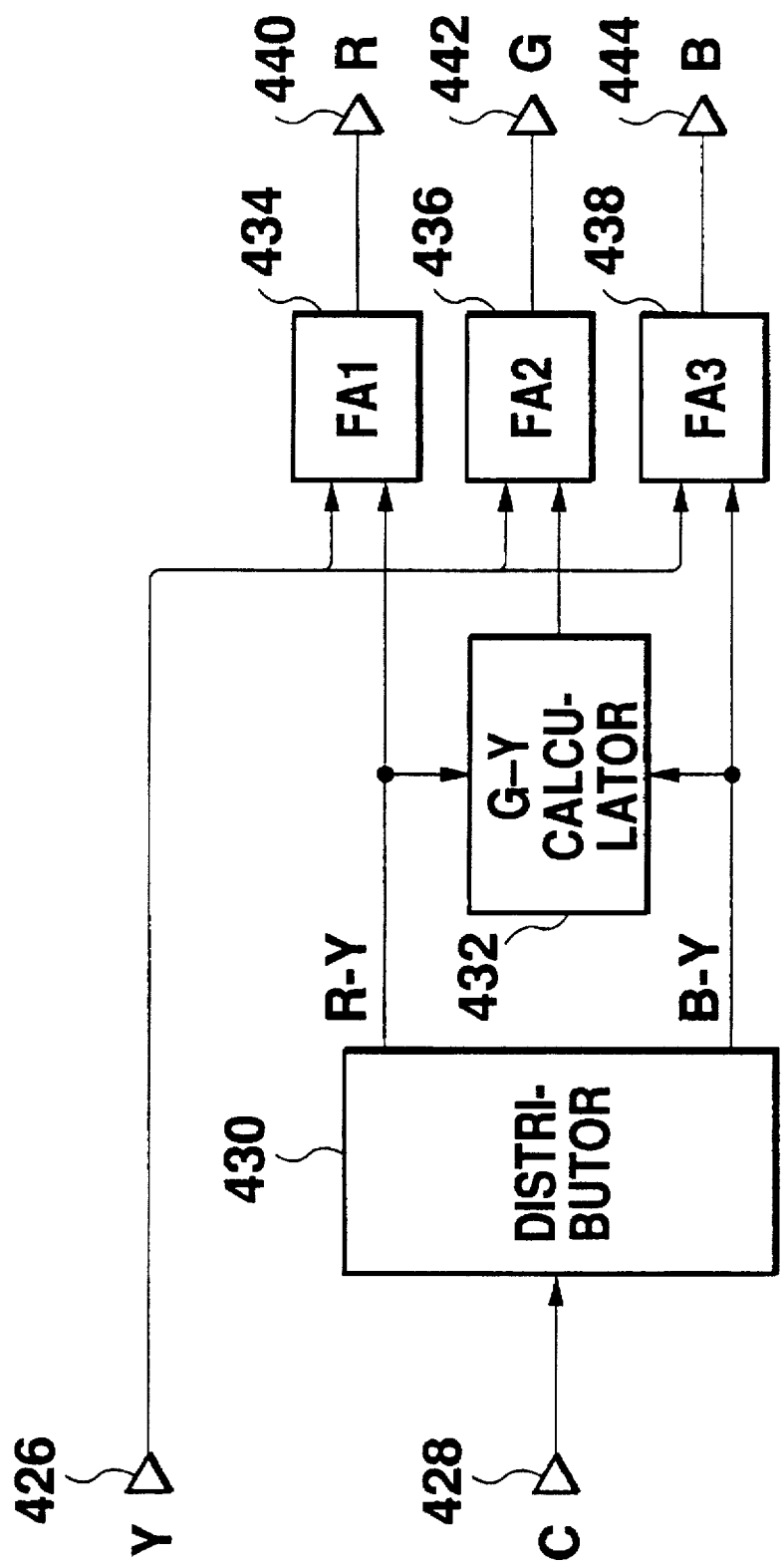
FIG. 22 is a block diagram showing an example of a composition for calculating the RGB data from the brightness data and the color data.

FIG. 22 shows an embodiment of the RGB decoder 404. In FIG. 22, the numerals designate respectively: 426, an input terminal of the brightness data Y; 428, an input terminal of the color data C; 430, a distributor for separating color difference data R-Y and B-Y from the color data C; 432, a G-Y calculator for calculating the color difference data G-Y; 434-438, first-third full-adder (hereinafter referred as FA1-FA3); 440-444, output terminals for the RGB data.

Figure 23:
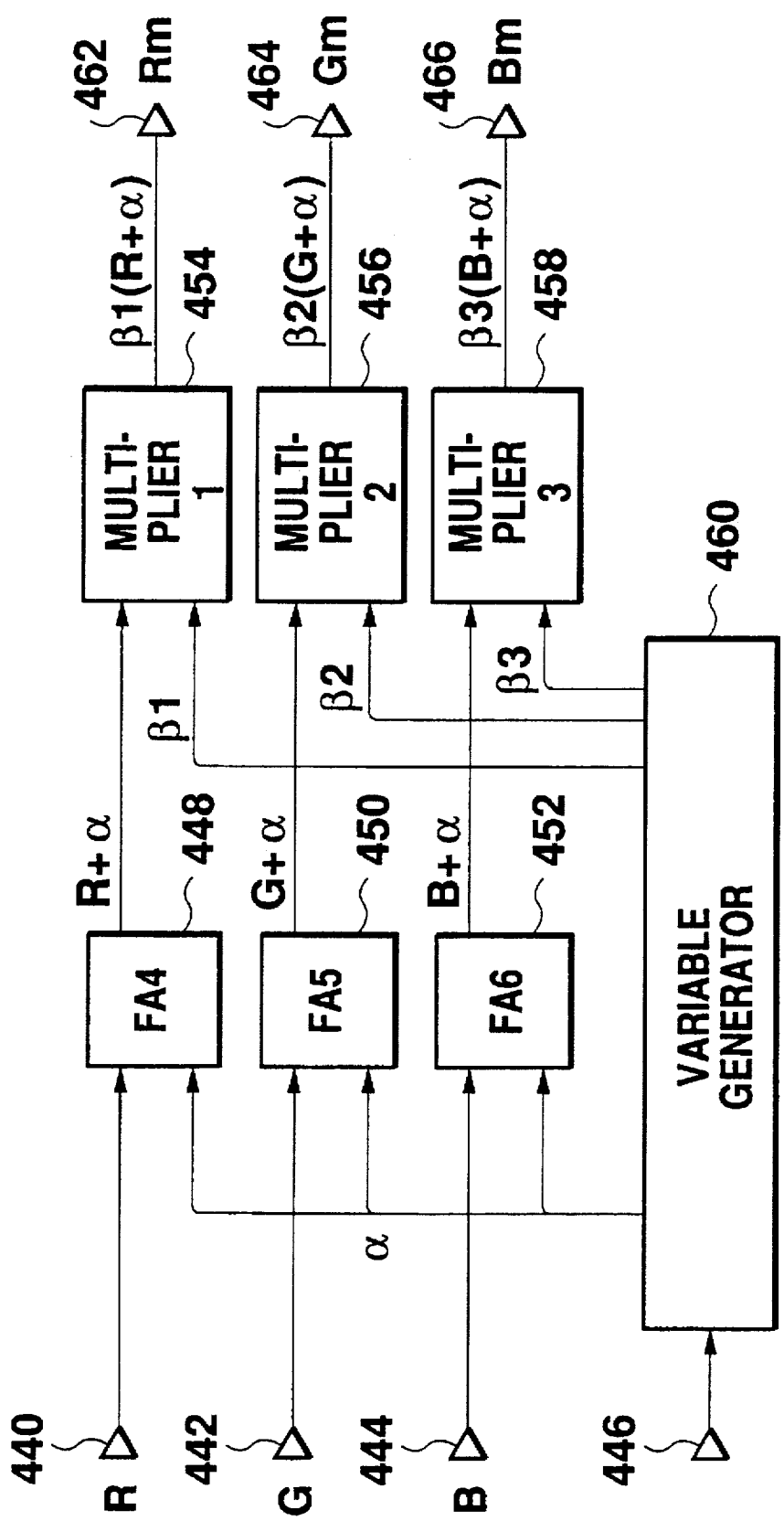
FIG. 23 is a block diagram showing an example of a composition for converting the RGB data into correcting data with a desirably regulated image quality.

FIG. 23 shows an embodiment of the corrector 406. In FIG. 23, the numerals designate respectively: 446, an input terminal of the correcting data; 448-452, FA4-FA6; 454-458, first-third multipliers; 460, a variable generator for outputting an added value and the multiplying coefficients (1, 2, 3); 462-466, output terminals of the correcting data (Rm, Gm, Bm).

Figure 24:
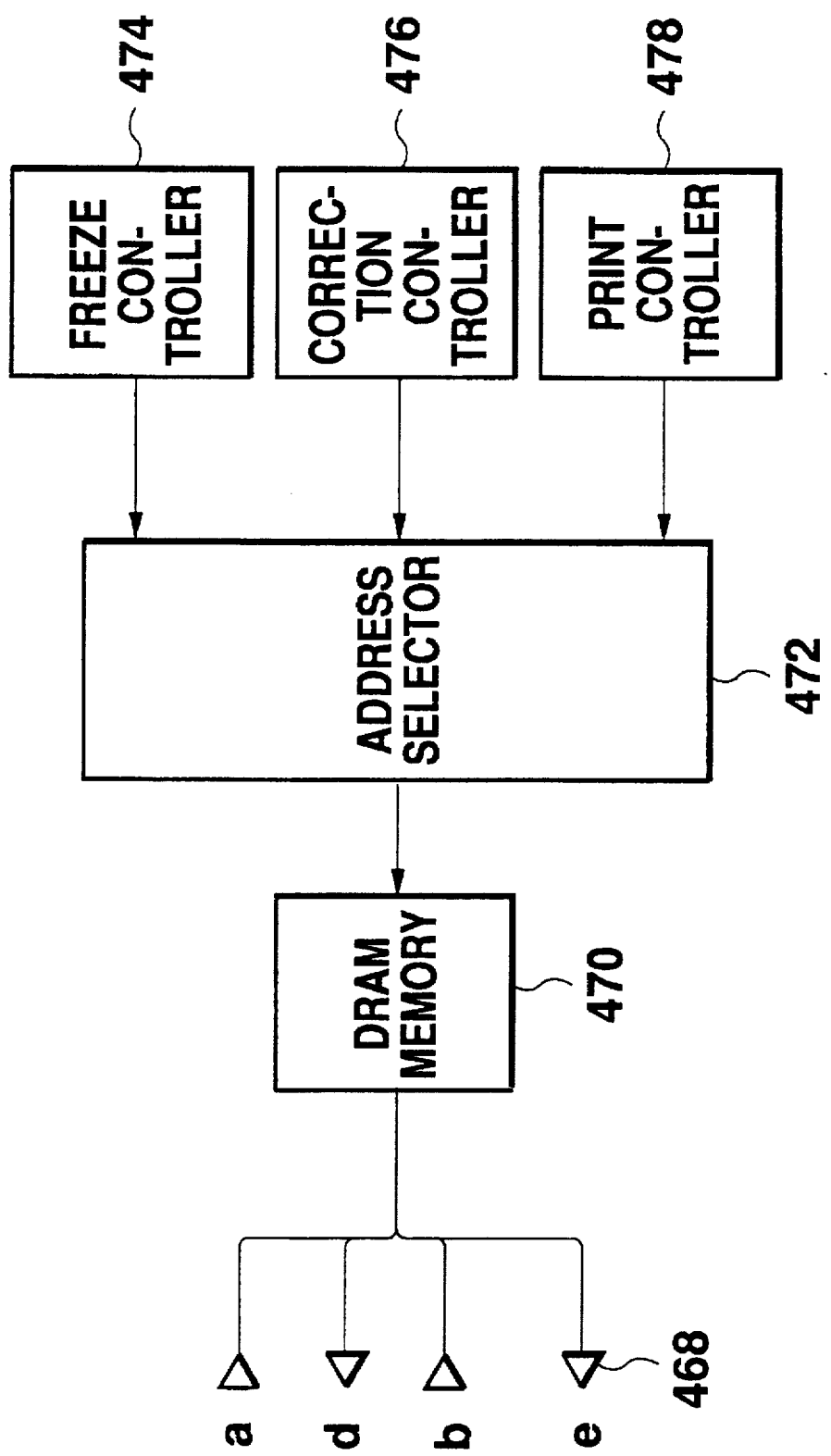
FIG. 24 is a block diagram showing an example of an image memory according to this invention.

FIG. 24 shows an embodiment of the image memory 414. In FIG. 24, the numerals designate respectively: 468, an input/output terminal for the brightness data and the color data; 470, a DRAM memory; 472, an address selector; and 474-478, controllers for generating address signals for freezing process, correcting process, and printing process.

Figure 25:
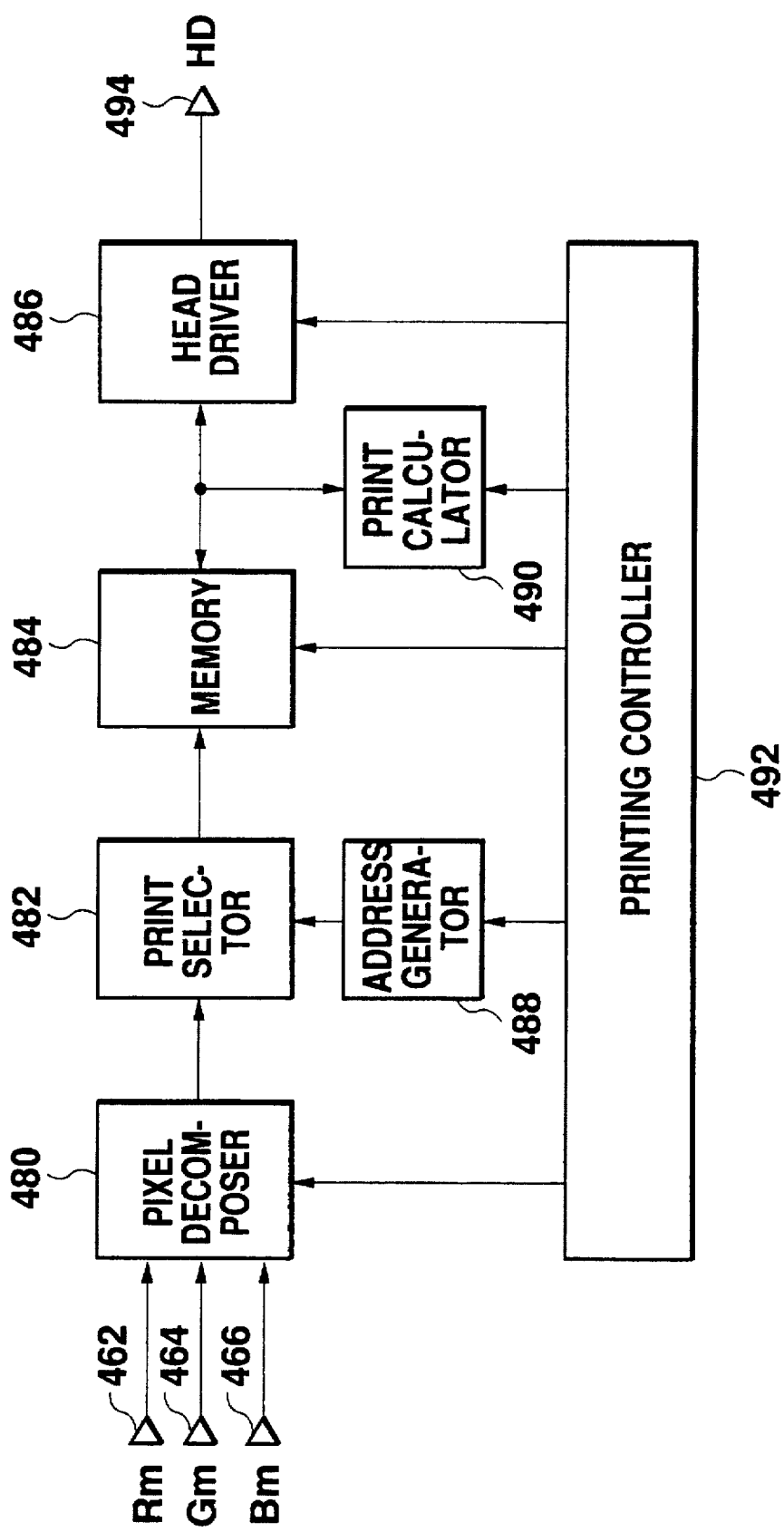
FIG. 25 is a block diagram showing an example of a printing circuit according to this invention.

FIG. 25 shows an embodiment of the printing circuit 422. In FIG. 25, the numerals designate respectively: 480, a pixel decomposer for color conversion; 482, a printing selector; 484, a memory composed of SRAM and ROM; 486, a head driver; 488, an address generator for printing process; 490, a printing calculator; 492, a printing controller; and 494, an output terminal for head data HD.

In operation, the input analog video signal y/c is separated into the brightness signal y and the color signal c. The separated signals y, c are encoded in the A/D circuit 412 to become brightness data Y and color data C respectively. The encoding condition of: quantized number of bits=8 bits, sampling frequency=4*fsc (fsc: sub-carrier=3, 58 MHz), pixel composition 768 (H)*480 (V), etc..

The brightness data Y (a) and the color data C (b) are stored in the image memory 414 from a predetermined position in a predetermined order. At this time, the address selector 472 selects an address signal of the freeze controller 472 and supplies it to the DRAM memory 470. Namely, the DRAM memory 470 is under the control of the freeze controller 474. Upon completion of the storing process for one screen, the freezing process for the brightness data Y and the color data C terminates.

To shift to the next mode, the output of the A/D converter 412 is turned off of the three states.

The freezing data of the image memory 414 are read under the address control of the correcting controller 476 generally in conformity with the operation of the video signals, and transferred to the RGB decoder 404 as data (d) and (e). The brightness data Y and the color data C having been inputted to the input terminal 426, 428 of the RGB decoder 404 shown in FIG. 22 are supplied to the first-third FAs 434-438 and the distributor 430 respectively. The distributor 430 separates color difference data R-Y, B-Y from the color data C, and distributes them. At this time, the following formula etc. are used: Y=0.3*R+0.59*G+0.11*B. These color difference data and the brightness data are supplied to the first-third FAs 434-438 which calculate the original RGB data. This original RGB data are then transferred to the correcting circuit 406. In FIG. 23, the fourth-sixth FAs 448-452 receive R, G, B data and a variable value α, and output the added results of R+α, G+α, B+α. These added results are transmitted to the first -third multipliers 454-458 to be multiplied by separately input multiplying coefficients β1, β2, and β3 and are outputted to the terminals 462-466 as data Rm, Gm, and Bm. The above-mentioned variable value enables the user to control the contrast of the RGB data by using positive and negative values. The multiplying coefficients β1, β2, and β3 enable the user to adjust the hue or the saturation using the different values. These variable values and multiplying coefficients are generated output from the variable generator 460 in accordance with the data instructions by the controller 400. The variable generator 460, however, is not an essential component. The controller 410 performs the same function as equal thereto.

The corrected data are transferred to the D/A converter 416 and restored to the analog signals. The analog modulator 420 generates and outputs a monitor video signal y/c from the restored signal to video monitor 421. At this time, a synchronizing signal (m) reproduced in the clock reproducer 408 etc. is added thereto to provide a video signal in conformity with NTSC standards. The operator 409, referring to this monitor video, can change the correcting data of the controller having a man/machine interface 407, and executes correcting process in the correcting circuit 406 to obtain desired image quality. This correcting operation is carried out in the video section within a synchronizing signal period.

With the above-mentioned correcting process, corrected data Rm, Gm, and Bm adjusted to desired image qualities are obtained. This is the general description on the correcting mode.

With respect to the printing mode, the description will be omitted because of being the same as in the aforementioned embodiments.

Figure 26:
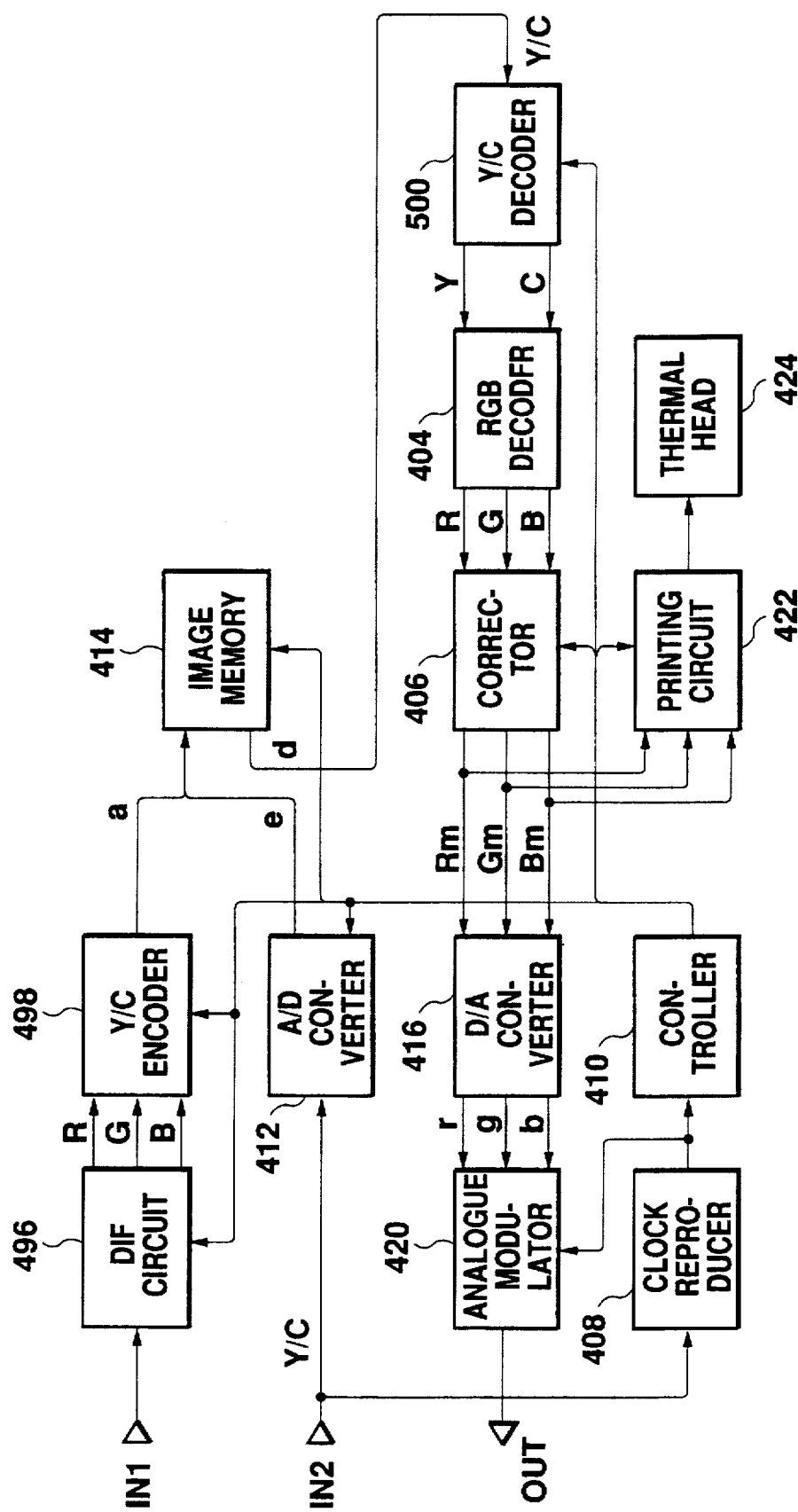

FIG. 26 shows a signal processing apparatus for a video printer according to another embodiment of this invention, where an inputted video signal y/c is directly encoded. In FIG. 26, the numeral 496 designates a DIF circuit for performing digital interface with external apparatuses. The other components are the same as shown in FIG. 21.

In operation, RGB image data inputted through the terminal IN1 are received by DIF circuit 496 and transferred to the Y/C encoder 498 as parallel RGB data. The Y/C encoder 498 generates video data Y/C.

Figure 27:
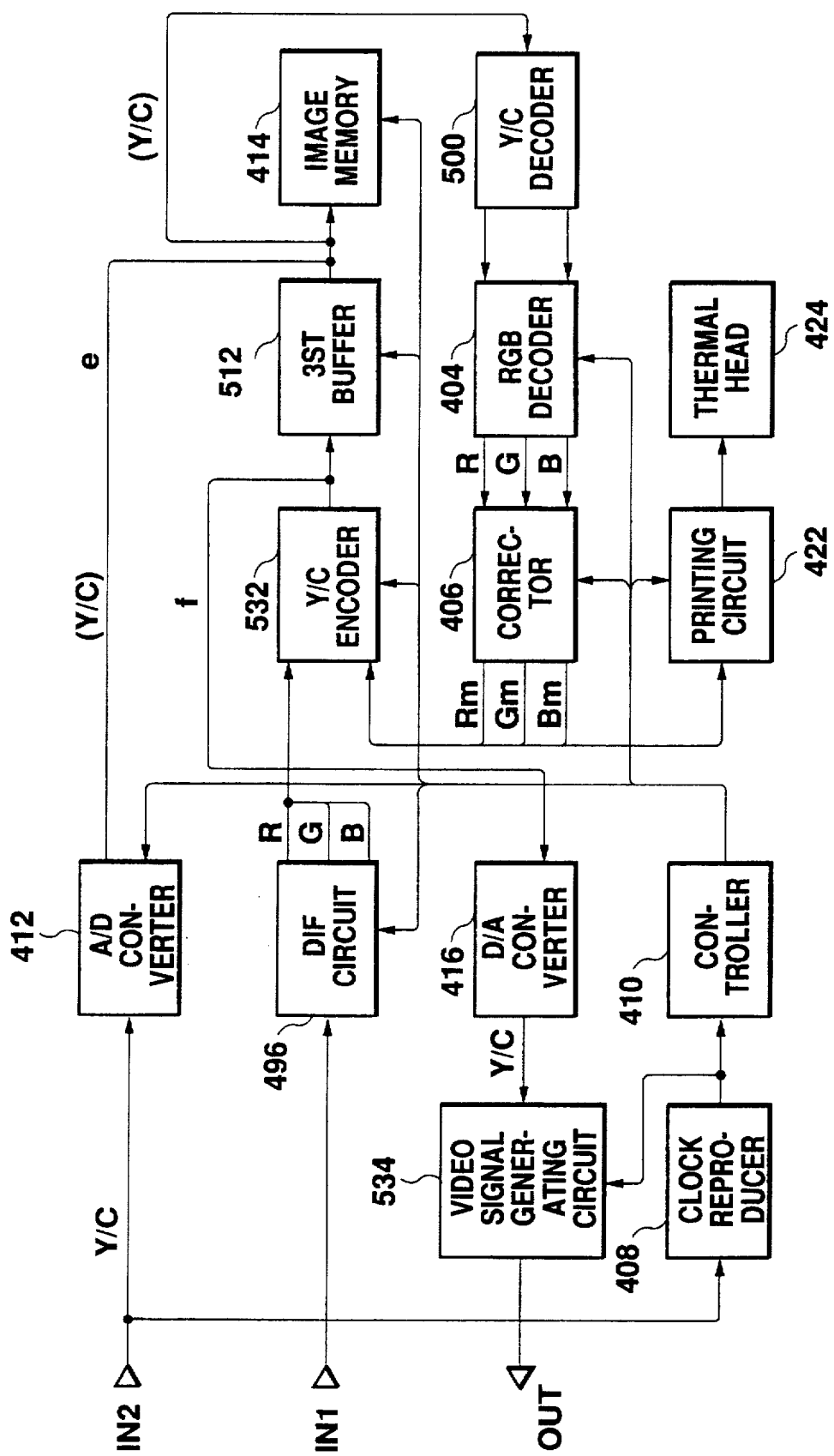

FIG. 27 shows another embodiment modified from that shown in FIG. 26 where only a single D/A converter 416 is used, in comparison with that in FIG. 26 using three. Also, according to this invention, the circuit structure of the analog modulator 420 can be simplified.

In operation, the numerals designate respectively: 532, a Y/C encoder, eliminating the 3ST buffer 512, having a selector selecting either one system of RGB data at the input section and transferring them to the subsequent circuits; 534, a video signal generator for generating video signals in conformity with NTSC standards by eliminating the unnecessary high-frequency components of the y/c signal having been D/A-converted in the D/A converter and adding synchronizing signals thereto.

The corrected data Rm, Gm, and Bm are inputted to the Y/C encoder 532 and converted into video data Y/C (f). These converted data are further converted into Y/C signal in the D/A converter 416, addition of a synchronizing signal thereto and band restricting process are carried out in the video signal generator 534 to provide a monitor video signal in conformity with NTSC method.

Instead of the analog demodulator 418 used in the embodiment of FIG. 21, a composition, where separately inputted video signal y and color signal c are directly encoded, also can be used. Also, the DIF circuit 496 can be replaced with a software means.

As mentioned above, according to this embodiment, the analog signal processing section can be simplified, and also the digital circuit can be simplified by using positive number image correcting method. Consequently, the digital circuit is formed in LSI which is capable of presenting stable operation and property as well as high reliability and economy.

Figure 28:
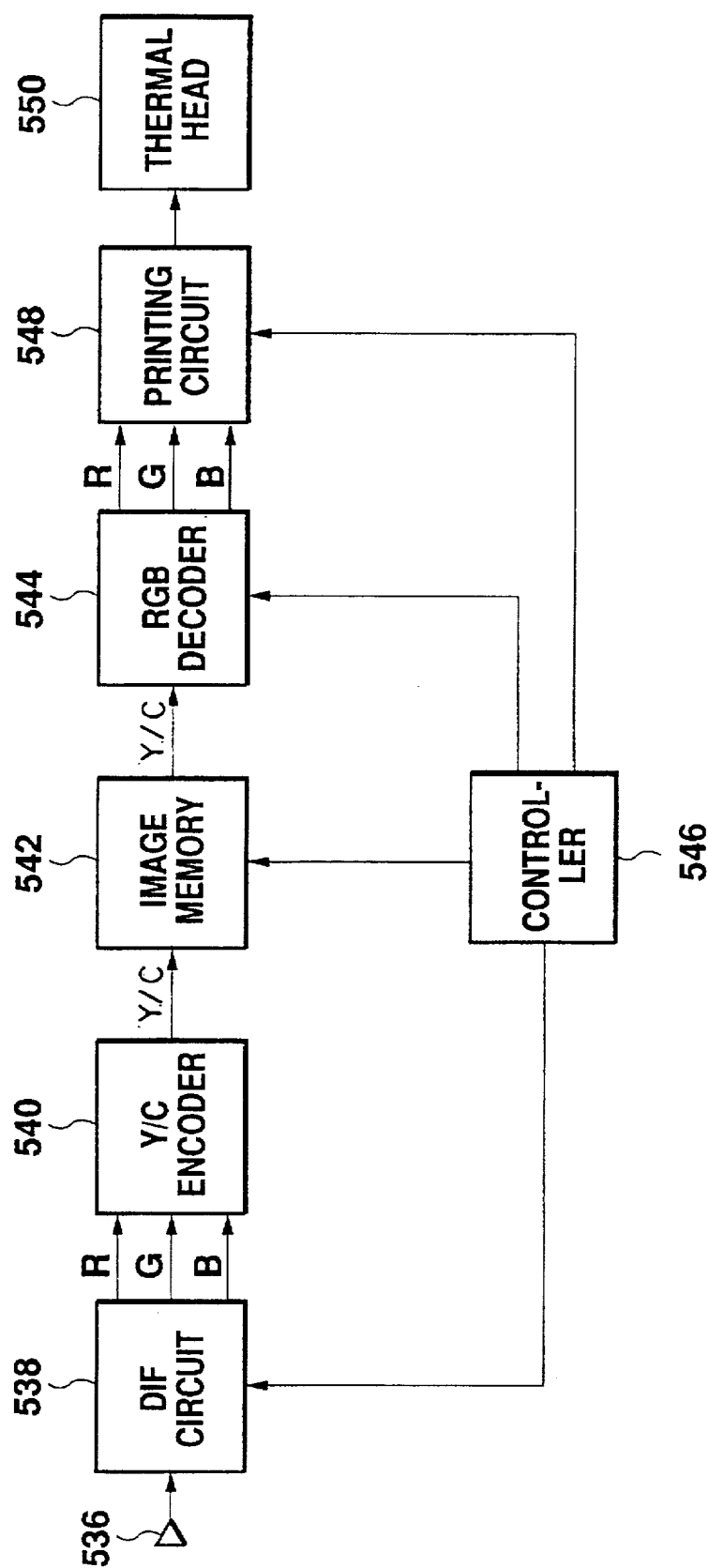
FIGS. 28 and 33 are block diagrams showing examples of a signal processing apparatus for a video printer according to this invention.

FIG. 28 shows a signal processing apparatus for a video printer according to another embodiment of this invention. In FIG. 28, the numerals designate respectively: 536, an input terminal for RGB image data from external computers; 538, a DIF circuit for receiving and rearranging the RGB image data inputted through the input terminals 538; 540, a Y/C encoder for converting the RGB data received by the DIF circuit 538 into video data Y/C in conformity with NTSC standards capable of being frozen in the image memory 542; 544, a RGB decoder for separating the video data Y/C into brightness data Y and color data C, and for restoring the original RGB image data from these two types of data; 546, a controller for controlling the operation of the components; 548, a printing circuit; 550, a thermal head.

Figure 29:
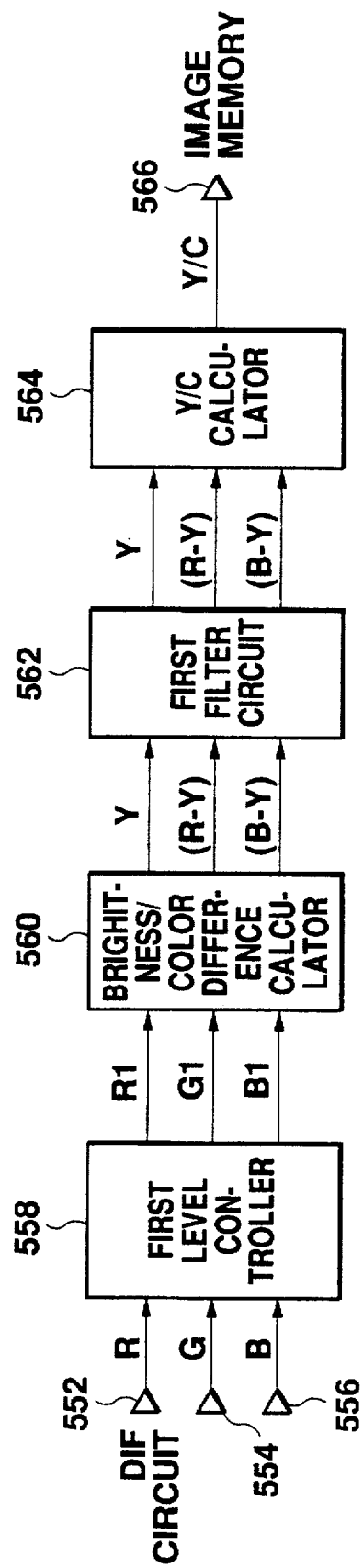
FIGS. 29 and 31 are block diagrams showing examples of a Y/C encoder according to this invention.

FIG. 29 shows a detailed composition of an embodiment of the Y/C encoder 540. In FIG. 29, the numerals designate respectively: 552, 554, 556, input terminals for the RGB image data supplied from the DIF circuit 538; 558, a first level controller for the input data; 560, a brightness/color difference calculator for calculating brightness data Y and color difference data R-Y, B-Y from the RGB image data; 562, a first filter circuit for eliminating obstacles; 564, a Y/C calculator for calculating video data in conformity with NTSC standards from the brightness data Y and the color difference data R-Y, B-Y; 566, an output terminal for the image memory 542.

Figure 30:
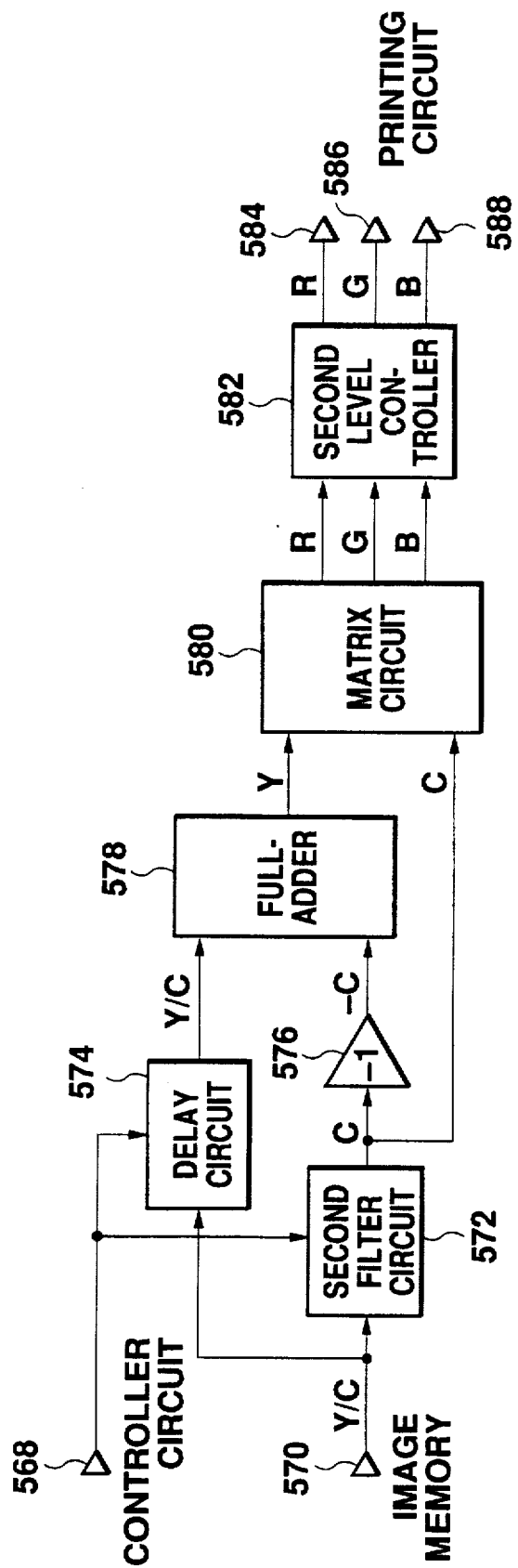
FIGS. 30 and 32 are block diagrams showing examples of a RGB decoder according to this invention.

FIG. 30 shows a detailed embodiment of the RGB decoder. In FIG. 30, the numerals designate respectively: 568, an input terminal for the data supplied from the controller 546; 570, an input terminal for the video data supplied from the image memory 542; 572, a second filter circuit for extracting the color data C from the video data; 574, a delay circuit for the video data; 576, a (−1) multiplier; 578, a full-adder for calculating the brightness data Y; 580, a matrix circuit for converting the brightness data Y and the color data C into RGB image data; 582, a second level controller; 584, 586, 588, output terminals for outputting the data to the printing circuit.

In operation, the RGB data, inputted to the input terminal 536 by means of a predetermined interface algorithm, are timing-adjusted in the DIF circuit 538 and transmitted to the Y/C encoder 540. The first level controller 558 of the Y/C encoder 540 executes the calculations of:

R1=a*R+b

G1=a*G+b

B1=a*B+b $(0 < a \leq 1, 0 \leq b)$ and the calculated results are transferred to the brightness/color difference calculator 560, which executes the calculations of:

Y=α*R1+βG1+γ+B1

(R−Y)=R1−Y (B−Y)=B1−Y to provide the data Y and R-Y, B-Y. Then the first filter circuit 562, consisting of e.g. low-pass-filter, performs obstacle eliminating process. The Y/C calculator 564 calculates to generate the video data under a condition of:

C=δ*(B−Y) SIN (2 πfsct)+ε*(R−Y) $\overline{COS}$ (2 πfsct)

Y/C=Y+C (fsct=color sub-carrier frequency)

and outputs the video data Y/C to the image memory. In the above formulas, for calculating video data e.g. in conformity with NTSC standards, the following values are employed:

α=0.30

β=59

γ=0.11

δ=0.493

ε=0.877.

The video data Y/C are temporarily stored in a predetermined address of the image memory under address control by the controller 546. Upon completion of temporarily storing predetermined number of the video data, the freezing operation terminates.

Meanwhile, at printing, the video data Y/C at a predetermined address in the image memory 542 are read by the controller 546 and transferred to the RGB decoder 544. The video data Y/C having been inputted to the input terminal 570 are supplied to the second filter circuit 572 and the delay circuit 574. The second filter circuit 572 consists of, for example, a BPF which extracts the color data C from the video data Y/C. The extracted color data C is multiplied by −1 and input to the full-adder 578. The full-adder 578 provides the brightness data Y by adding the −C data to the Y/C data having been timing-adjusted by the input controlling data.

Thus, the brightness data Y and the color data C are separated from the video signal Y/C. These separated data Y and C are restored in the matrix circuit 580 in the same manner as described referring to the conventional apparatus, and receives RGB level adjustment in the second level controller 582 by the calculations of:

(R−b)/a (G−b)/a (B−b)/a and transferred to the printing circuit 548.

The printing circuit 548 executes: the conversion of the Y (yellow), M (magenta), and C (cyan) inks corresponding to the RGB image data into density data and into thermal controlling data aimed at controlling the gradation, thereby controlling the heating value at pixel unit. By performing this thermal control in two dimensions, a hard-copy image for one ink is obtained. And by repeating this printing operation for the number of ink colors, a full-color hard copy image can be obtained. Thus, it becomes possible to provide a hard copy of a graphic image.

Next, an embodiment in respect of the printing method will be described referring to the drawings.

Figure 33:
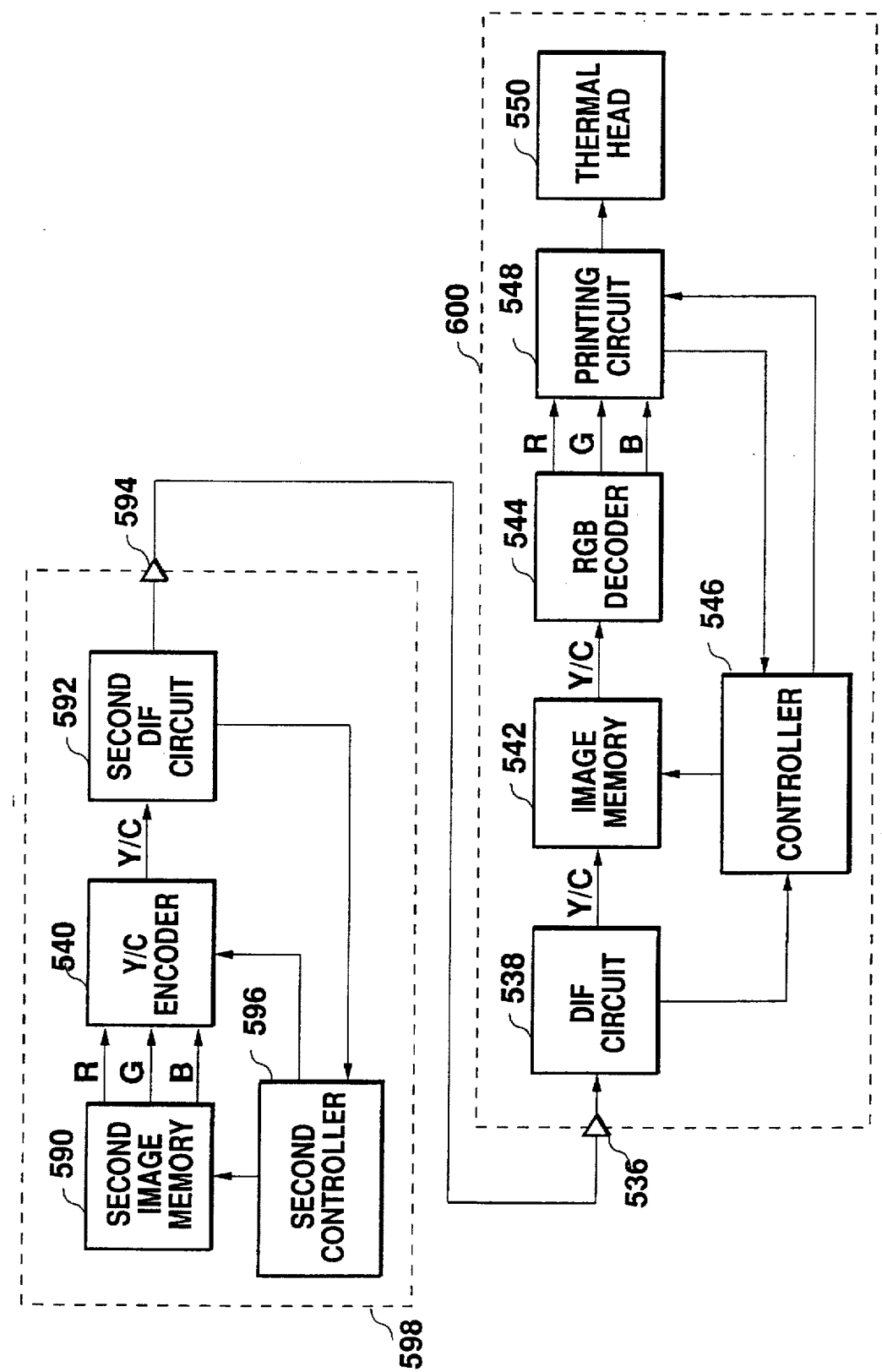

In FIG. 33, the numerals designate respectively: 590, a second image memory for temporarily storing, for example, the RGB image data; 592, a second DIF circuit for adjusting the timing of transmitting the calculated data; 594, an output terminal for digital data; 596, a second controller; 598, a block diagram of an apparatus disposed outside of the printing apparatus; 600, a block diagram showing the inside of the printing apparatus.

In operation, the RGB image data temporarily stored at a desired position in the second image memory 590 are read under the address control of the second controller 596 and transmitted to the Y/C encoder 540. The Y/C encoder 540 calculates the video data Y/C in the same manner as the aforementioned embodiment. The video data Y/C are then timing-adjusted by the second DIF circuit 592 and transferred to the input terminal 536 of the printer 600. The data inputted through the input terminal 536 are timing-adjusted by the DIF circuit 538 and temporarily stored at a predetermined address of the image memory 542 by the controller 546. Upon completion of temporarily storing predetermined number of video data in the image memory 542, the freezing operation for the desired image terminates.

The printing operation is omitted to be described because of being the same as in the aforementioned embodiments.

Figure 31:
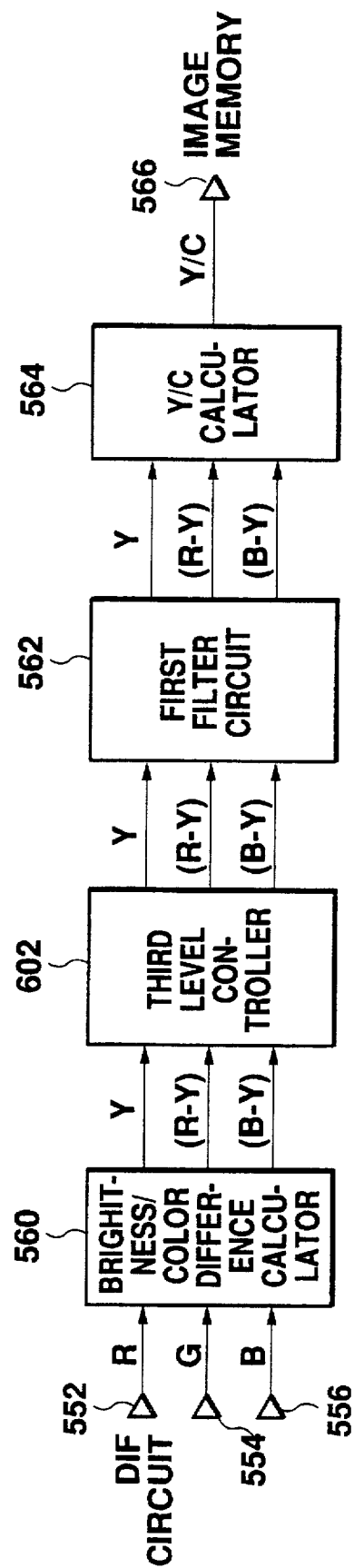
Figure 32:
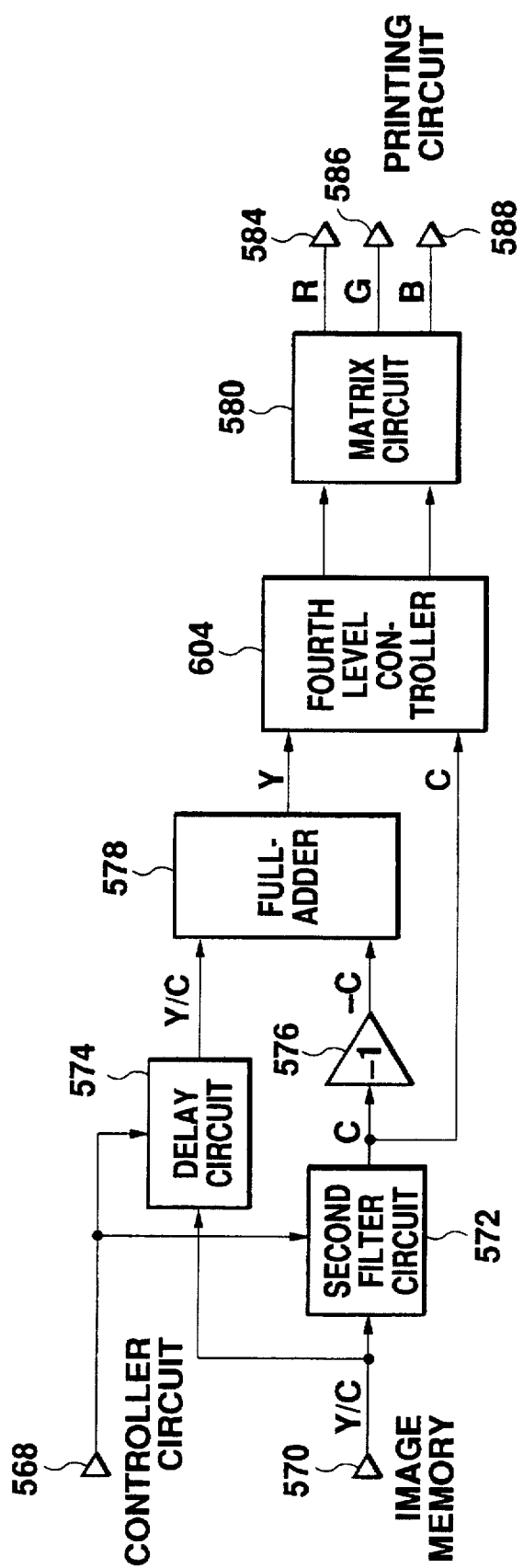

Besides the above embodiment where the Y/C encoder 540 and the RGB decoder 544 are explained in FIG. 29 and 30 respectively, it is also possible to compose the Y/C encoder 540 and the RGB decoder 544 as shown in FIGS. 31 and 32 respectively. The third level controller 602 execute such a level controlling operation as $c*Y+d$ and $e*C+f$ (where $0<c\leq 1$, $0<e\leq 1$, $0\leq d$, $0\leq f$) while the fourth level controller 604 execute such a level controlling operation as $(Y−d)/c$ and $(C−f)/e$, rendering the same effect as aforementioned embodiment.

Namely, the level controlling operation can be carried out at a desired position. Further, the embodiment shown in FIG. 33 can be alternatively placed inside the external computer instead of outside thereof. Furthermore, the second image memory 590 can be replaced with a complimentary memory device such as a floppy disk, and the Y/C encoder 540, and the second DIF circuit 592 can be replaced with software processing composition.

As mentioned above, according to this embodiment, it becomes possible to hard-copy graphic images formed by, for example, a personal computer in addition to pictorial images formed by analog video signal input, thereby realizing an economical signal processing apparatus or printing method for a video printer.

Figure 34:
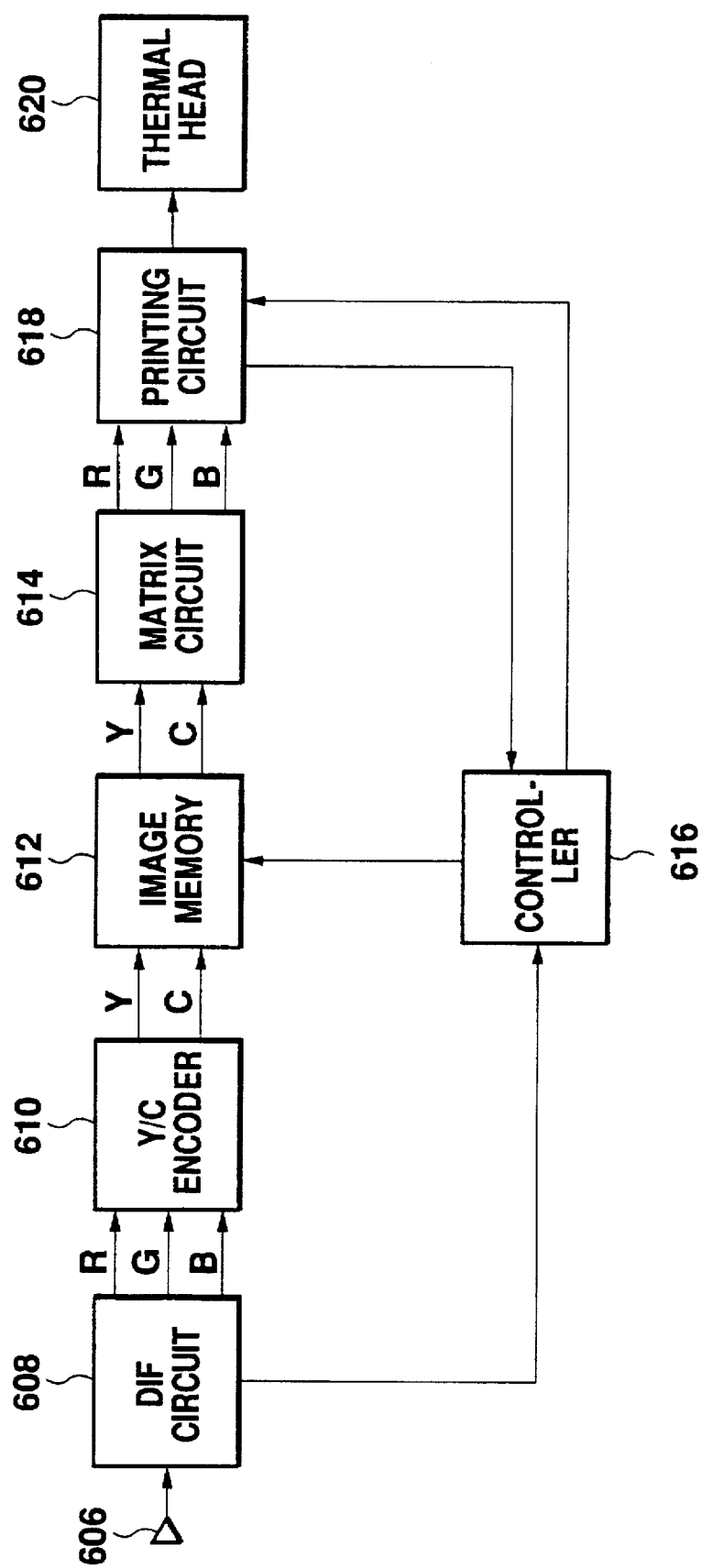
FIGS. 34 and 36 are block diagrams showing examples of a signal processing apparatus for a video printer according to this invention.

FIG. 34 shows a signal processing apparatus for a video printer according to another embodiment of this invention. In FIG. 34, the numerals designate respectively: 606, an input terminal for RGB image data: 608, a DIF circuit for receiving the RGB image data inputted to the input terminal 606 and rearranging them; 610, a Y/C encoder for converting the RGB data received by the DIF circuit 608 into brightness data Y and color data c both capable of being frozen in the image memory 612; 612, an image memory for temporarily storing the brightness data Y and the color data C; 614, a matrix circuit for restoring the original RGB image data from the brightness data Y and the color data C; 616, a controller for controlling the operation of the components; 618, a printing circuit; and 620, a thermal head.

Figure 35:
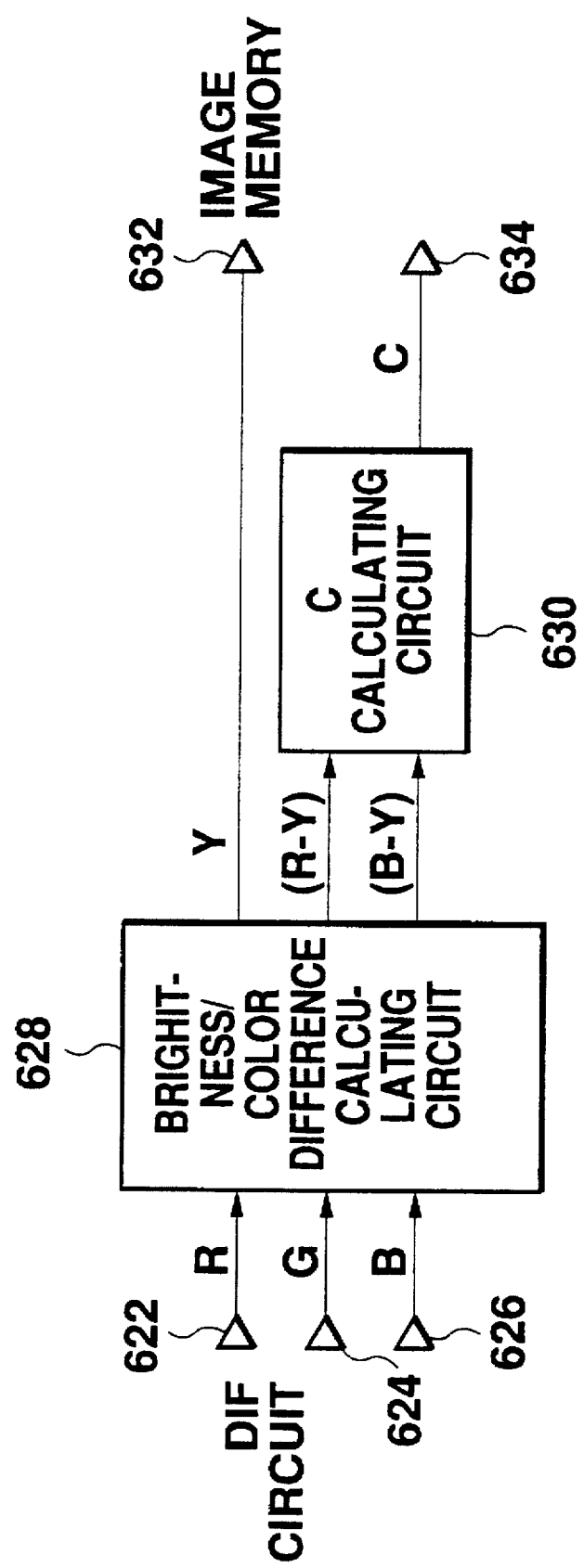
FIG. 35 is a block diagram showing an example of a Y/C encoder according to this invention.

FIG. 35 shows a detailed embodiment of the Y/C encoder 610. In FIG. 35, the numerals designate respectively: 622, 624, and 626, input terminals for RGB image data supplied from the DIF circuit 608; 628, a brightness/color difference calculator for calculating the brightness data (Y) and the color data R-Y, B-Y from the RGB data; 630, a C calculator for calculating the color data C from the data R-Y and B-Y; 632, 634, output terminals for the image memory.

In operation, the RGB image data, having been inputted to the input terminal 606 by means of a predetermined interface algorithm, are timing-adjusted by the DIF circuit 608 and transmitted to the Y/C encoder 610. The brightness/color difference calculator 628 of the Y/C encoder 610 executes the calculations of:

$Y=\alpha*R+\beta*G+\gamma*B$ $(R-Y)=R-Y$ $(B-Y)=B-Y$ to provide the data Y and R-Y, B-Y. The C calculator calculates the color data C from the color data R-Y and B-Y under the condition of:

$C=\delta*(B-Y) \text{ SIN } (2 \pi fsct)+\epsilon*(R-Y) \text{ COS } (2 \pi fsct)$ (where fsct=color sub-carrier frequency). These brightness data Y and color data C are outputted to the image memory 612 through the output terminals 632, 634.

In the above-mentioned formula, the following values are, not limitedly, used for calculating the brightness data Y and the color data C in conformity with NTSC standards:

$\alpha=0.30$ $\beta=0.59$ $\gamma=0.11$ $\delta=0.493$ $\epsilon=0.877$.

The brightness data Y and the color data C are temporarily stored in a predetermined address of the image memory 612 under address control by the controller 616. Upon completion of temporarily storing predetermined number of the brightness data and the color data C in the image memory 612, the freezing operation terminates.

Meanwhile, at printing, brightness data Y and color data C at a predetermined address are read and restored to the RGB data in the same manner as in the conventional apparatus, and then transferred to the printing circuit 618. The printing circuit 618 is composed in the same manner as the aforementioned embodiment and omitted to be described.

In operation, the desired RGB data having been temporarily stored at a predetermined address in the second image memory 636 are read by the address control of the second controller 642 and transmitted to the Y/C encoder 610. The Y/C encoder 610 calculates the brightness data Y and the color data C. The second DIF circuit 638 rearranges and timing-adjusts the data and transfers them from the output terminal 640 to the input terminal 606 of the printer 646. The data having been inputted through the input terminal 606 are rearranged and timing-adjusted in the DIF circuit 608, and temporarily stored at a predetermined address of the image memory 612 by the controller 616. Upon temporarily storing predetermined number of the brightness data Y and the color data C in the image memory 612, the freezing operation terminates.

The printing operation is the same as in the aforementioned embodiments and omitted to be described.

In reference to FIG. 34, the DIF circuit 608 and the Y/C encoder 610 have been described as being embodied in hardware, it is alternatively possible to interface the data by a software and to process the data by such a software.

Figure 36:
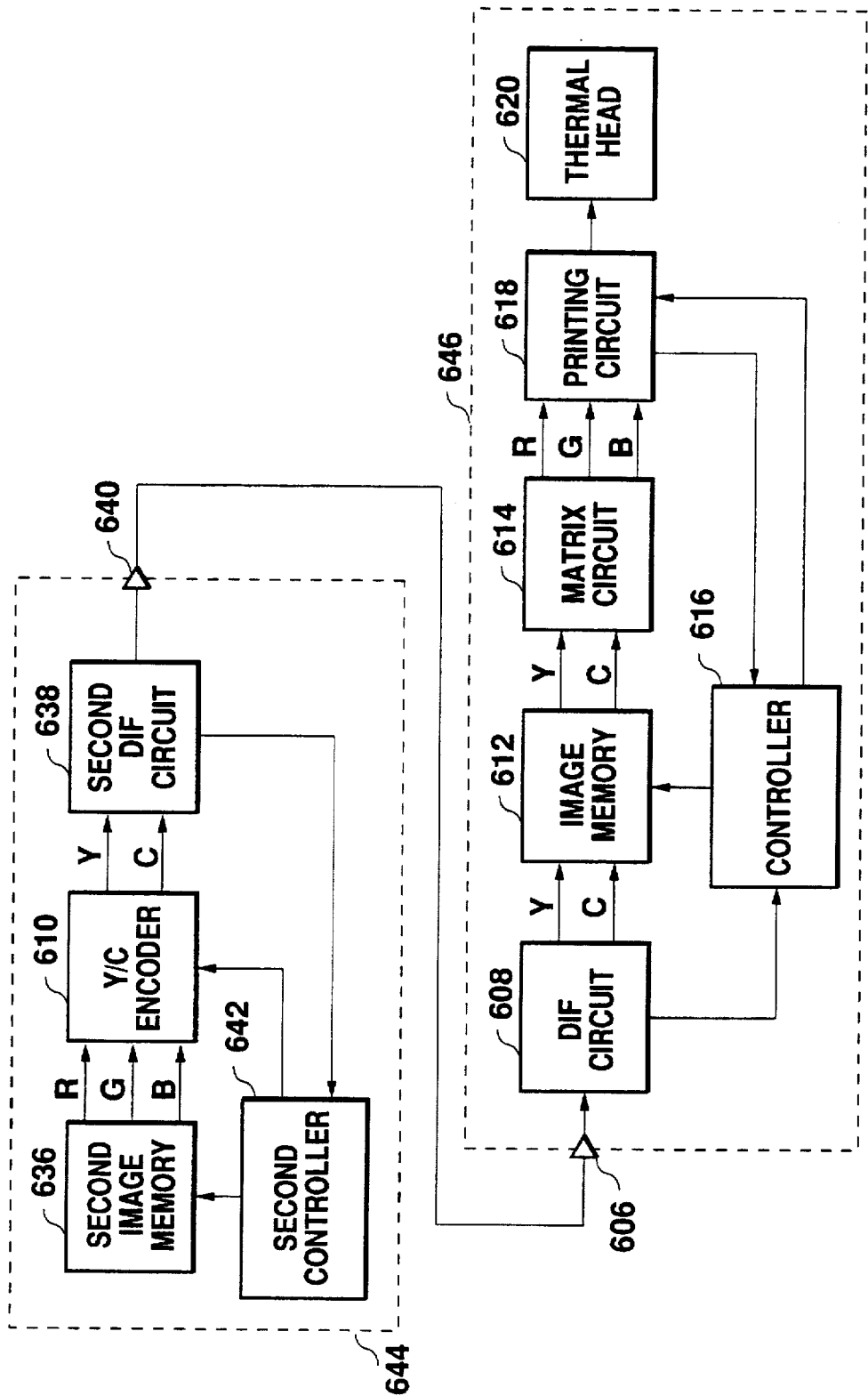

Also in FIG. 36, the apparatus of the FIG. 36 has been described in a block diagram 644 outside of the printing apparatus, it is also possible to place it within the external computer. The second image memory 636 can be replaced with a complimentary memory such as a floppy disk, and the Y/C encoder 610 and the second DIF circuit 638 can render the same effect even if being composed to be processed by software.

In the above-mentioned embodiment, the color data has been compressed into ½ by calculating the color data C under a condition of:

C=ε*(B-Y) SIN (2 πfsct)+ε*(R-Y) COS (2 πfsct)

(where fsct=color sub-carrier frequency).
Alternatively, it is also possible to temporarily store the color data in the image memory only under the condition of SIN (2 πfsct)=1 or COS (2 πfsct)=1. According to this operation , the color data becomes compressed into ¼, namely, below ¼ in comparison with ⅔.

As mentioned above, according to this invention, it is possible to provide an economical signal processing apparatus for a video printer which is capable of hard-copying graphic images composed by a personal computer can be corrected as well as the pictorial image of the analog video signal.

Figure 37:
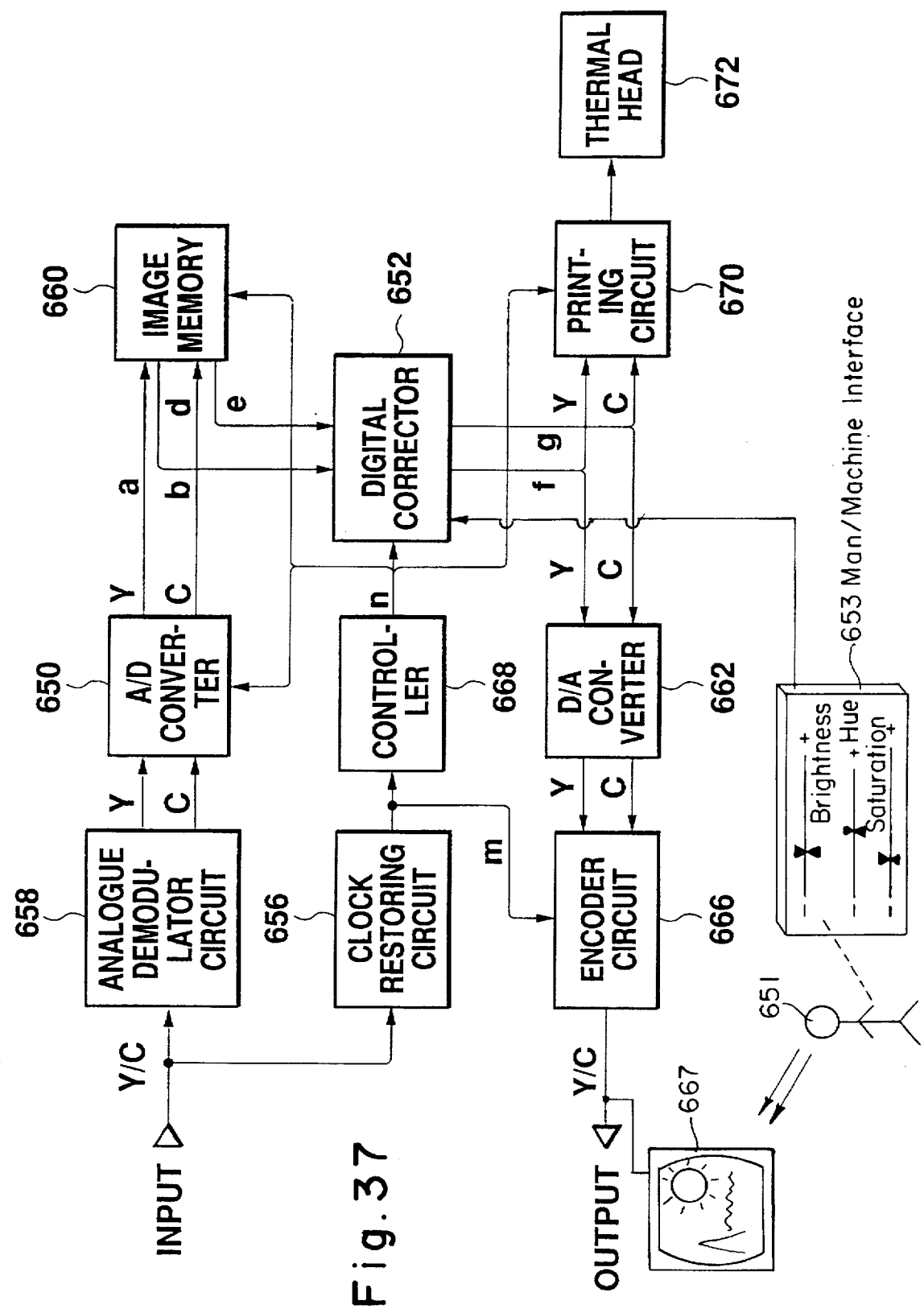
FIG. 37 is a block diagram showing an example of a signal processing apparatus for a video printer according to this invention.

FIG. 37 shows a signal processing apparatus for a video printer according to another embodiment of this invention. In FIG. 37, the numerals designate respectively: 650, an A/D circuit waiting the three-states output conditions; 652, a digital correcting circuit; 654, a clock regenerator for the synchronizing signal etc.; and 656, a controller for controlling the entire system. Each of the other components performs the same as or the similar to those in the conventional apparatus.

In operation, the input analog video signal Y/C is separated into a brightness signal Y and a color signal C (time-dividedly multiplexed signal of the demodulated R-Y signal and B-Y signal) in the analog demodulator 658. These signals are encoded in the A/D converter 650 under the conditions of:

quantized number of bits=8 bits;
sampling frequency=4*fsc (fsc: sub-carrier frequency 3.58 MHz);
pixel composition=768 (Horizontal)*480 (Vertical).

At this time, the A/D converter 650 is in the normal mode of outputting binary data. The encoded data Y (a) and C (b) are transferred to the image memory having been previously set to input mode to be stored therein for one screen in a predetermined order from a predetermined address. Thus, the freezing operation for a desired image terminates.

To shift to the next step, the output terminal of the A/D converter is turned off while the input/output terminal of the image memory 660 is set to output mode.

The freezing data of the image memory 660 are read in a predetermined order from a predetermined position, and supplied to the digital corrector 652 as data Y (d) and C (e). These data are corrected to become data Y (f) and C (g), and transferred to the D/A converter 662. At this time, the printing circuit 664 controls itself not to receive these data.

These data are restored to the brightness signal Y, color signal C, or to the brightness signal Y and R-Y, B-Y signals. The encoder circuit 666 generates video signal Y/C from the restored signal and outputs it as a monitor signal to video monitor 667. A synchronizing signal (m) generated in the clock reproducing circuit 656 is added to the monitor signal to provide a video signal in conformity with NTSC standards. Referring to thus obtained monitor image, the operator 651 can desirably adjust the image by the digital corrector 652 executing a calculation hereinafter described (supplementary explanation 1) in accordance with the brightness, hue, and saturation of the controller 668, based upon signals received from man/machine interface 653.

This process is carried out in the video section during the synchronizing period in the same manner as the monitor displaying process of the conventional apparatus. These are the general operations in the correcting process.

Data pairs of (Y, R-Y) or (Y, B-Y) are stored in the image memory 660. One pixel of the color data is represented by (Y, R-Y, B-Y), with which the data always operates in the printing process. Namely, the pixel lacking of R-Y or B-Y uses the data of the adjacent pixel.

The Y data and C data read in the generally synchronizing section during the synchronizing signal period receives correcting calculation being the same as the correcting process, and read in the vertical direction to be transferred, different from the monitor display where the data is transferred in the horizontal direction of the image.

These data are transferred to the printing circuit 670 through the route of d-f and e-g at each synchronizing signal determined with a unit of predetermined number. At this time, the D/A converter 662 is in inoperative state.

The printing circuit 670 executes thermal controlling operation on each pixel in the thermal head 672 in accordance with the input data, as described hereinafter (supplementary explanation 2). With the number of pixels of the thermal head being 672 being 480 dots (called one line of printing), the printing operation is repeated, to the number of the pixels in the horizontal direction, 768. Thus, the printing for the Y ink is completed. The same operation is performed on the M ink and C ink so as to provide a full-color hard copy image.

Next, the supplementary explanations 1 and 2 will be now described.

Figure 38:
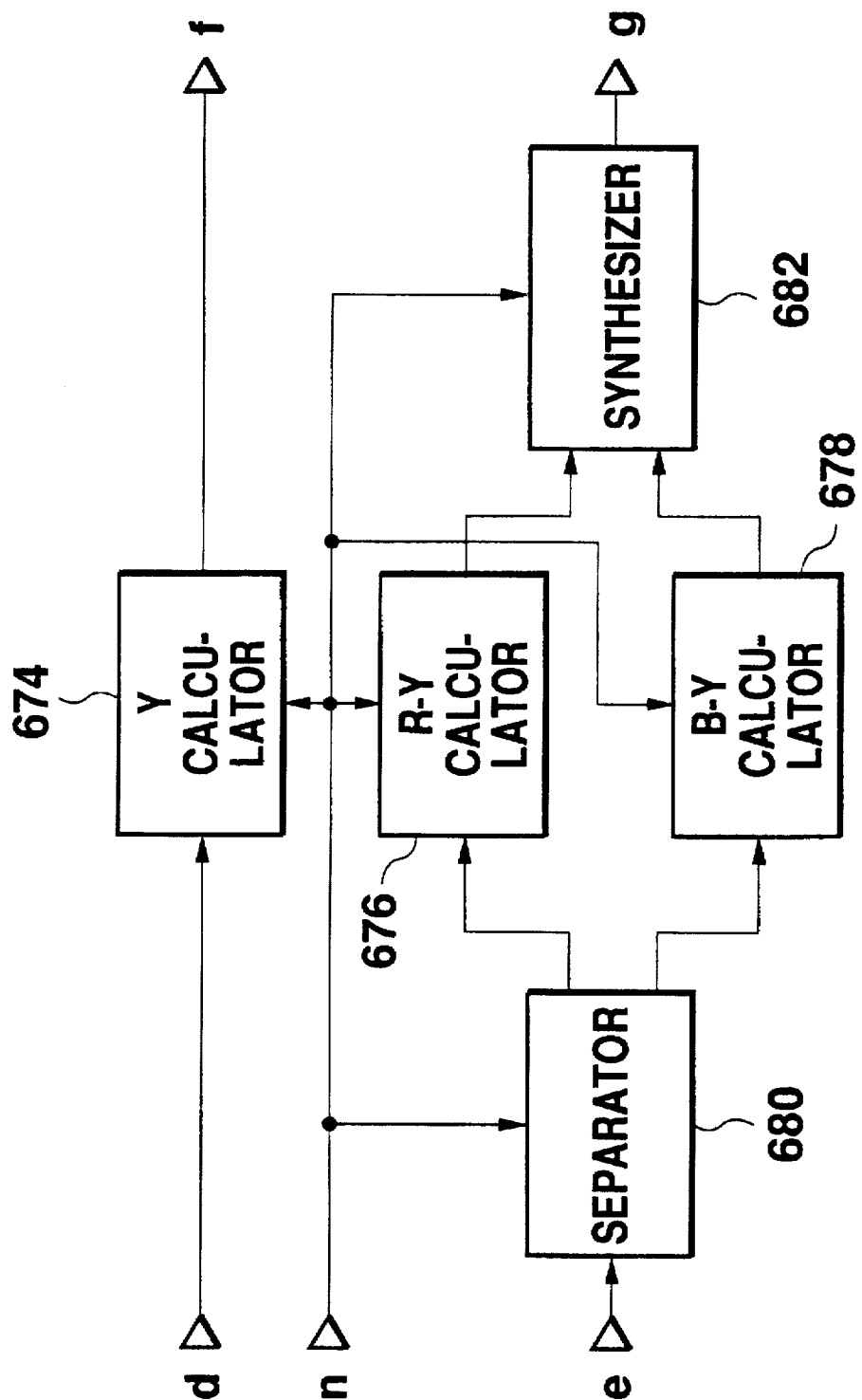
FIG. 38 is a block diagram showing an example of a digital correcting circuit according to this invention.

FIG. 38 shows an embodiment of the digital corrector 652. In FIG. 38, the numerals designate respectively: 674, 676, and 678, Y calculator, R-Y calculator, and R–B calculator respectively; 680, a separator for separating R-Y and B-Y data; 682, a multiplexing synthesizer for the calculated R-Y and B-Y data. The Y, R-Y, and B-Y calculators execute the calculation of $\alpha*Y, \beta*(R-Y)$, and $*\gamma(B-Y)$ respectively. The calculation coefficients $\alpha$, $\beta$, $\gamma$ are supplied by the correction instructing signal (n).

The C data (a) is separated into R-Y and B-Y data in the separator 680, and correctly calculated in the R-Y calculator 676 and B-Y calculator 678. The calculated results are supplied to the synthesizer 682 again to become multiplex synthesized data g. The Y data (d) are directly supplied to the Y calculator (674) and output as calculation data (f).

The calculation coefficients $\alpha$, $\beta$, $\gamma$ are generated in the controller 668 taking account of the relationship between R-Y and B-Y, the relationship between increase/decrease of the gain and the image quality. These operations correspond to the supplementary explanation 1.

Figure 39:
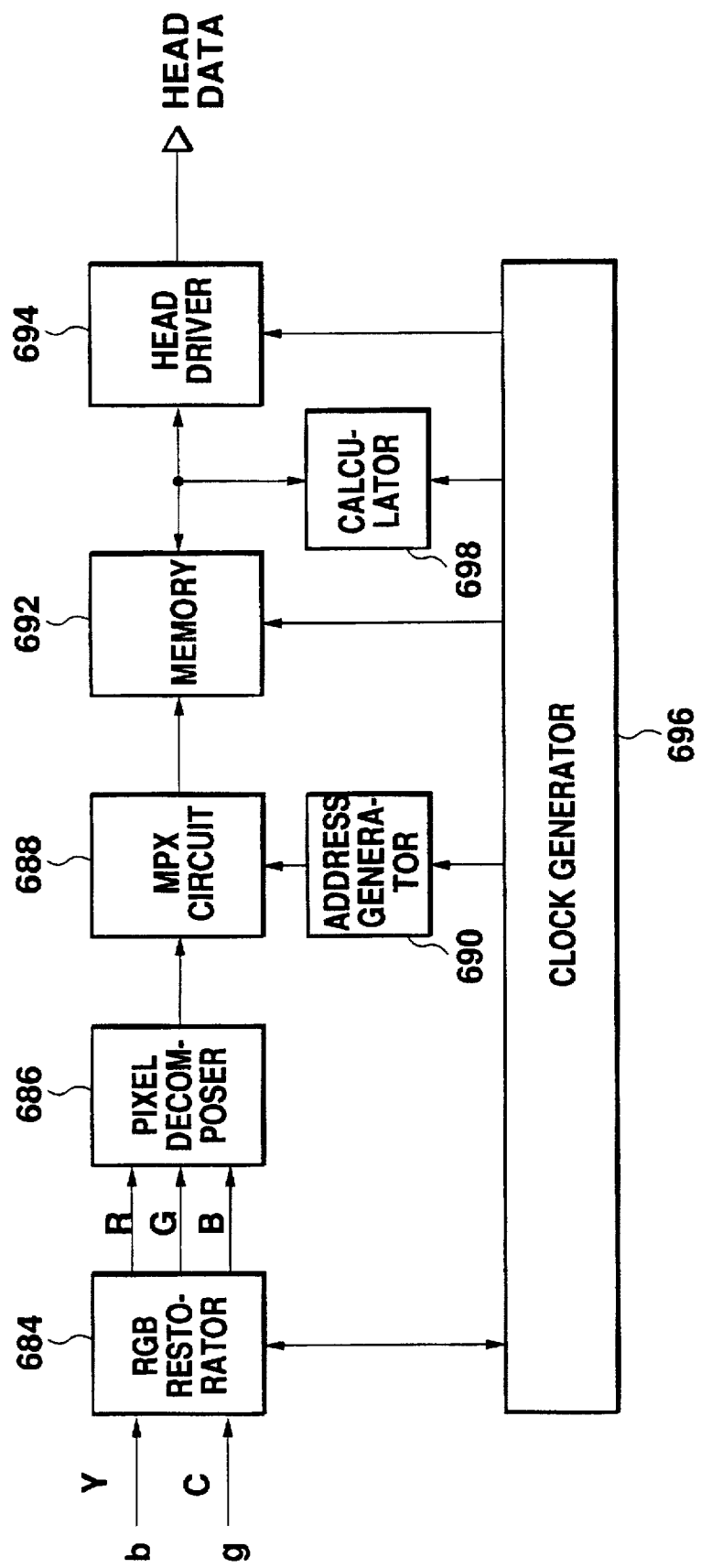
FIG. 39 is a block diagram showing an example of a printing circuit according to this invention.

FIG. 39 shows an embodiment of the printing circuit 670. In FIG. 39, the numerals designate respectively: 684, a RGB restorator; 686, a pixel decomposer; 688, a MPX (multiplex) circuit; 690, an address generator; 692, a memory composed of SRAM and ROM; 694, a head driver; 696, a clock generator, 698, a calculator.

In operation, the brightness data Y and the color data C of the input signal are restored to the RGB data by the RGB restorator 684. This RGB data are decomposed to the achromatic data and chromatic data by the pixel decomposer 686. These two data are converted into YMC ink density data in the MPX circuit 688, the memory 692, and the calculator 698. The ink density data are temporarily stored in the memory 692 for time-axis adjustment. The ink density data having been read out from the memory 692 in a predetermined timing are transferred to the head driver 694 and converted into thermal controlling data (head data) of the thermal head 672. The address generator 690 properly generates address signals for the memory 692.

These entire sequence is controlled by the clock generator 696. The details of the printing circuit are disclosed in Japanese Patent Laid-Open No. Sho 64-216696 by the present inventors. These correspond to the supplementary explanation 2.

Although the above-mentioned embodiment has been described in NTSC standards, it can be also applied to PAL standards.

Further, the pixel composition can be freely set as e.g. 400 (V)*640 (H), besides 480 (V)*768 (H) in the above embodiment.

Furthermore, the digital corrector shown in FIG. 38 and the printing circuit shown in FIG. 39 can be composed in any other design in accordance with the desired function and purpose.

As mentioned above, according to this invention, it is possible not only to correct to the desired image by the digital calculation, but also to realize the same function as the conventional apparatus by only a single encoding process, thereby providing an economical apparatus capable of rendering hard copy image with high image quality.

Figure 40:
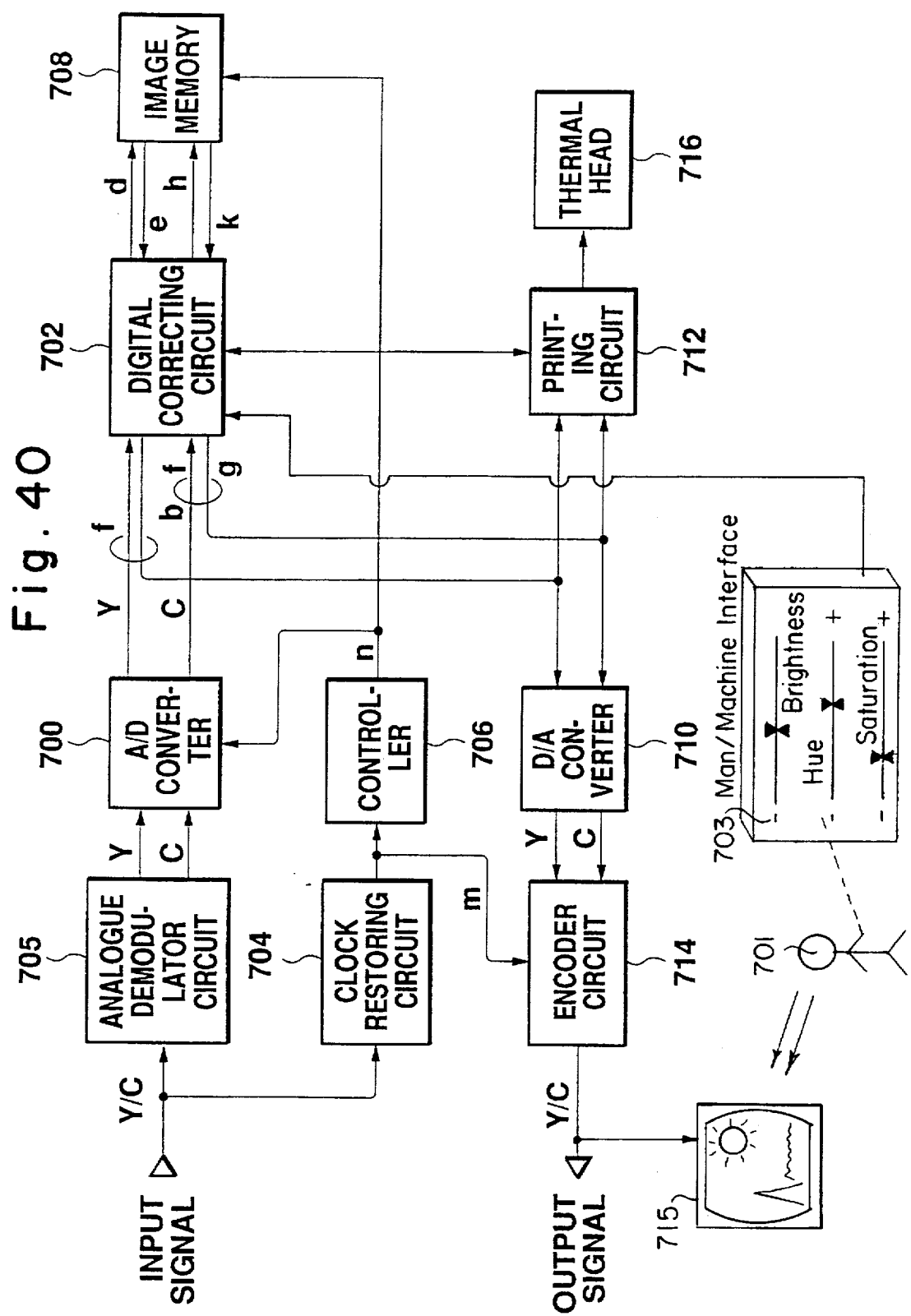
FIG. 40 is a block diagram showing an example of a signal processing apparatus for a video printer according to this invention.

FIG. 40 shows a signal processing apparatus according to another embodiment of this invention. In FIG. 40, the numerals designate respectively: 700, an A/D converter having three output states; 702, a digital corrector; 704, a clock restoring circuit for e.g. synchronizing signals; 706, a controller for controlling the entire operations etc.. The other components function in the same manner as in the conventional apparatus.

In operation, the inputted video signal Y/C is separated into brightness signal Y and color signal C (time-dividedly multiplexed signal of the demodulated R-Y signal and B-Y signal).

These signals are encoded by the A/D converter 700 under the conditions of:

quantized number of bits=8 bits;

sampling frequency=4*fsc (fsc: sub-carrier frequency= 3.58 MHz);

pixel composition=768 (H)*480 (V).

The A/D circuit 700 is in the normal binary data output mode.

The encoded data Y (a) and C (b) pass through the digital corrector 702 to become data (d) and (h), and stored in the image memory 708 from a predetermined address in a predetermined order for one screen. At this time, the digital corrector 702 is set in data transferring mode. Upon completion of these operations, the freezing process for the desired image terminates.

To shift to the next step, the output mode of the A/D converter is turned off. And the input/output terminal of the image memory 708 is set to output mode.

The frozen data in the image memory 708 are read out from a predetermined address in a predetermined order, and supplied to the digital correcting circuit 702 as data (e) and (k). These data become data (f) and (g) with or without correction, and transferred to the D/A converter 710. At this sampling frequency time, the printing circuit 712 controls itself not to receive these data.

These data are restored to the brightness signal Y and the color signal C respectively. The encoder circuit 714 generates the original video signal Y/C from the restored signal, and outputs it as a monitor signal to video monitor 715. And a synchronizing signal (m) restored in the clock restoring circuit 704 is added thereto to provide a video signal in conformity with NTSC standards. Referring to the monitor image, the operator 701 can desirably adjust the image by the execution of a calculation hereinafter described (supplementary explanation 1) by the digital correcting circuit 702 in accordance with the correction instructing signal (n) for the brightness, the hue, and the saturation from the controller 706, based upon signals received from the man/machine interface 703.

The D/A converter 710 can be composed of two or three devices, one for restoring Y and C signals, and the other for restoring Y and R-Y, B-Y signals.

This process is carried out in the video section during the synchronizing period, with the same operations in the monitor display process described in reference to the conventional apparatus.

In printing process, the image memory 708 includes data pairs of (Y, R-Y) and (Y, B-Y) stored therein.

However, one pixel of color information is represented by (Y, R-Y, B-Y). Therefore, in printing process, the data is always regarded as functioning in a pair of Y/R-Y/B-Y. Namely, a pixel lacking of R-Y or B-Y uses the data of the adjacent pixels.

The data read from the image memory 708 at a generally synchronizing position other than the video section receives the same correcting calculation as in the monitor display, and transferred to the longitudinal direction of the image different from the monitor display where the data is transferred in the lateral direction of the image.

The data are transferred to the printing circuit 712 through a route of e–f and k–g at each synchronizing signals determined in a unit of predetermined number. At this time, the D/A converter 710 is in inoperative state.

The printing circuit 712 performs thermal control on each pixel of the thermal head in accordance with the inputted data as described hereinafter (supplementary explanation 2).

With 480 dots of pixels of the thermal head 716 (called one line of the printing), the printing operation is repeated the times corresponding to the number of pixels in the horizontal direction, 768, to complete the Y ink printing. The same operation is applied to the M ink and C ink, thereby providing full-color hard copy image.

Next, the supplementary explanations 1 and 2 will be described.

Figure 41:
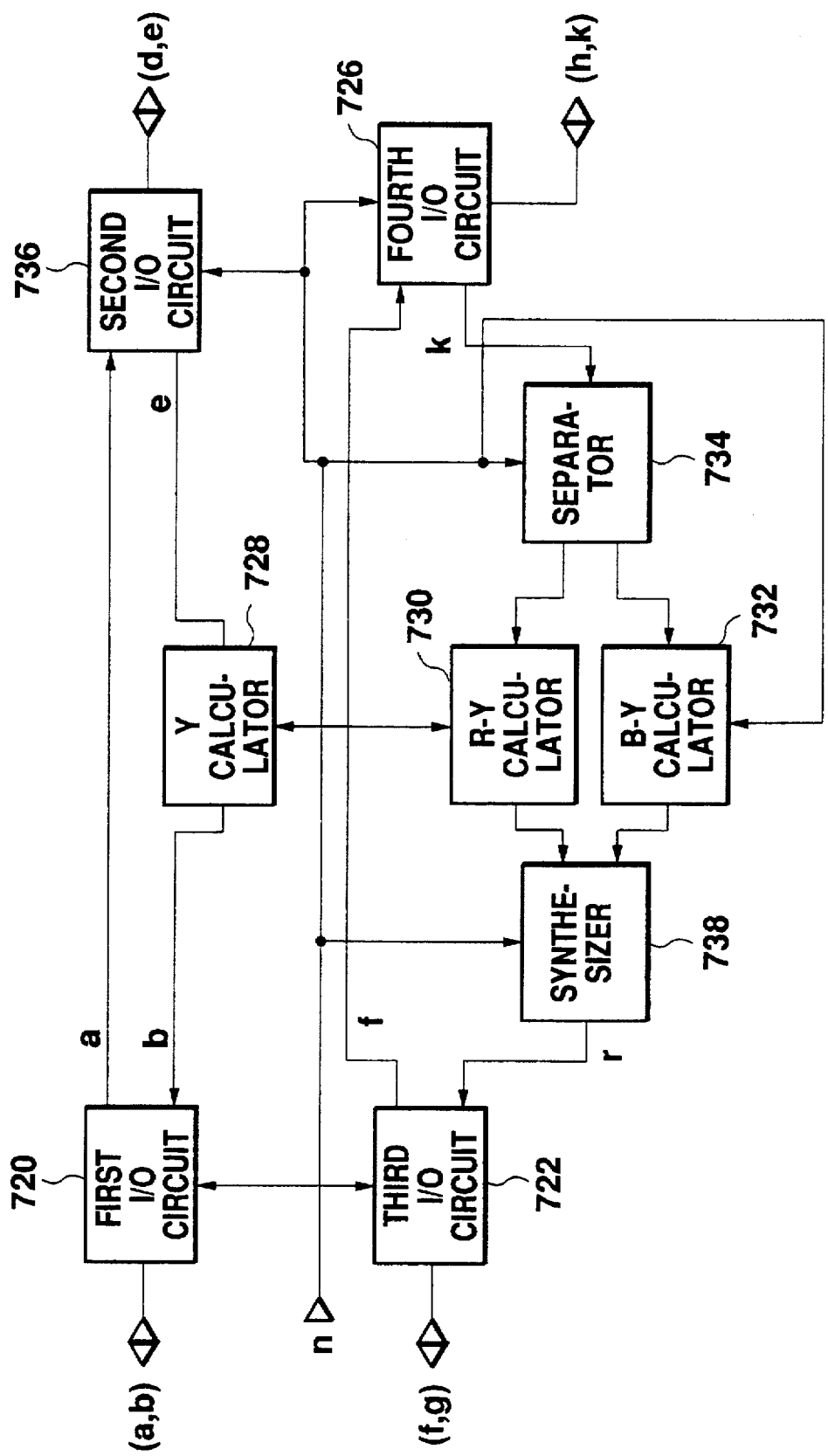
FIG. 41 is a block diagram showing an example of a digital correcting circuit according to this invention.

FIG. 41 shows an embodiment of the digital correcting circuit 702. In FIG. 41, the numerals designate respectively: 720, 736, 722, 726, first-fourth input/output device; 728, 730, and 732, Y calculator, R-Y calculator, and B-Y calculator respectively; 734, separator for R-Y and B-Y signals; and 738, a multiplex synthesizer for R-Y and B-Y signals.

In a freezing process for a desired image, the first input/output device 720 and the third input/output device 722 are set to input mode, while the second input/output device 736 and the fourth input/output device 726 are set to output mode, respectively by a controlling signal (n). In this state, the data (a) is transferred directly to the (d), while the data (b) to (h). In the correcting process and the printing process, the first input/output device 720 and the third input/output device 722 are set to output mode, while the second input/output device 736 and the fourth input/output device are set to input mode. The data (e) are input to the Y calculator 728 to become data (f). The data (k) are separated into R-Y signal and B-Y signal by the separator 734, and correctly calculated in the R-Y calculator 730 and the B-Y calculator 732. These calculated results are converted into a multiplex synthesized signal g again in the synthesizer 738.

At this time, each calculator executes the calculation in accordance with the correction instructed value of the controlling signal (n). This correction instructed value is generated taking account of the relationship between the R-Y and the B-Y, and the relationship between the increase/decrease and the image quality. These operations of the correcting process and the printing process correspond to the supplementary explanation 1.

Figure 42:
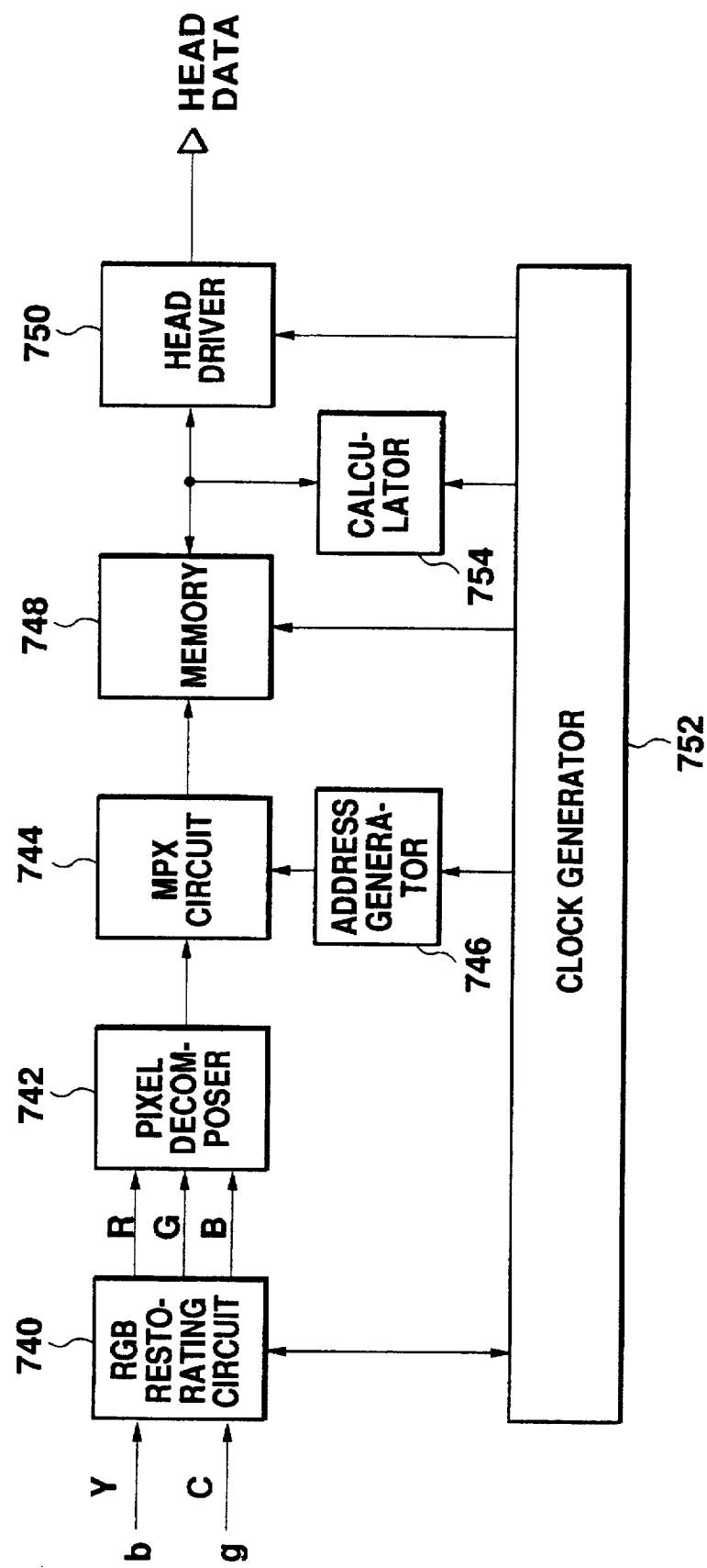
FIG. 42 is a block diagram showing an example of a printing circuit according to this invention.

FIG. 42 shows an embodiment of the printing circuit 712. In FIG. 42, the numerals designate respectively: 740, a RGB restoring circuit; 742, a pixel decomposer; 744, a MPX circuit; 746, an address generator; 748, a memory composed of SRAM and ROM; 750, a head driver; 752, a clock generator; and 754, a calculator.

In operation, the brightness data Y (f) and the color data C (g) are restored to the RGB data in the RGB restoring circuit 740. The RGB data are decomposed in the pixel decomposer 742 into achromatic data and chromatic data. These two data are converted into YMC ink density data by the MPX circuit 744, the memory 748, and the calculator 754. The ink density data are temporarily stored in the memory 748 for time-axis adjustment. The ink density data read from the memory 748 at a predetermined timing are transferred to the head driver 750 and converted into thermal controlling data (head data) for the thermal head 716.

The entire sequence is controlled by the clock generator 752. These correspond to the supplementary explanation 2.

The composition of the above-mentioned embodiment can be applied not only to NTSC standards, but also to PAL standards.

Further, the pixel composition of the image can be freely set not only as 480 (V)*768 (H), but also e.g. 400 (V)*640 (H).

In addition, the digital correcting circuit shown in FIG. 41 and the printing circuit shown in FIG. 42 can be designed in any other composition in accordance with the desired function and purposes.

As mentioned above, according to this invention, it becomes possible to obtain a full-color hard-copy image with only a single encoding process, thereby realizing an economical and printing apparatus of high image quality.

Another embodiment of this invention will now be described.

Figure 43:
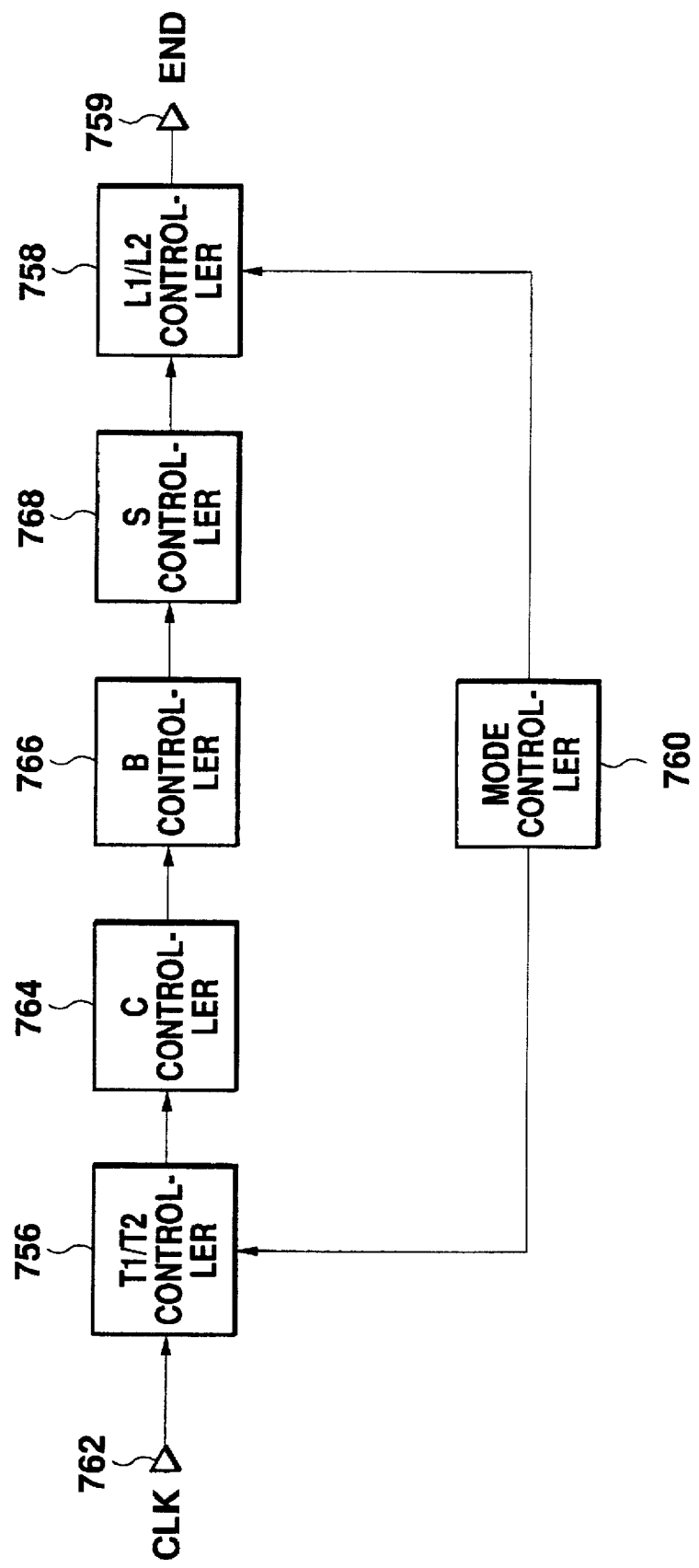
FIGS. 43, 45, and 46 are block diagrams showing examples of a composition for changing one parameter according to this invention.
Figure 45:
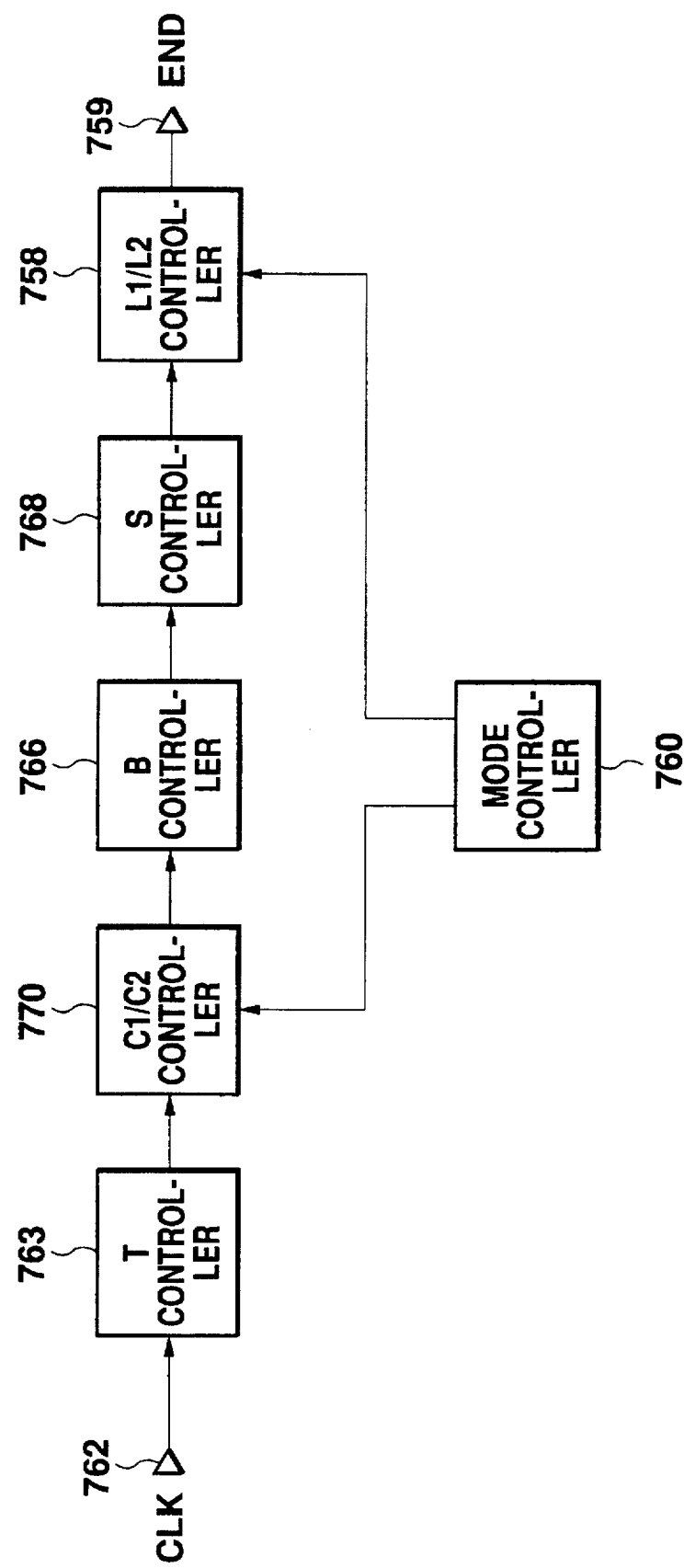
Figure 46:
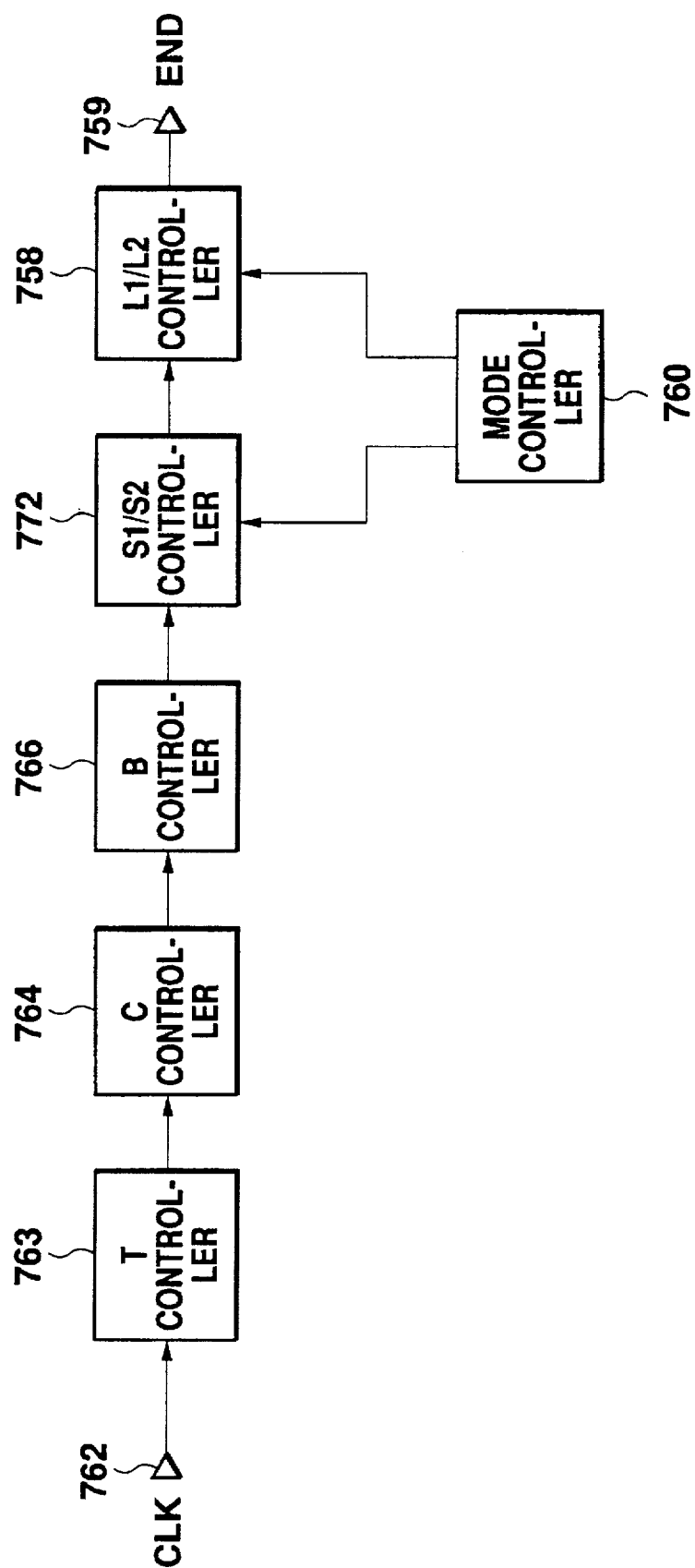

FIGS. 43, 45 and 46 show examples for converting one parameter respectively, among which: FIG. 43, in case of converting the heating reference time T; FIG. 45, in case of converting a continuous number C of the heating reference time by a mode; FIG. 46, in case of converting the number S of sub-lines by a mode. In these figures, the numerals designate respectively: 756, a T1/T2 controller for generating heating reference time T1 and T2 in accordance with the image mode; 758, a L1/L2 controller for controlling the number of recording lines in accordance with the mode; 760, a mode controller for generating mode information and transmitting it. The other components function as in the conventional apparatus.

Figure 44:
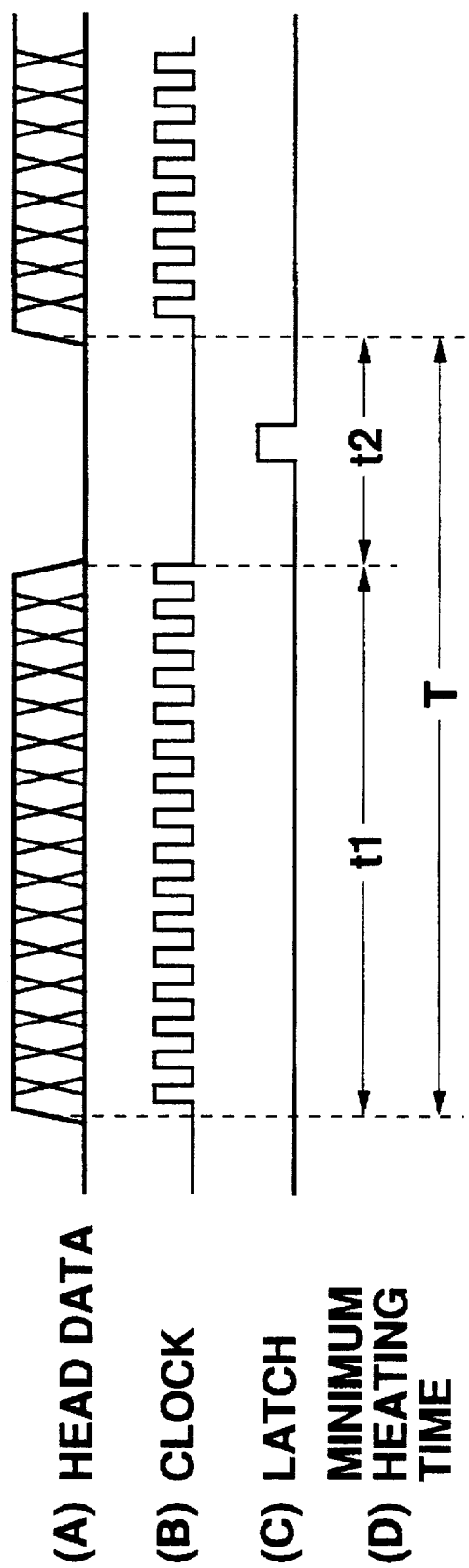
FIG. 44 is a timing diagram showing a detailed sections of a heating reference time.

FIG. 44 shows a timing diagram representing the detailed sections of the heating reference time. In FIG. 44, the codes designate respectively: (A), head data with 16 bit data as an unit; (B), a transferring clock; (C), a latch for setting the head data to the thermal head; (D) detailed sections of the heating reference time.

In operation, in FIGS. 43 and 44, the heating reference time T can be sectioned as T=t1+t2. The t1 stands for a transference section of the head data and cannot be increased or decreased, while the t2 can be freely set so as to adjust the heating reference time in accordance with the image mode. The T1/T2 controller 765 in FIG. 43 controls the CLK signal input to the terminal 762 to satisfy the conditions of:

$$T1*L1=T2*L2, \text{ or } T2/T1=L1/L2.$$

For instance, if it is assumed as L1=640, L2=768, the T2 will be as T2=(5/6) T1.

This heating reference time T2 is frequency-divided as the conventional apparatus by the C controller 764, the B controller 766, and the S controller 768. The recording operation for each of the inks terminates upon completion of all the lines as L2=768. The mode information with respect to this operation is transmitted by the mode controller 760.

Thus, by shortening the heating reference time T2 in the pictorial image recording mode to 5/6 of the heating reference time T1 of the graphic image recording mode, the recording time can be the same.

In FIG. 45, the C1/C2 controller 770 changes the frequency-dividing ratio in accordance with the image mode to satisfy the conditions of C1*L1=C2*L2, or C2=(5/6) C1.

In FIG. 46, the S1/S2 controller 772 changes the frequency-dividing ratio in accordance with the mode with the relationship of S1*L1=S2*L2, or S2=(L1/L2) S1.

The above mentioned embodiments are the cases where only one parameter is changed in accordance with the mode.

Figure 47:
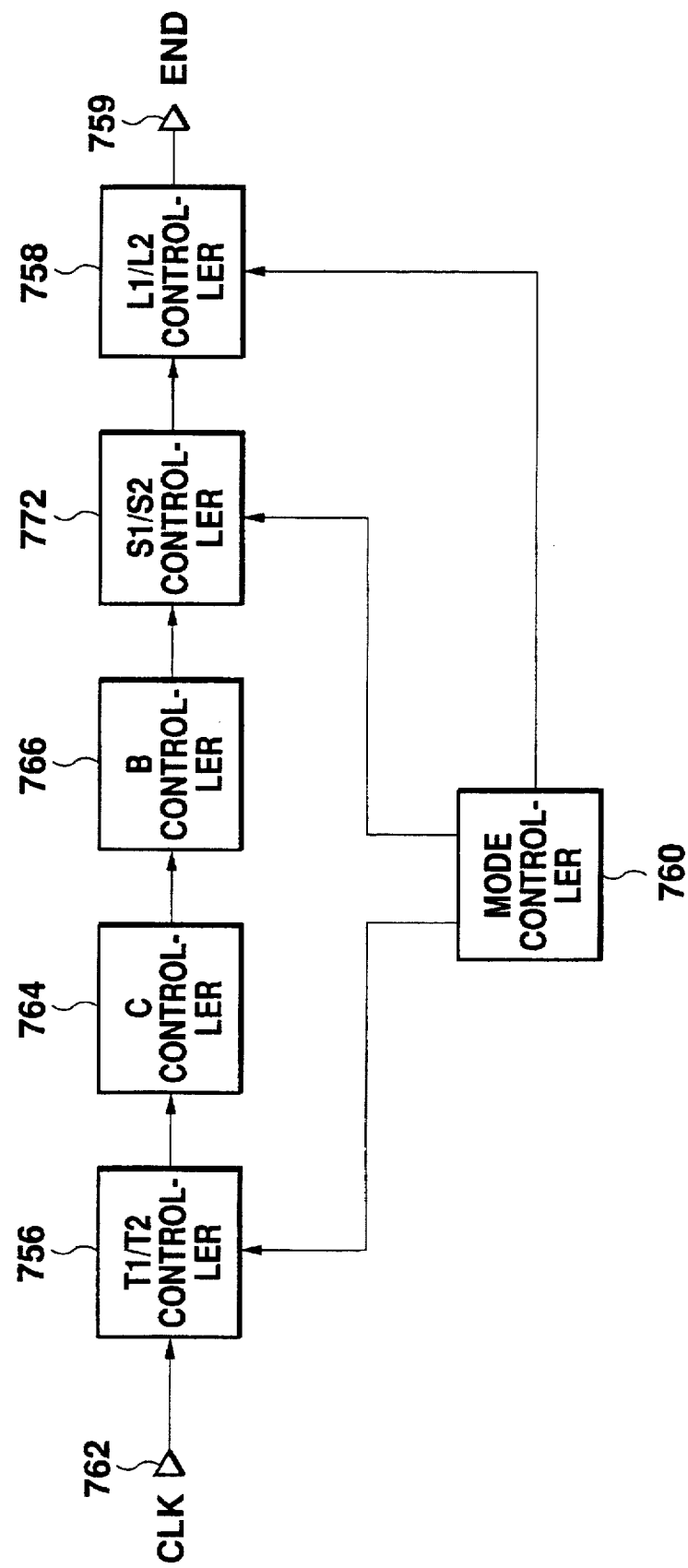
FIG. 47 is a block diagram showing an example of a composition for changing two parameters according to this invention.

FIG. 47 shows another embodiment where two parameters, the heating reference time T and the number S of sub-lines are changed in accordance with the mode to satisfy the condition of T1*S1*L1=T2*S2*L2.

This formula becomes (T2*S2)/(T1*S1)=L1/L2=5/6, and if modified, (T2/T1)*(S2/S1)=5/6.

Although the combinations to meet this conditions are numerous, if e.g. binomial division is executed as 5/6=(10/18* (15/16), and distributed as T2/T1=10/18 and S2/S1=15/16, it becomes T2=(5/9)T1 and S2=(15/16) S1. Thus, recording in accordance with the mode can be realized. There are three types of this combination, T and C, C and S, and above T and S.

Figure 48:
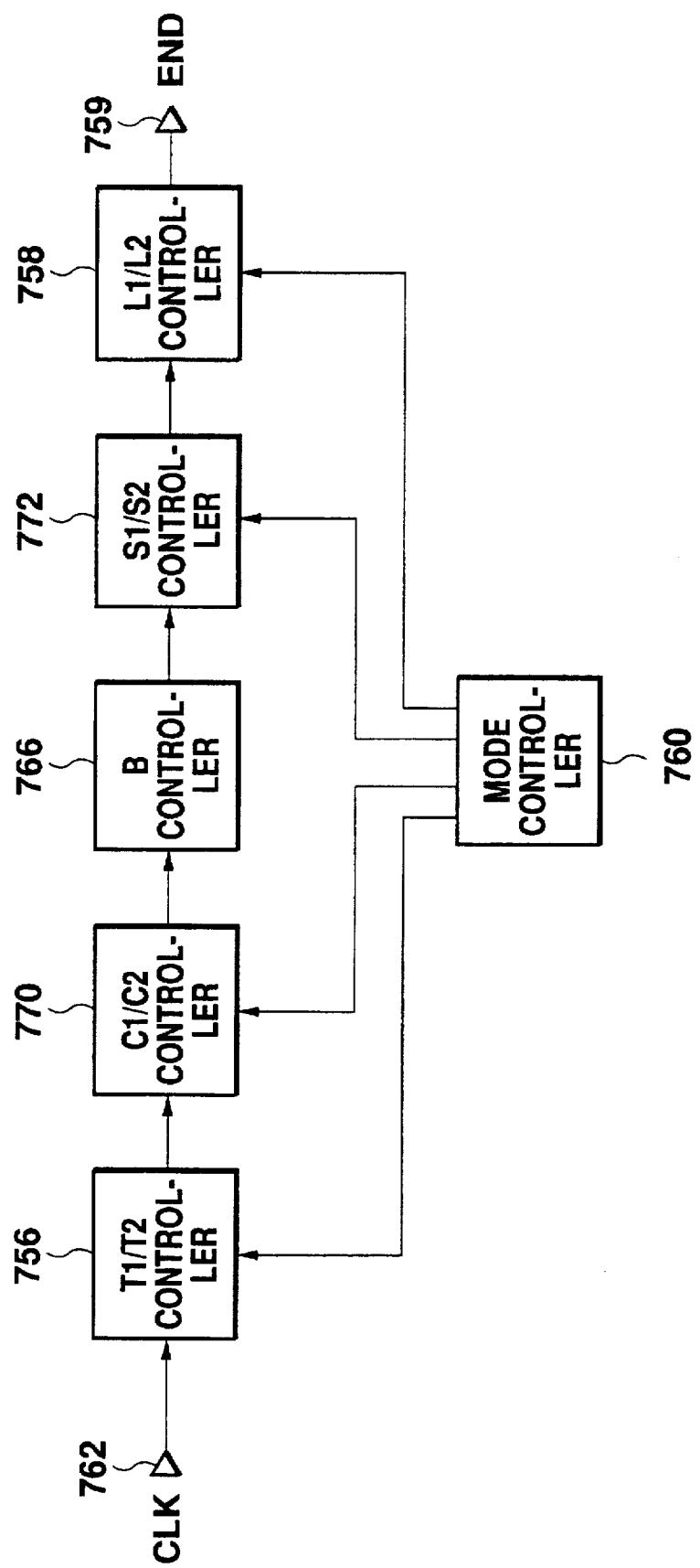
FIG. 48 is a block diagram showing an example of a composition for changing three parameters according to this invention.

FIG. 48 shows an embodiment where three parameters are changed.

The conditional formula is:

$$T1*C1*S1*L1=T2*C2*S2*L2$$

which can be decomposed as L1/L2=(T2/T1)*(C2/C1)*(S2/S1). In this case, the purpose can be attained by tri-nominally decomposing it as $\frac{5}{6}=(\frac{17}{18})*(\frac{16}{17})*(\frac{15}{16})$, and by distributing as T2/T1 $=\frac{17}{18}$, C2/C1=$\frac{16}{17}$, and S2/S1=$\frac{15}{16}$. The distributing method can be freely established, not limited to this example.

Instead of L1=640, L2=768 in the above embodiment, different values can be also used.

Further, not only two modes, but also more than two modes, e.g. three modes of L1=640, L2=768, and L3=512 can be applied.

Furthermore, the number of divided blocks B is not limited to B=3, but it can be free set to other numbers e.g. B=1.

Also, the apparatus to be applied can be either of color recording type or monochrome recording type.

As mentioned above, according to this embodiment, it is possible to provide a hard copy, in the same size and same time, of more than two kinds of images having generally the same number of pixels in one side and different number of pixels in the other side, without changing the operating state of the recording mechanism.

Another embodiment of an image recording apparatus according to this invention will be now described.

Figure 49:
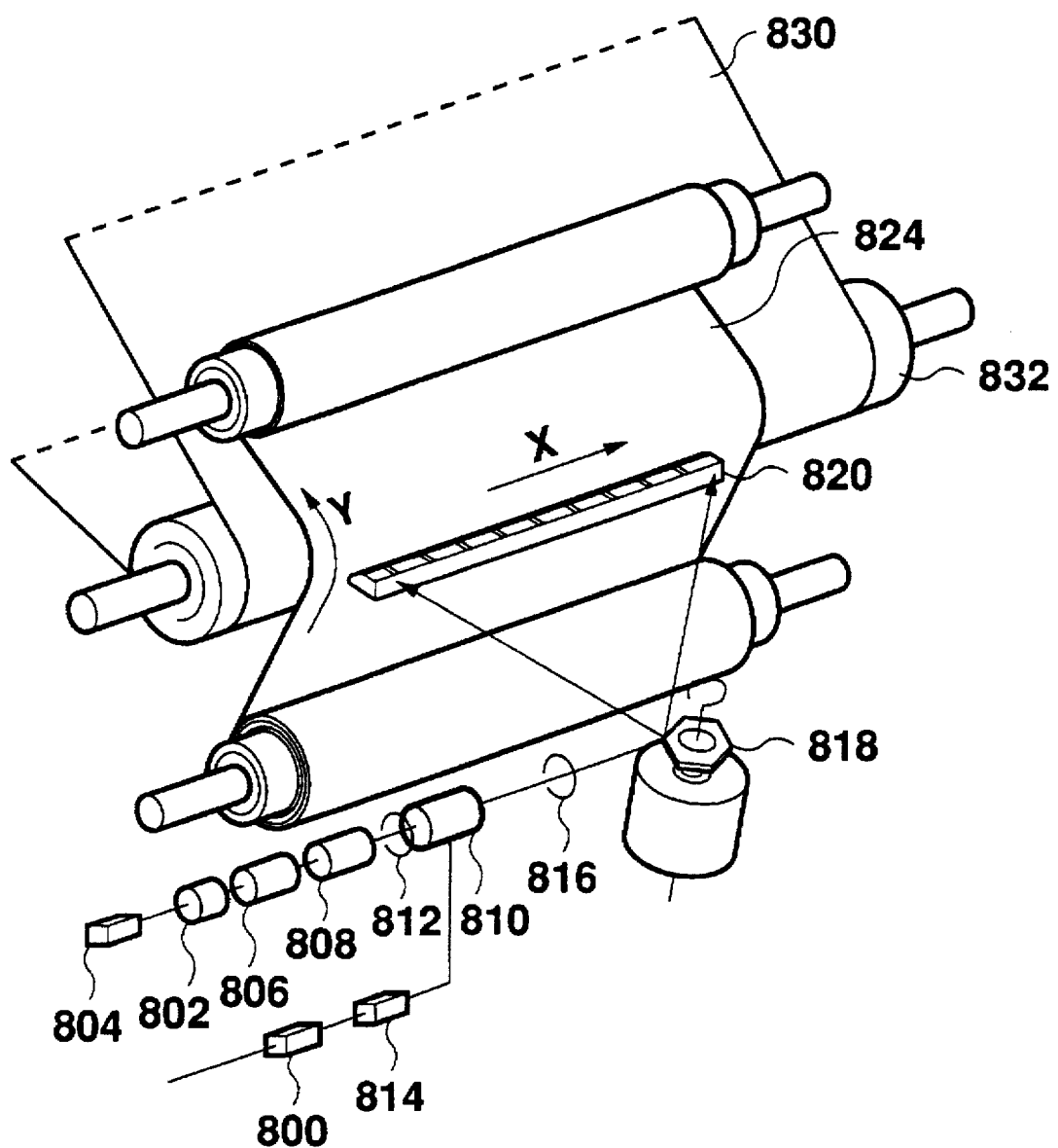
FIG. 49 is a schematic view showing an image recording apparatus according to an embodiment of this invention.

FIG. 49 shows a perspective view of an example of the image recording apparatus, in which the numerals designate respectively: 800, a printing signal generator; 802, an excitation light source; 804, a excitation light source driving circuit for driving the excitation light source; 806, a light focusing system for collecting the excited light; 808, a laser resonator; 810, a light shutter e.g. a liquid crystal shutter for modulating the intensity; 814, a light shutter driving means for driving the light shutter 810 by means of the output signal from the printing signal generator 800; 816, a laser light having been intensity-modulated by the light shutter 810; 818, a light deflecting means such as a rotary polygon mirror; and 820, a light-heat converting head.

Figure 50A:
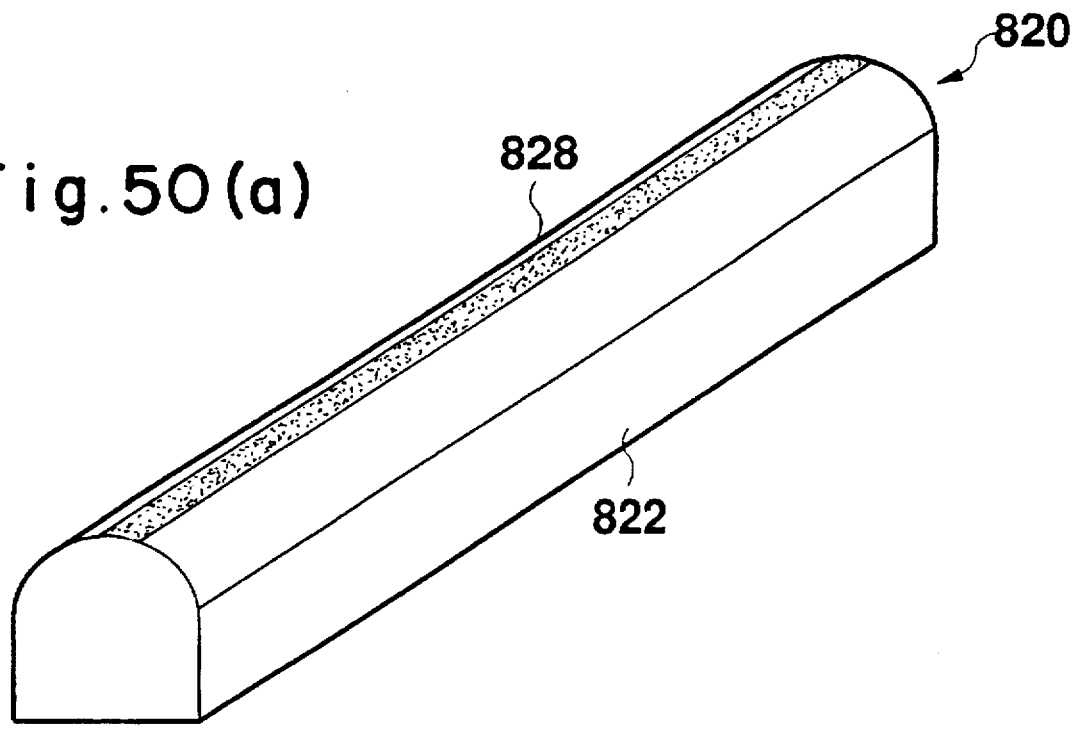
FIG. 50 is a schematic and sectional views showing a light-heat converting head according to an embodiment of this invention.
Figure 50B:
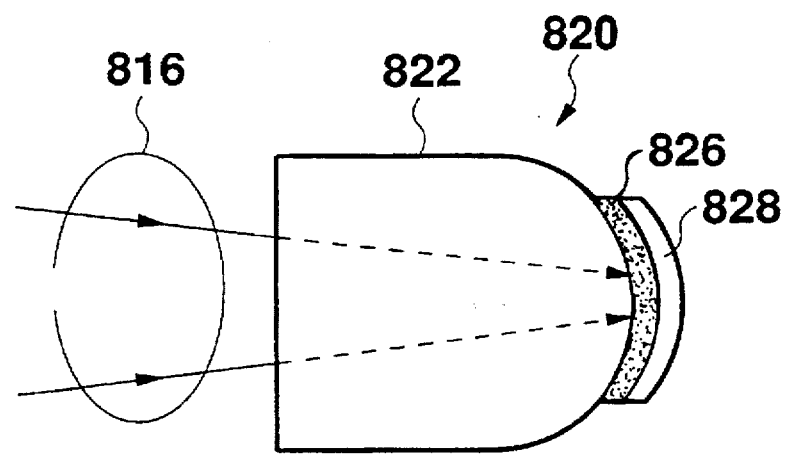

The light-head converting head 820 has such a form as shown in FIG. 50(a), the cross section of which is shown in FIG. 50(b). In FIG. 50(b), the numeral 822 designates a glass base having convex surface at the side with which the ink film 824 contact. On the convex surface portion of the glass base 822, a carbon layer 826 as a light-head converting layer, and an abrasion-proof layer 828 like a DLC (Diamond Like Carbon) film are deposited. The ink film 824 and the recording media 830 are pressingly held between the converting head 820 and the platen roller 832.

In operation, an image signal S is input to the printing signal generator 800 from an external apparatus, and after receiving a predetermined process like a time axis conversion, inputted to the light shutter driving means 814. This light shutter driving means 814 opens/closes depending on the recording image signal supplied from the printing signal generator 800. Therefore, the laser light 812 emitted from the laser resonator 808 is intensity-modulated in accordance with the recorded image signal from the printing signal generator 800 so as to be a intensity-modulated light 816.

Next, the intensity-modulated light 816 is deflected by the light deflecting means 818, and thereafter passes through the glass base 822 of the light-heat converting head 820 to reach the carbon layer 826 in focused state to be converted into heat energy.

Thus generated heat energy is transmitted to the abrasion-proof layer 828, and further to the ink film 824. The transmitted heat energy acts to melt the ink at the light-illuminated portion of the ink film 824 depending on the light intensity for transferring the melted ink to the recording media 830.

The intensity-modulated light 816 is served to the main scanning in the direction of the arrow X. Simultaneously, the ink film 824 and the recording media 830 are transported in the direction of arrow Y direction generally perpendicular to the main scanning direction in accordance with the rotation of the platen roller 832 to perform the secondary scanning. By repeatedly executing such main and secondary scannings, the ink is two-dimensionally transferred to the recording media 830 to provide a desired two-dimensional image.

Figure 51:
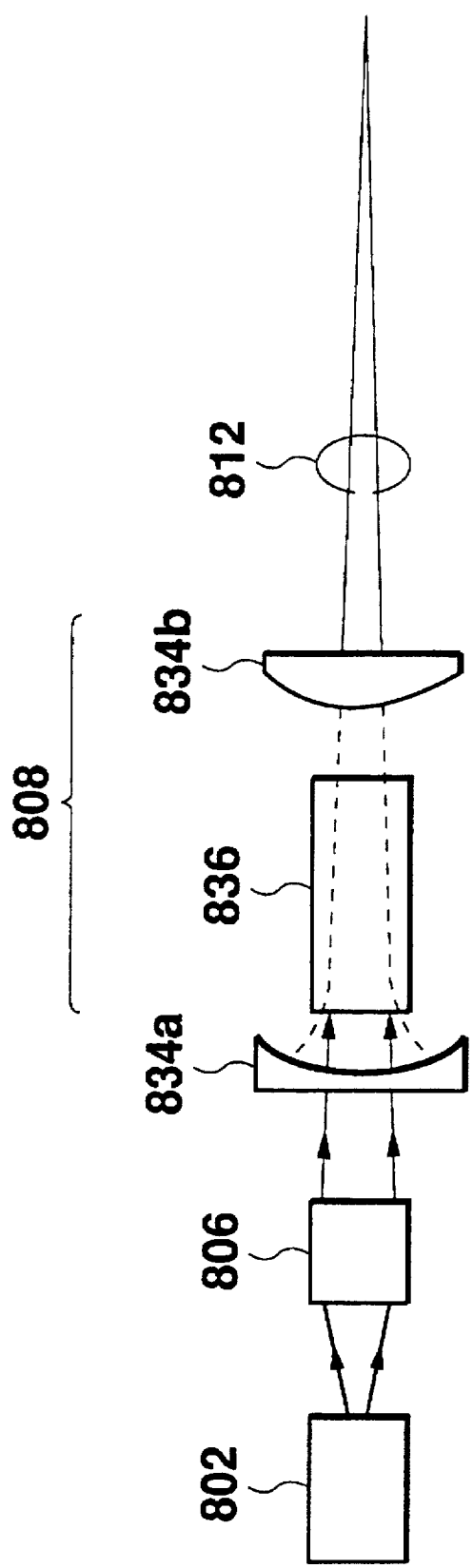
FIG. 51 is a schematic view showing a composition of a laser resonator according to an embodiment of this invention.

FIG. 51 shows an embodiment of the laser resonator 808 comprised of a pair of mirrors 834a, 834b, and exciting media 836. The mirror 834b is an output mirror for the laser light 812.

In such a laser resonator 808, the excited light from the excitation light source 602 enters into the laser resonator 808 through the mirror 834a side. A excitation light is emitted to the laser media 836 in the laser resonator 808, thereby the laser media 836 is light-excited to induce and emit the light to laser-oscillate within the space formed by opposed mirrors 834a, 834b. The laser light 812 generated by the laser oscillation is extracted from the mirror 834b.

As well known, a variety of light beam output configuration can be used by desirably combining the mirrors 834a, 834b in the laser resonator 808. In this embodiment, among such a various combinations, one where a beam waist is provided out of the laser resonator 808 is used. A combination of mirrors 834a, 834b such that the beam waist is located on the light-heat converting head 820 enables to provide a laser beam 812 with focusing effect.

Instead of exciting light impinging method mentioned above, it is also possible to impinge the light through the side of the laser media 836.

Further, it is also possible to impinge the excited light directly on the media without focusing.

Figure 52:
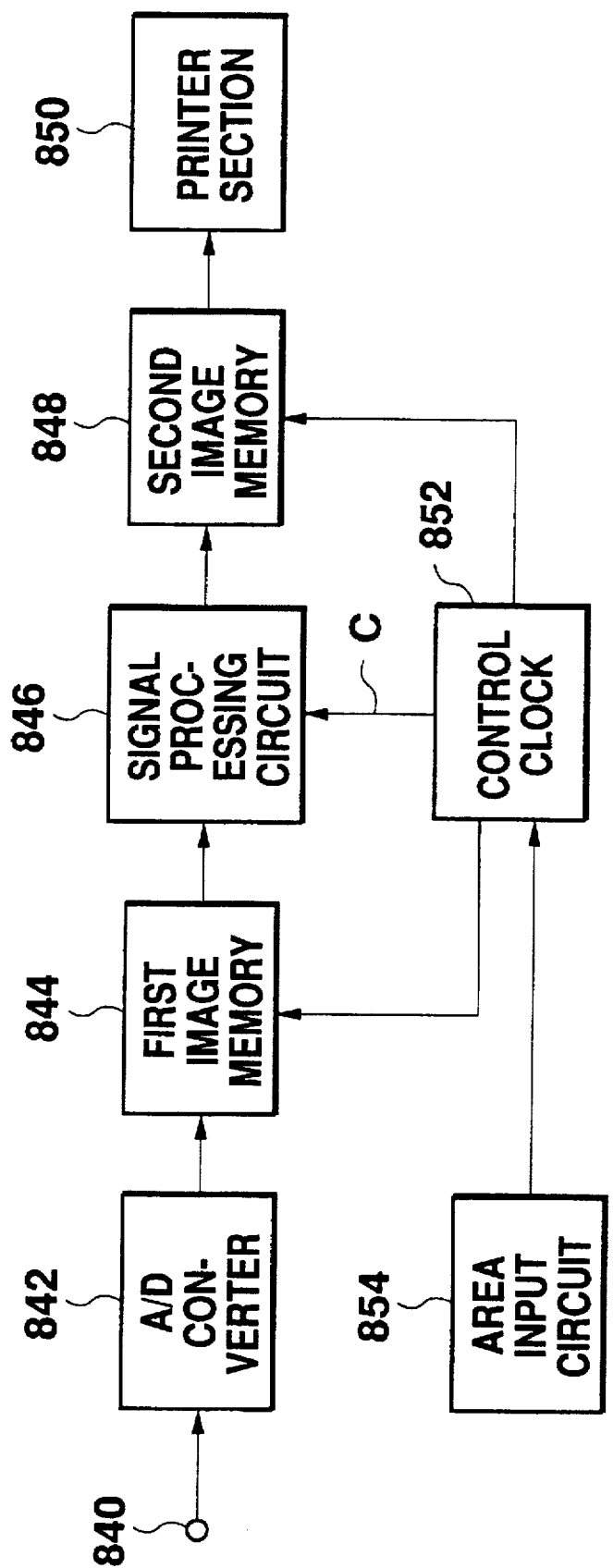
FIG. 52 is a block diagram showing an image signal processing apparatus according to an embodiment of this invention.

FIG. 52 shows a signal processing apparatus according to another embodiment of this invention, where the numerals designate respectively: 840, an input terminal of analog video signal; 842, a quantizing means such as A/D converter; 844, a first image memory for temporarily storing digital image data; 846, a signal processing circuit; 848, a second image memory; 850, a printing section for outputting the image data of the second image memory e.g. as a hard-copy; 852, a controlling block; and 854, an area input circuit.

Figure 53:
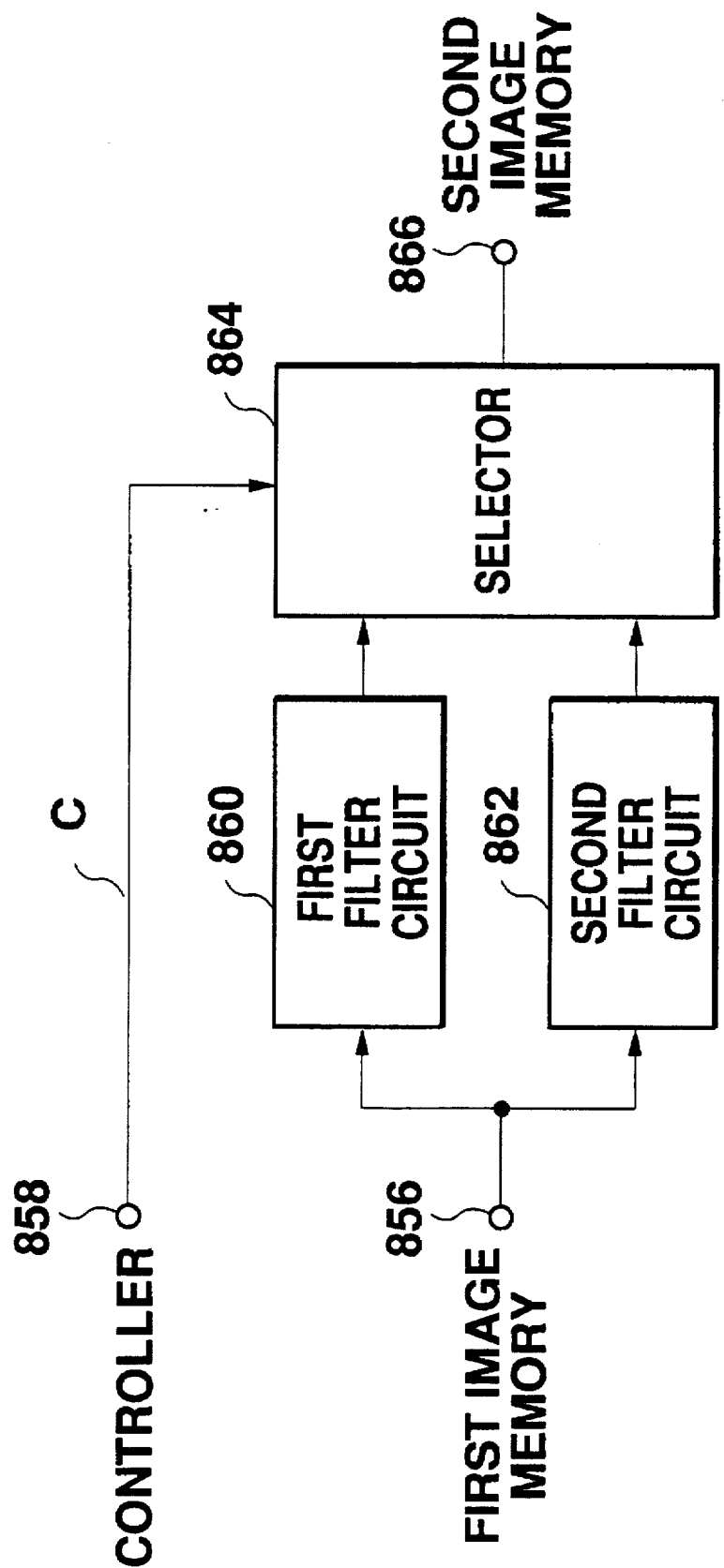
FIG. 53 is a block diagram showing a detailed composition of a signal processing circuit according to an embodiment of this invention.

FIG. 53 shows a detailed embodiment of the signal processing circuit 846, where the numerals designate respectively: 856, an input terminal for image data; 858, a input terminal for area controlling data; 860, a first filter circuit for performing high-band emphasis, for example; 862, a second filter circuit for smoothing the image; 864, a selector; and 866, an output terminal of the processed result.

Figure 54:
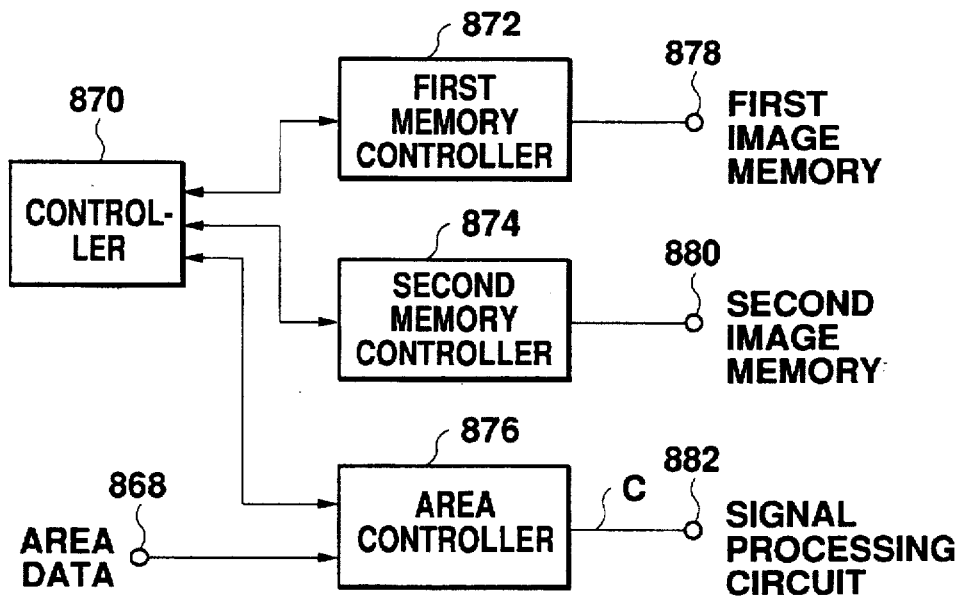
FIG. 54 is a block diagram showing a detailed composition of a control block according to an embodiment of this invention.

FIG. 54 shows an embodiment of the controlling block 852 where the numerals designate respectively: 868, a area data input terminal; 870, a controller; 872, a controller for the first image memory 844; 874, a controller for the second image memory 848; 871, an area controlling circuit for generating area controlling data (C) for controlling the processor; 878, 880, output terminals of the memory controlling data; and 882, an output terminal for the area controlling data (C).

In operation, the video signal having been inputted to the input terminal 840 is converted into digital image data in the A/D converter 842, and temporarily stored in a predetermined address of the first image memory 844. This operation is repeated for the desired number of the pixels, so as to complete the image freezing process.

Figure 57:
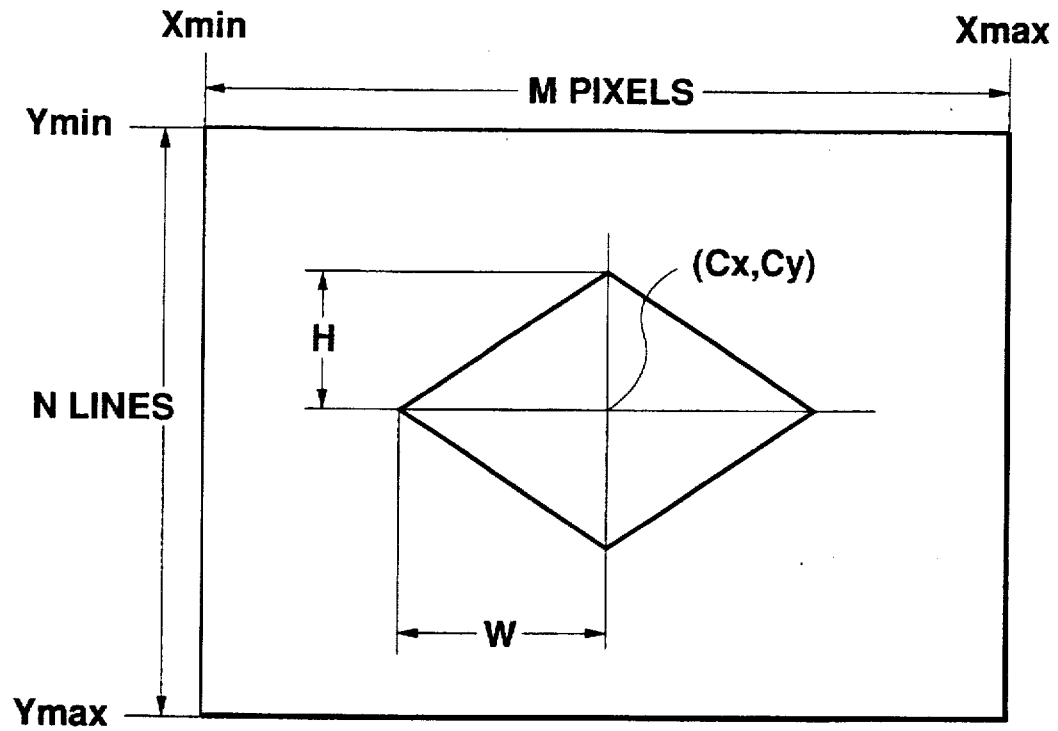
FIGS. 57 through 62 are explanatory views showing the relationship between an image temporarily stored in an image memory and the area designation for a variety of configurations according to an embodiment of this invention.

Next, the operator inputs four variables of the area data (Cx, Cz, W, H). In FIG. 57, if it is assumed that the image data is composed of M pixels*N lines, for example, the inside of the quadrangle is established as a designated area. The codes indicate respectively: (Cx), (Cz), the coordinates position in the lateral and longitudinal directions of the designated area center; (H), a height from the designated area center; (W), a width from the designated area center.

The data of the first image memory 844 are read therefrom under the address control by the first memory controller 872, and inputted to the signal processing circuit 846 shown in FIG. 53. The image data inputted through the input terminal 856 of the signal processing circuit 846 receives high-band emphasis process in the first filter circuit 860, and also receives image smoothing process in the second filter circuit 862. The selector 864 selects either the outputted data from the first filter circuit 860 or the second filter circuit 862 in accordance with the area controlling data (C) inputted through the input terminal 858, and temporarily stored in a predetermined address in the second memory 848 by the second memory controller 874.

The above-mentioned area controlling data (C) are such data which selects the first filter circuit 860 when the following conditions are satisfied, where the target pixel P being (m, n):

$$|n-Cy|<H; \text{ and}$$

$$|m-Cx|<(W/H)\times(H-|n-Cy|)$$

(where | | represents absolute value).

By repeating the above process for the times corresponding of the number of pixels, the signal processing operation for the stored data in the first image memory 844 terminates, and the processed result are frozen in the second image memory 848.

Next, the data having been temporarily stored in the second image memory 848 are read therefrom by the second memory controller 874 to be transferred to the printer section 850 from which the processed image is outputted as a hard-copy.

The processed image under above-mentioned conditions receives an outline emphasis process within an area designated by the operator, while receives smoothing process outside of the area. Thus, specially processed image can be obtained.

Figure 58:
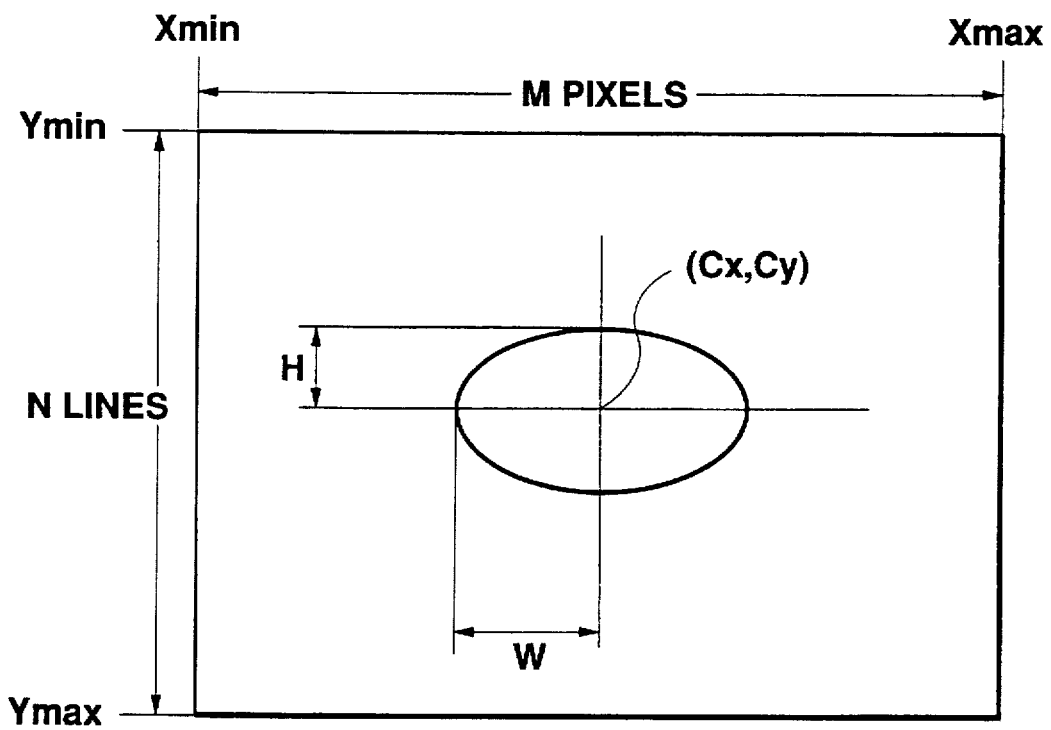

FIG. 58 shows another embodiment where an area is designated in accordance with an elliptic formula, the conditions of which are as follows:

$$|n-Cy|<H; \text{ and}$$

$$(m-Cx)<\{(W)\times[1-(|n-Cy|/H)]\}.$$

Figure 59:
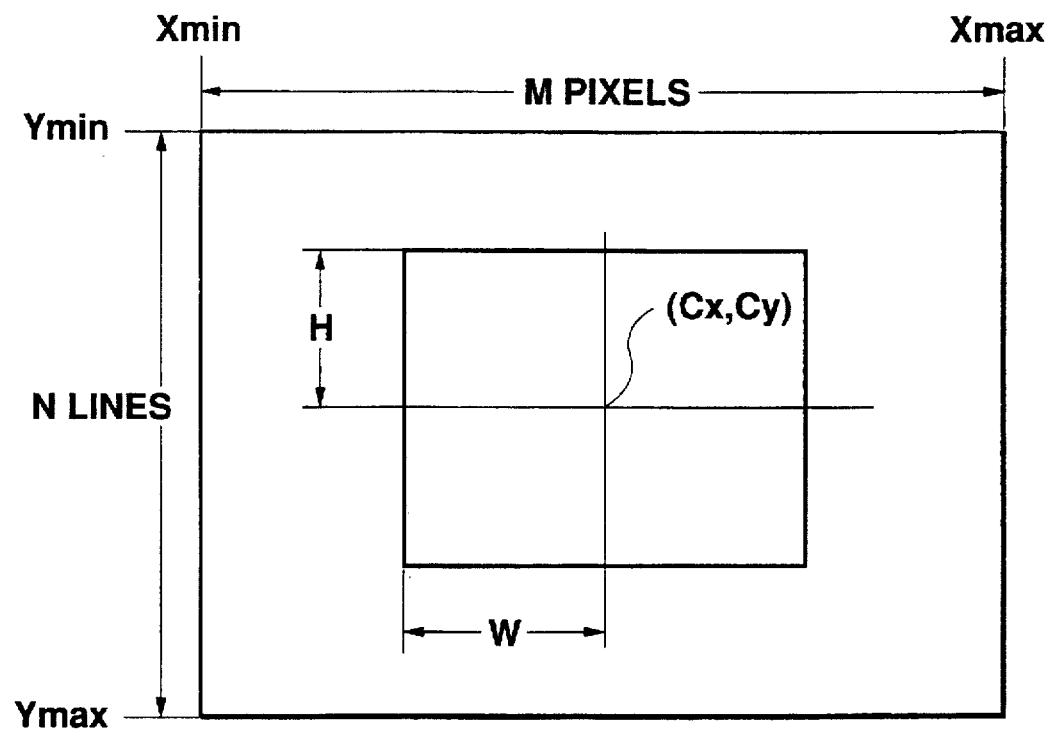

FIG. 59 shows another embodiment where the area is rectangular and the conditional formulas are $$n-Cy<H \text{ and } m-Cx<W$$

Figure 61:
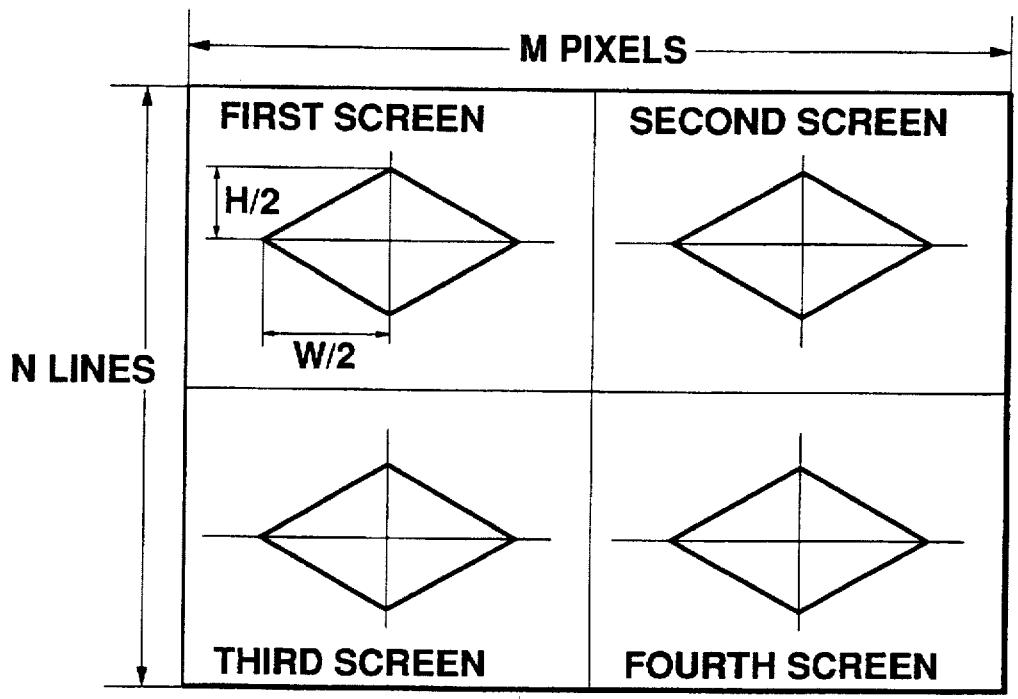
Figure 62:
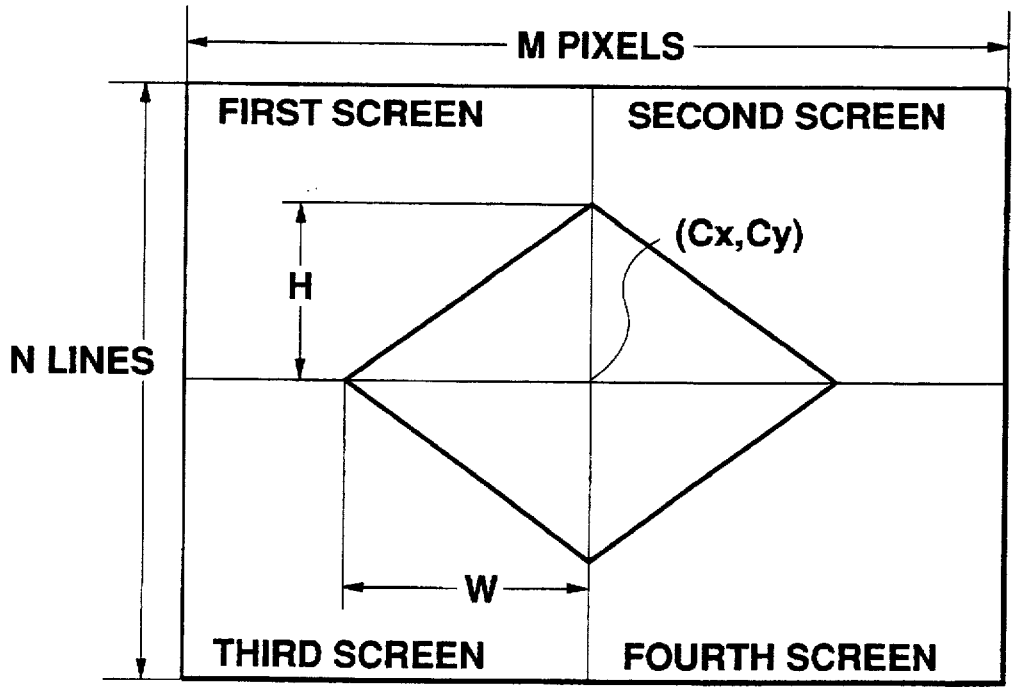

FIG. 61 and FIG. 62 shows another embodiment where an area designation of four sides system in a four multiple screen is executed. In FIG. 61, the area is designated at an address located on the image memory, and (Cx, Cy) represents the center coordinates on the memory and (H, W) represents the height and the width on the image memory. On a real printing image, (Cx, Cy) is the center coordinates of the designated area in each of the small screen, and the height and the width of each area is the half of (H, W).

Figure 60:
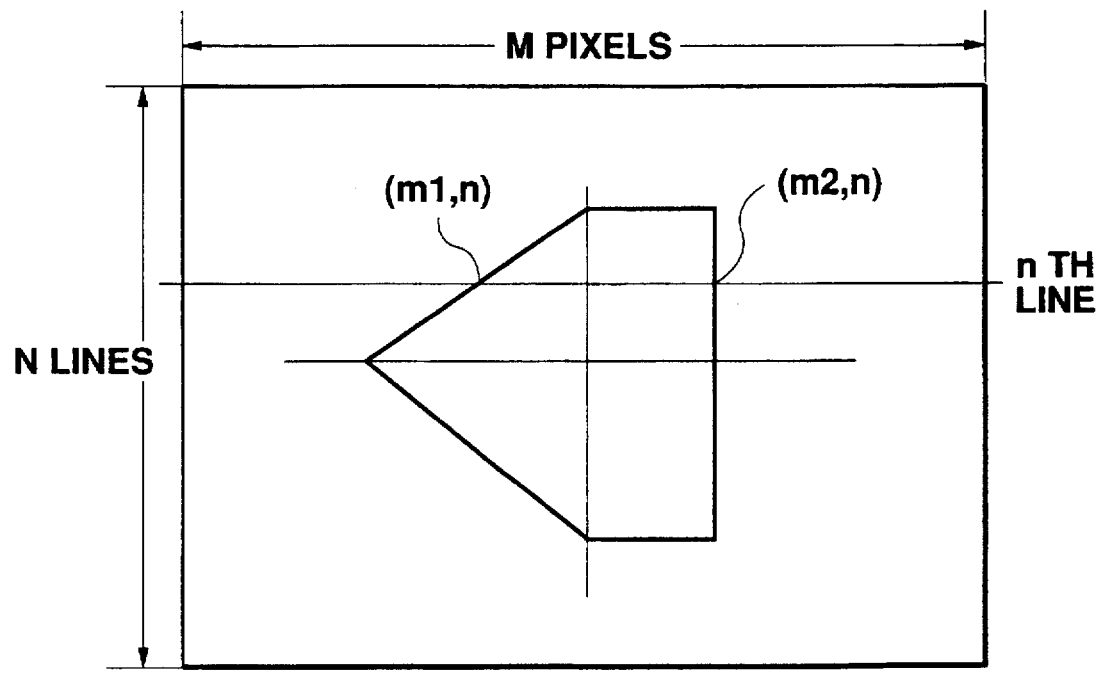

FIG. 60 shows the result after applying the area designation on an address of the printing image. The relationship between the designated area and the controlling data is the same as the conventional printing process except that there are four screens of the printing image.

In the above-mentioned embodiment, a filter for highband emphasis and a filter for smoothing the image are used for the first filter circuit 860 and the second filter circuit 862 respectively. Alternatively, it is also possible to compose such that either one of the both filters do not perform any process, or to compose such that either one of the both filters mosaically process the image. Namely, any combination can be adopted for the first filter circuit 860 and the second filter circuit 862 on condition that the both filters are mutually different in property. The more large such a difference, the more evident the processed result.

Figure 55:
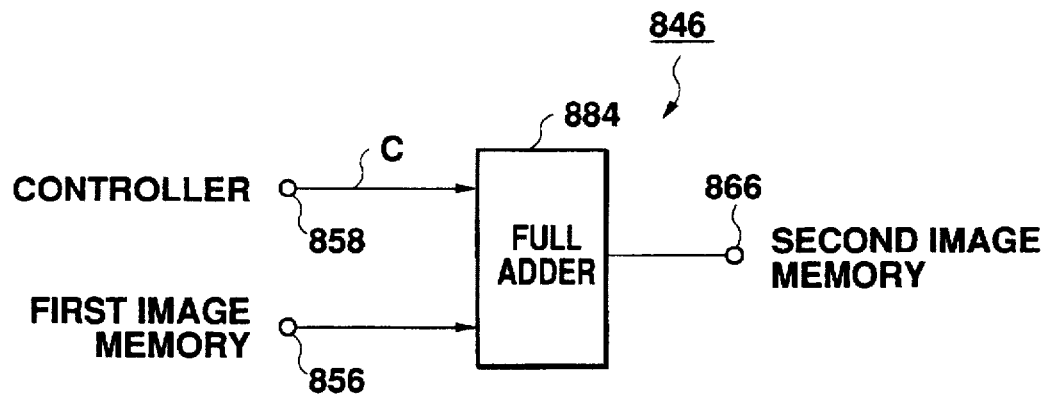
FIG. 55 is a block diagram showing a detailed composition of a signal processing circuit according to another embodiment of this invention.

FIG. 55 shows a signal processing circuit 846 having a adding means for signal processing, where the numeral 884 designates a full-adder.

Next, the operation of the composition shown in FIG. 55 will be described.

The operations before and after the signal processing are the same as in the embodiment shown in FIG. 54 and will be omitted. Likewise this aforementioned embodiment, the operator inputs four variables of the area data (Cx, Cy, W, H) shown in FIG. 57. The data of the first image memory 844 are read by the first memory controller 872 and inputted to the signal processing circuit 846.

The image data input from the input terminal 856 of the signal processing circuit 846 and the area controlling data (C) from the controller are added mutually in the full-adder 884 and outputted through the output terminal 866. The output data are temporarily stored in a predetermined address of the second image memory 848 by the second memory controller 874. The area controlling data (C) in FIG. 57, when the target pixel is represented as P (m, n), would be zero at its output in case of $|n-Cy|<H$; and $$|m-Cx|<(W/H)\times(li-|n-Cy|).$$

Meanwhile, the memory outputs $C=|m-Cx|-(W/H)\times(H-|n-Cy|)$ when $|n-Cy|<H$, and outputs $C=(|m-Cx|-W)+(|n-Cy|-H)$ when $|n-Cy|>H$. By repeating this operation for all the pixels, the area of the image out of the designated area would have a brightness increased proportionally to being far from the image center. On the contrary, if the controlling data (C) are multiplied by (−1), the brightness will be decreased proportionally thereto.

In case of designating an elliptic area as shown in FIG. 58, the conditional formula would be zero when $$|n-Cy|<H;$$

and $$(m-Cx)^2<[(W)^2\times\{1-(|n-Cy|/H)^2\}].$$

When $$|n-Cy|<H, \alpha=(m-Cx)-[(W)\times\{1-(|n-Cy|/H)\}]$$

$$C=\sqrt{\alpha},$$

and when

|m−Cy|≧H,

C=(|m−Cx|−W)+(|n−Cy|−H).

In case of FIG. 59, C=0 when |n−Cy|<H and |m−Cy|<W, and C=|m−Cx|−W when |n−Cy|<H, c=|m−Cx|−W+n−Cy|−H when n−Cy>H. Thus, it becomes possible to obtain the same effect as in the case of rectangle.

In the above embodiment where the signal processing apparatus has an adder, it has been described such that the brightness of the image out of the designated area would be increased or decreased as being far from the image center. Alternatively, it is also possible to fix the controlling data (C) to a desired value. In this case, the area out of the designated area can be set to a desired uniform brightness, or to white or black entirely. This process can be applied also to the designated area.

Figure 56:
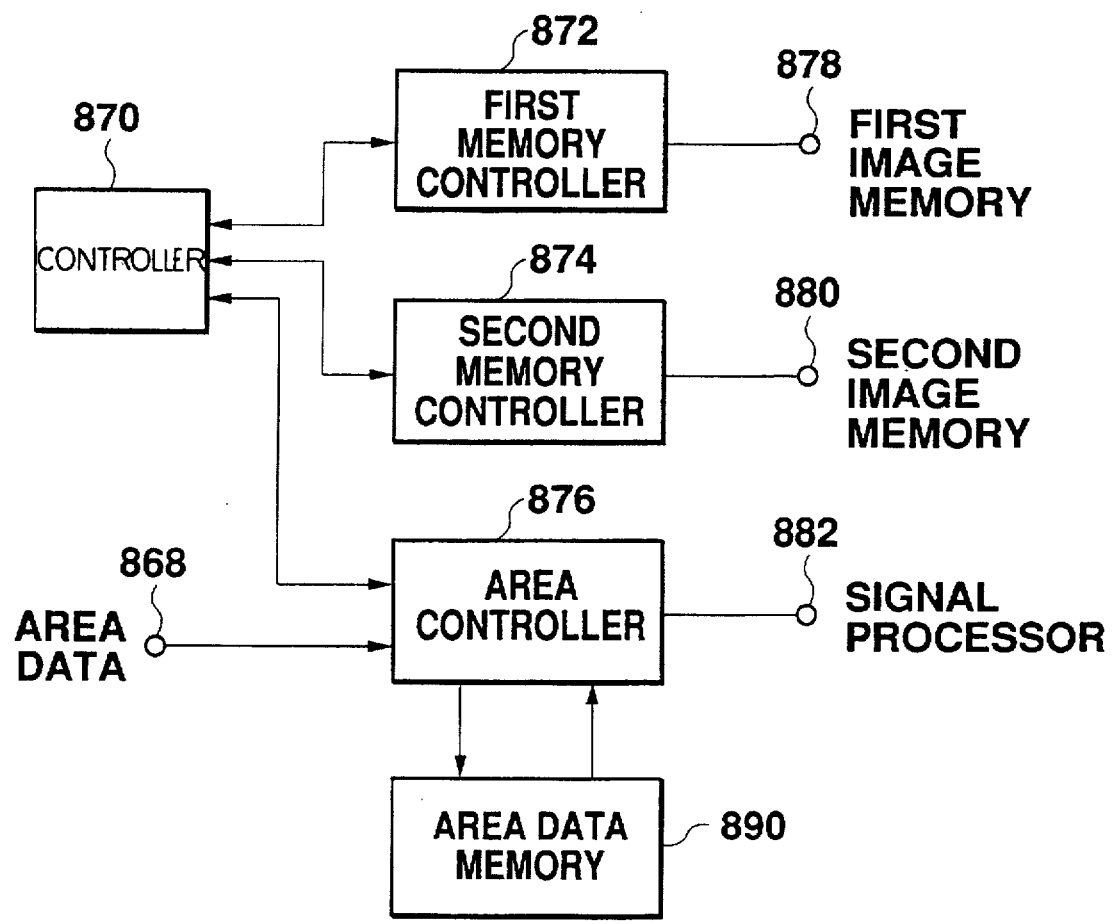
FIG. 56 is a block diagram showing a detailed composition of a controller for designating area according to an embodiment of this invention.

Instead of generating the designated area by the calculating means contained in the area controlling circuit 876, it is also possible to compose it in such a manner as shown in FIG. 56. In FIG. 56, the numeral 890 designates a memory for temporarily storing the area data.

FIG. 60 shows a state where the area is designated by a desired figure. The area data memory has a capacity of e.g. N×2. The data to be stored temporarily in this memory is composed of (number of lines)×(two terms) where the first term is a area starting coordinates and the second term is a area terminating coordinates. In FIG. 60, the data corresponding to the nth line, the first term and second term of the data to be temporarily stored in the memory 890 is (m1) and (m2) respectively. The area controlling circuit 876, on assuming the target pixels as P (m, n), reads the data corresponding to the line being under process, and outputs the controlling data when the condition m1<m<m2 is satisfied as being within the area. Meanwhile, when the condition is not satisfied, the circuit 876 outputs the controlling data as being out of the area. In respect of the other processing circuits, the operations are the same as in the embodiment shown in FIG. 54. By such a composition, a desired area designation can be attained.

Further, it is also possible to store and select plural types of area designating data, using ROM as a area data memory.

Figure 63:
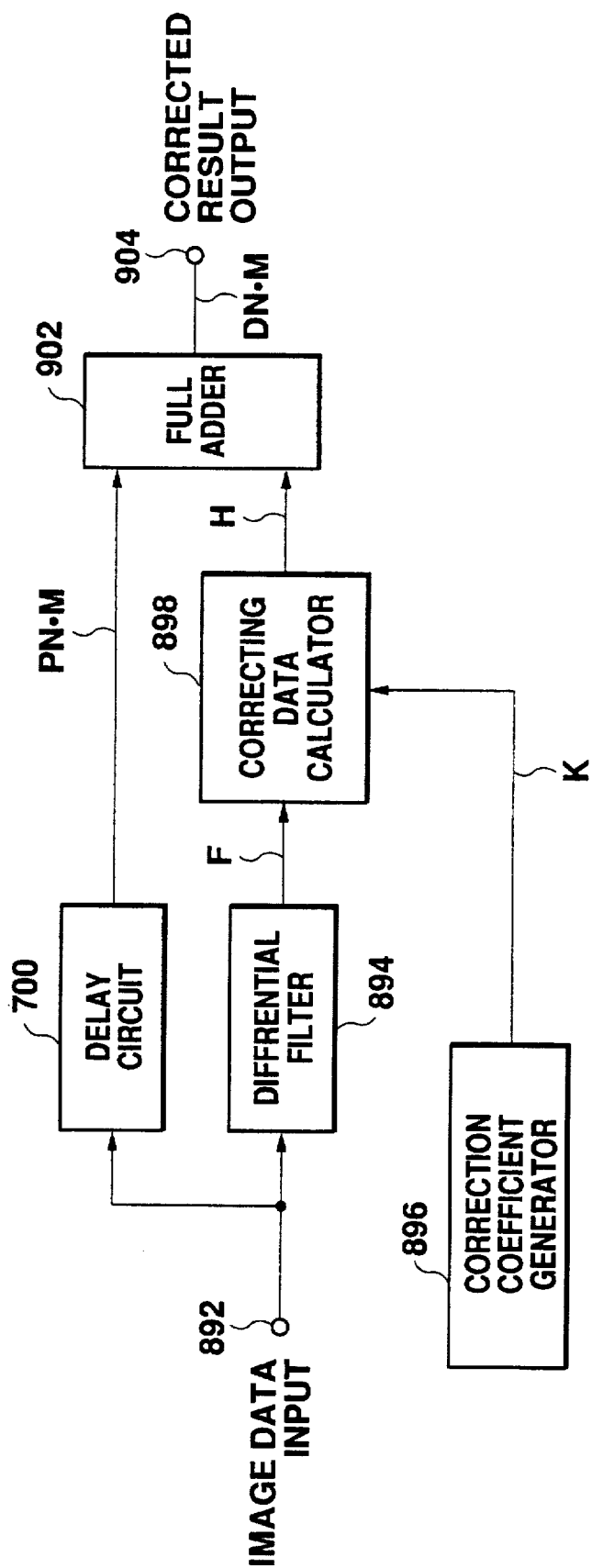
FIG. 63 is a block diagram showing an image signal processing apparatus according to this invention.

FIG. 63 shows a signal processing apparatus according to another embodiment of this invention. In FIG. 63, the numerals designate respectively: 892, an input terminal for image data read from e.g. an image memory and quantized; 894, a differential filter for extracting high-frequency band of the image; 896, a correcting coefficient generating means for generating a correcting coefficient K by inputting correcting degree; 898, a correcting data calculator for calculating correcting data H from output data F of the differential filter 894 and the correcting coefficient K; 900, a delay circuit for a target pixel; 902, a full-adder for adding the target pixel PN*M to the correcting data H; 904, an output terminal for the corrected result DN*M.

Figure 64:
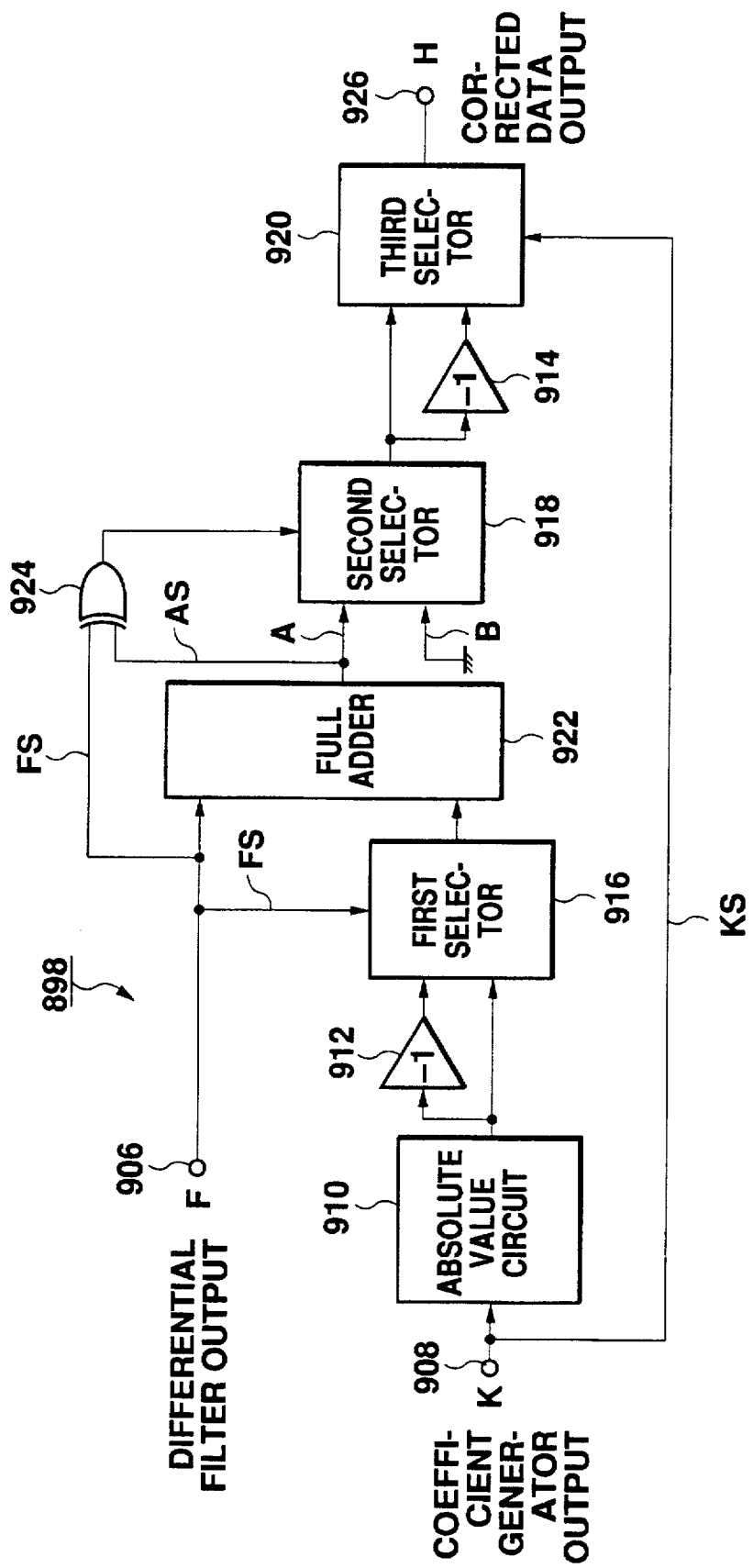
FIG. 64 is a block diagram showing a detailed composition of a correcting data calculating circuit according to an embodiment of this invention.

FIG. 64 shows a detailed composition of the correcting data calculator 898. In FIG. 64, the numerals designate respectively: 906, an input terminal for the output data F of the differential filter 894; 908, an input terminal for the correcting coefficient K; 910, an absolute value circuit; 912, 914, (−1) multipliers; 916, 918, and 920, first through third selectors for selecting either one of the two inputs; 922, a full-adder; 924, an exclusive "or" element; 926, an output terminal for the correcting data H; (A), output data of the full-adder; (B), data representing the value 0 in decimal number; (Fs), a code bit for the differential filter output F; (As), a code bit for the output data A of the full-adder; (Ks), a code bit for the correcting coefficient K.

In operation, the digital image data supplied through the input terminal 892 are transmitted to the differential filter 894 and the delay circuit 900.

The differential filter 894 executes the calculation of:

$$F=\tfrac{1}{8}\{4P_{N-M}-P_{N-1-M}-P_{N-M-1}-P_{N-M+1}-P_{N+1-M}\}$$

to extract the high-frequency component F.

Meanwhile, the correcting coefficient K is generated by e.g. key input in the correcting coefficient generator 896. The high-frequency component F is inputted to the input terminal 906 of the correcting data calculator 898, and the correcting coefficient K is inputted to the input terminal 908. The correcting coefficient K is supplied to the absolute value circuit 910 to be |K|, and the (−1) multiplier 912 calculates −|K|.

The |K| and −|K| are inputted to the first selector 916 and selected by the sign bit (Fs) of the high-frequency component F, thereafter transmitted to the full-adder 922. The full-adder 922 generates and outputs data A made by adding the output data of the first selector 916 and the high-frequency component F.

Next, the second selector 918 selects and outputs either one of the data A or the data B by the exclusive "or" element 924 of the signs (Fs) and (As). The third selector 920 selects, by the sign (Ks), either the outputted data of the second selector 918 or the data being multiplied by (−1) by the (−1) multiplier 914, and outputs them as corrected data H.

Figure 65:
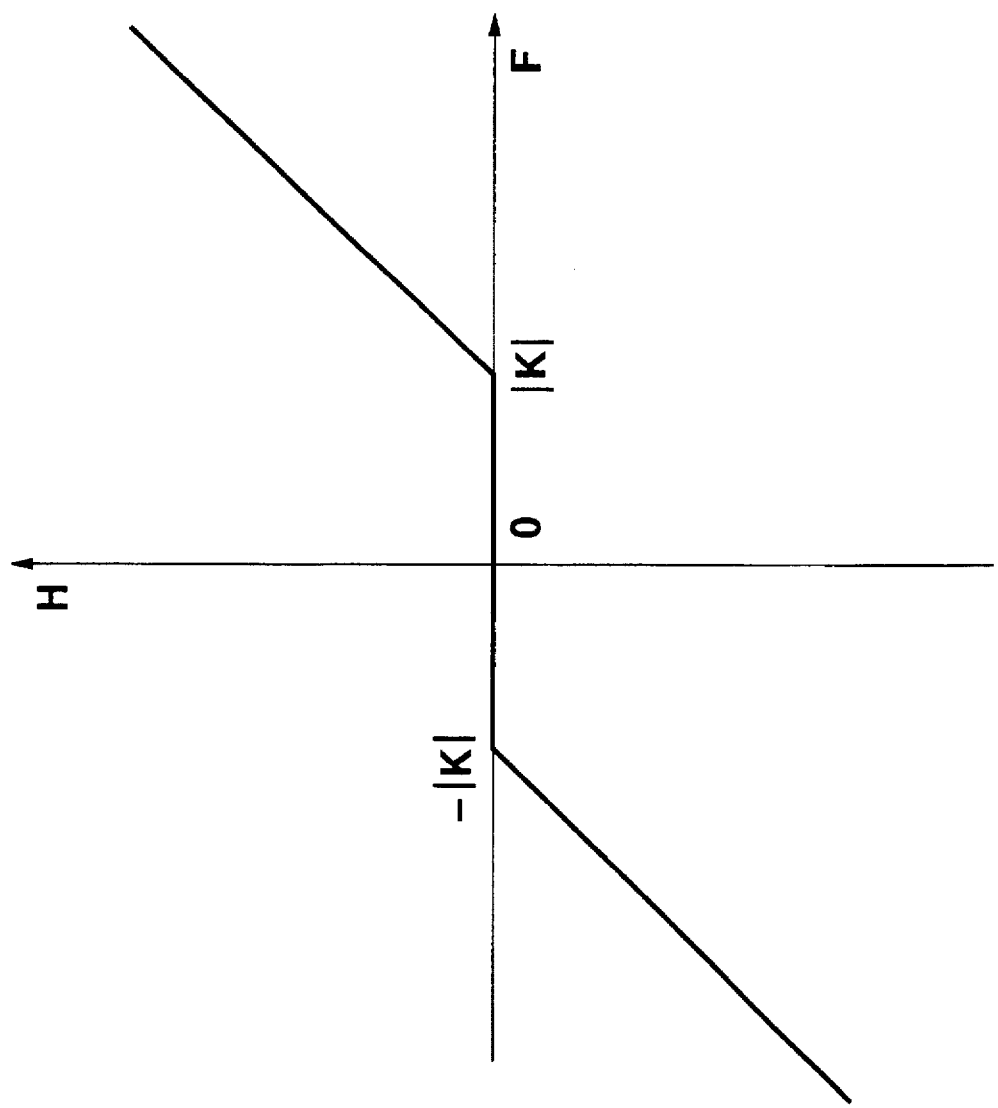
FIG. 65 is a graphic diagram showing a relationship between an input data F and a correcting coefficient K and an output data H according to an embodiment of this invention.

FIG. 65 shows a relationship between the high-frequency component F and the absolute value of the correcting coefficient |K| and the corrected data As shown in FIG. 65, the larger the |K|, the smaller the corrected data H corresponding to the high-frequency component.

The corrected data H and the target pixel $P_{N,M}$ having been delayed by the delay circuit 900 for timing adjustment are mutually added in by the full-adder 902 to be outputted as corrected data $D_{N,M}$.

Figure 66:
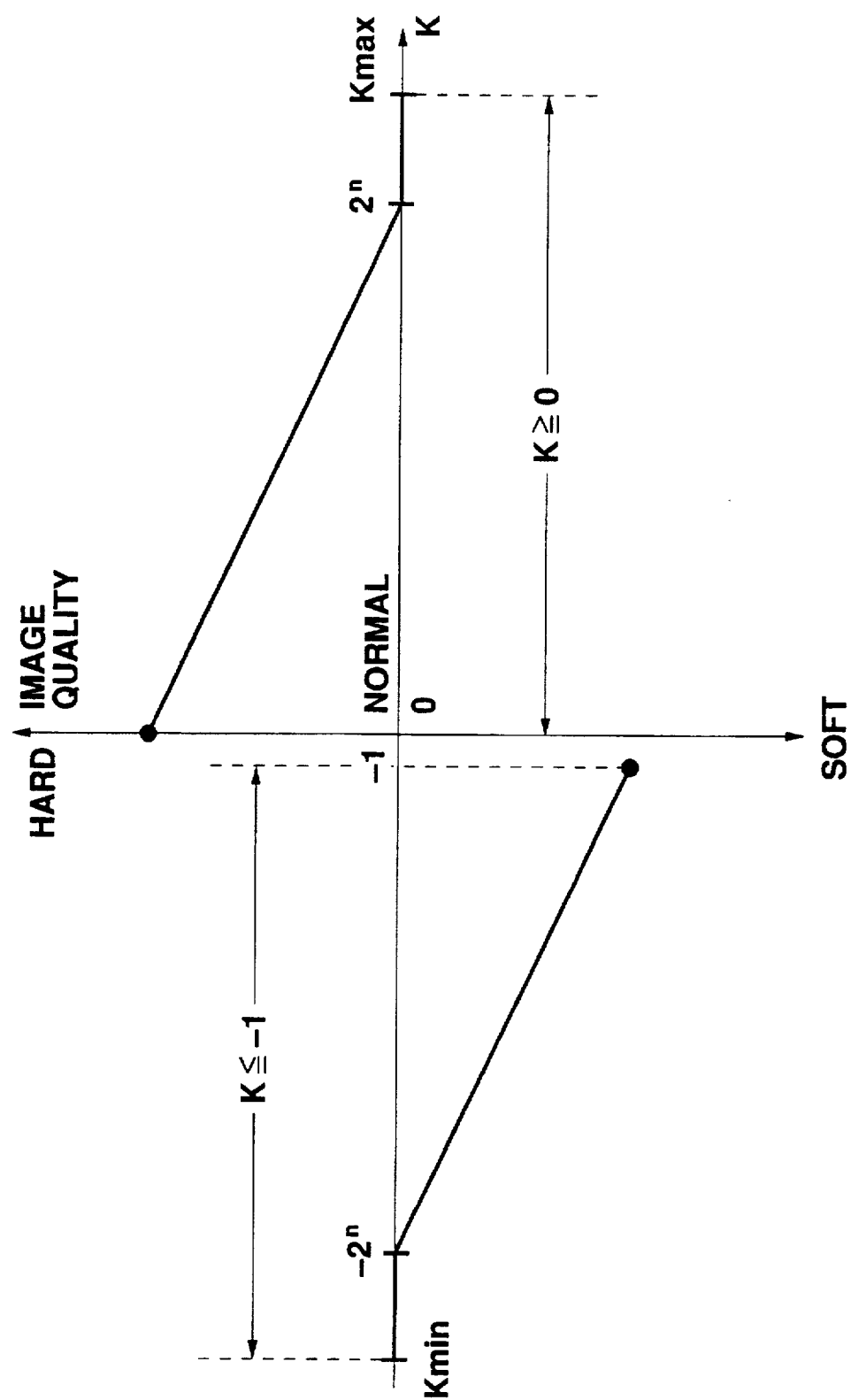
FIGS. 66 and 67 are graphic diagrams showing a relationship between a state of an image resulted from an outline correction and a correction coefficient K.
Figure 67:
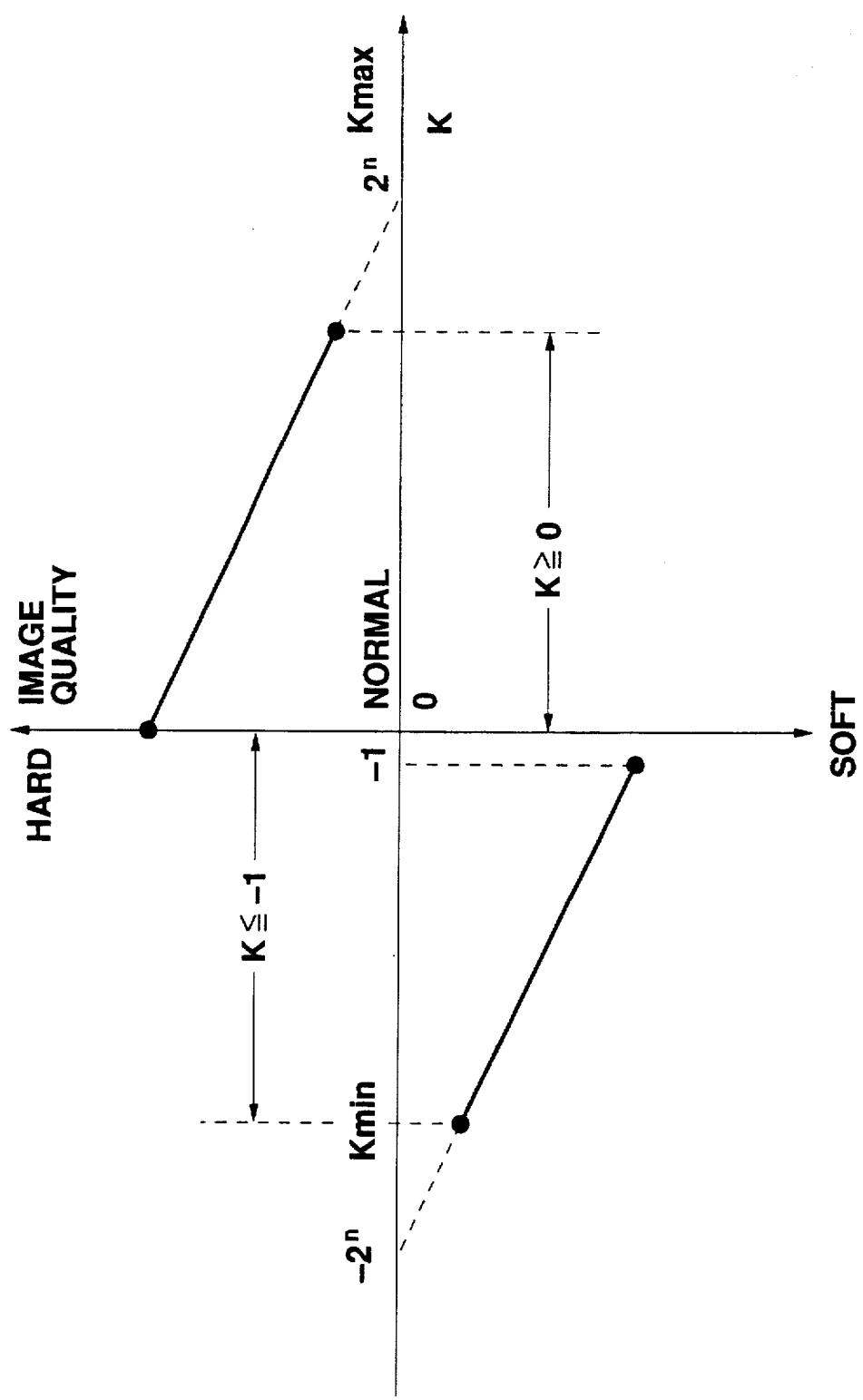

FIG. 66 and 67 show an example of the relationship between the correcting coefficient K and the image quality after corrected its outline. In FIG. 67, the characters designate respectively: n, number of quantized bits of the image data; Kmax, a maximum value of K (a positive more than 1) and Kmin, a minimum value of K (a negative less than −1) where Kmin≈Kmax. When K=0, the outline is emphasized to the maximum. When K=Kmin, the outline is the less smoothed. But as shown in FIG. 66, in the ranges where Kmax≧K≧(2$^n$) when Kmax≧(2$^n$) and Kmin≦−(2$^n$) when Kmin≦−(2$^n$), it becomes the non outline-corrected original image. When K=−1, the outline becomes smoothed at the maximum. As mentioned above, using the correcting coefficient K, it is possible to correct the image desirably within a range from the most hard image to the original, and the most soft image.

In the aforementioned embodiment, a key-input has been applied to the correcting coefficient generator 896, alternatively it is also possible to adjust the voltage by means of a variable resistance and to quantize the output voltage by A/D converter to provide the correcting coefficient K. Namely, any man-machine interface means can be used.

Further, the differential filter 894 for extracting high-frequency component is not limited to that used in above-mentioned embodiment, but those having desired composition and coefficient can be used.

Figure 68:
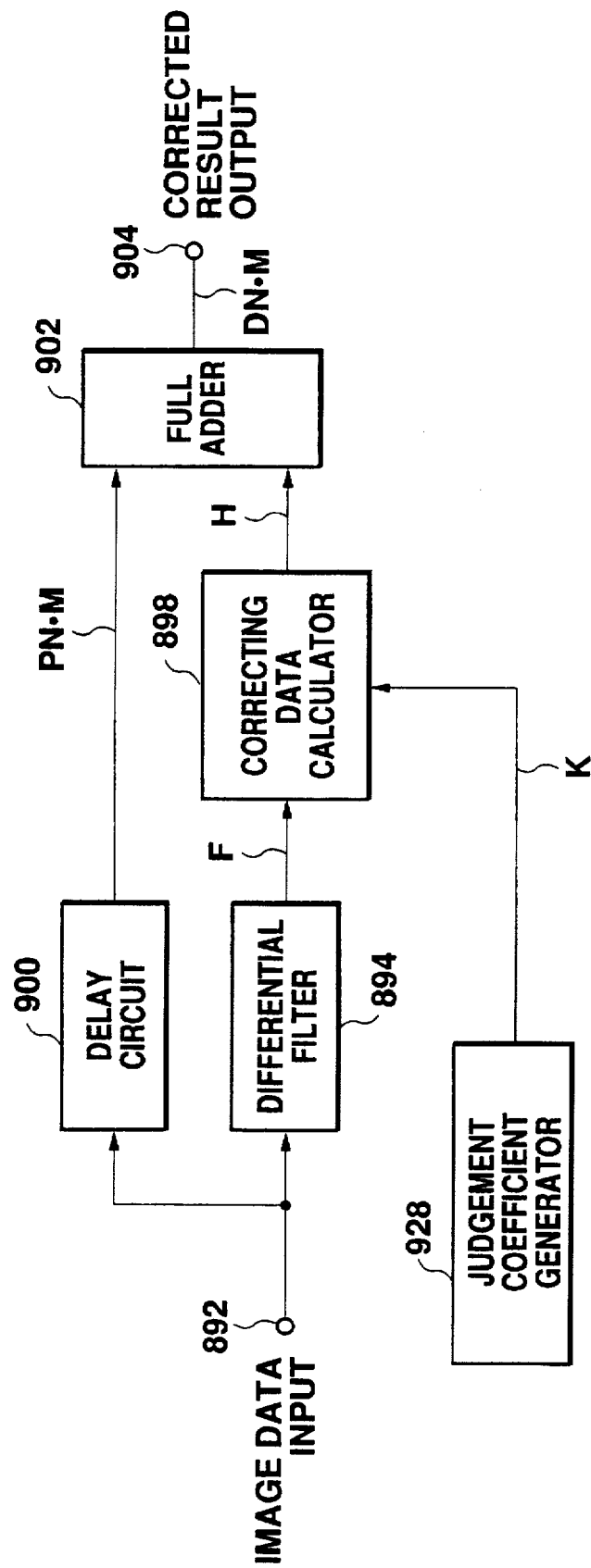
FIG. 68 is a block diagram showing an image signal processing apparatus according to an embodiment of this Invention.

FIG. 68 shows an image signal processing apparatus according to another embodiment of this invention. In FIG. 68, the difference from the embodiment shown in FIG. 66 is the used of the judging coefficient generator 928 is used instead of the correcting coefficient generator 896. The other components are the same as used in the embodiment of FIG. 64, and the descriptions thereof are omitted here.

Figure 69:
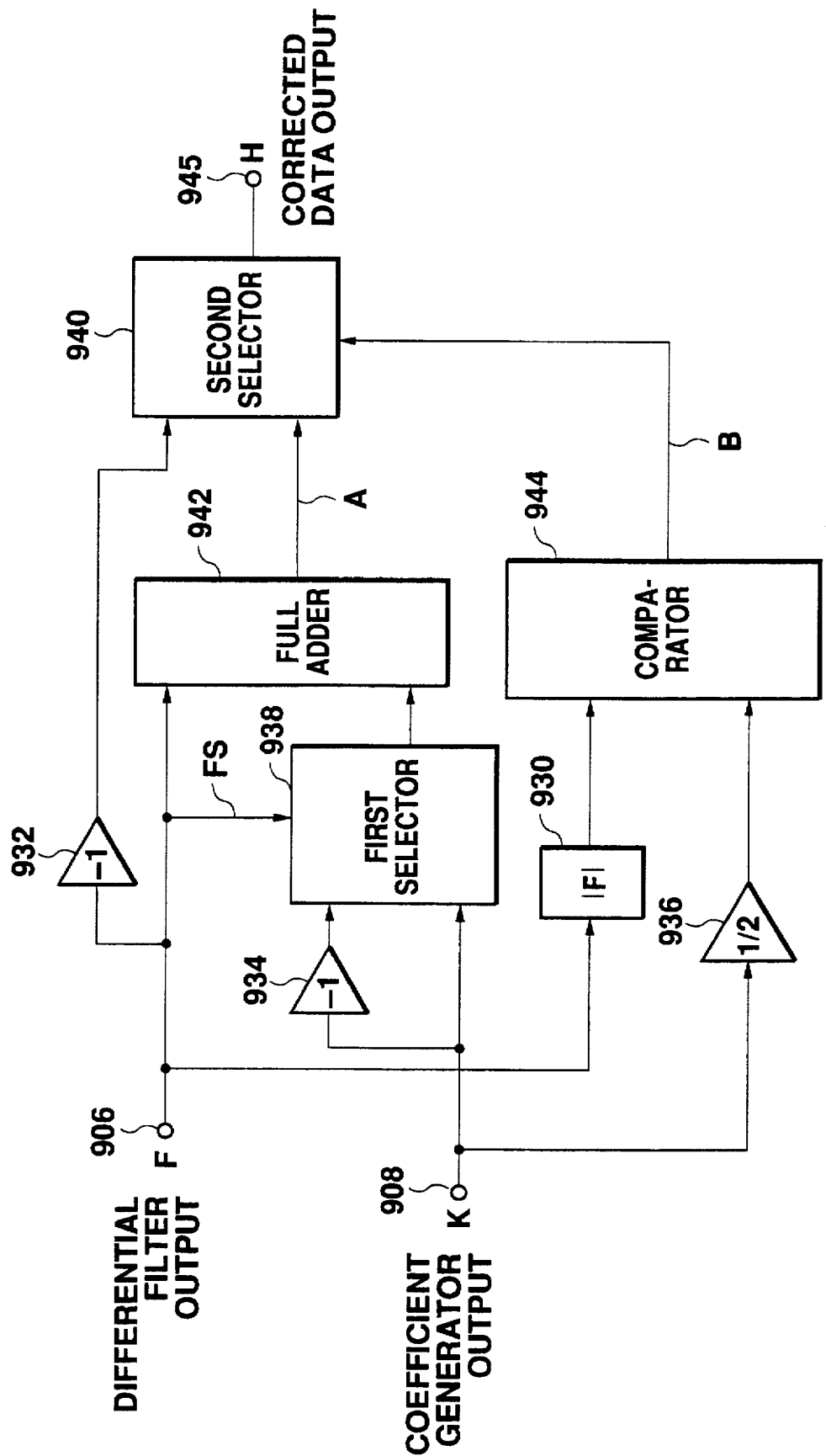
FIG. 69 is a block diagram showing a detailed composition of a correcting data calculating circuit according to an embodiment of this invention.

FIG. 69 is a detailed embodiment of the corrected data calculator 898, where the numerals designate: 906, an input terminal for output data F of the differential filter 894; 908, an input terminal for the judging coefficient K; 980, an absolute value circuit; 932,934, a (−1) multiplier; 936, (1/2) multiplier; 938, 940, a second selector for selecting either one of two inputs; 942, a full-adder; 944, a comparator; (A), output data of the full-adder; (Fs), a sign bit of the differential filter F; (B), output data of the comparator 944.

In operation, the digital image data inputted to the input terminal 892 are supplied to the differential filter 894 and the delay circuit 900.

The differential filter 894 executes the calculation of $F=\frac{1}{8}\{4P_{N-M}-P_{N-1-M}-P_{N-M+1}-P_{N+1-M}\}$ and extracts the high-frequency component F. The (−1) multiplier 932 calculates (−F), while the absolute value circuit 930 calculates |F|.

On the contrary, the discriminating coefficient K is generated in the discriminating coefficient generator 928, for example by a key input. Here, K is positive. The high-frequency component F is inputted to the input terminal of the corrected data calculator 898, and the discriminating coefficient K is inputted to the input terminal The (−1) multiplier 934 calculates (−K) and the (1/2) multiplier 936 calculates (K/2). These (K) and (−K) are selected by the code bit (Fs) of the high-frequency component F in the first selector 938, and transmitted to the full-adder 942. The full-adder 942 outputs the added result of the outputted data from the first selector to the high-frequency component F.

Meanwhile, the comparator 944 outputs the compared result (B) of |F| with (K/2). The second selector 940 selects and outputs either one of the (A) or (−F) as corrected data H through the output terminal 945. Here, the data (B) is the data which selects (−F) when |F|<K, and selects (A) when |F|≧K.

This corrected data H and the target pixel having been delayed by the delay circuit 900 for timing adjustment are added in the full-adder 902 and output as corrected result DN*M.

Figure 70:
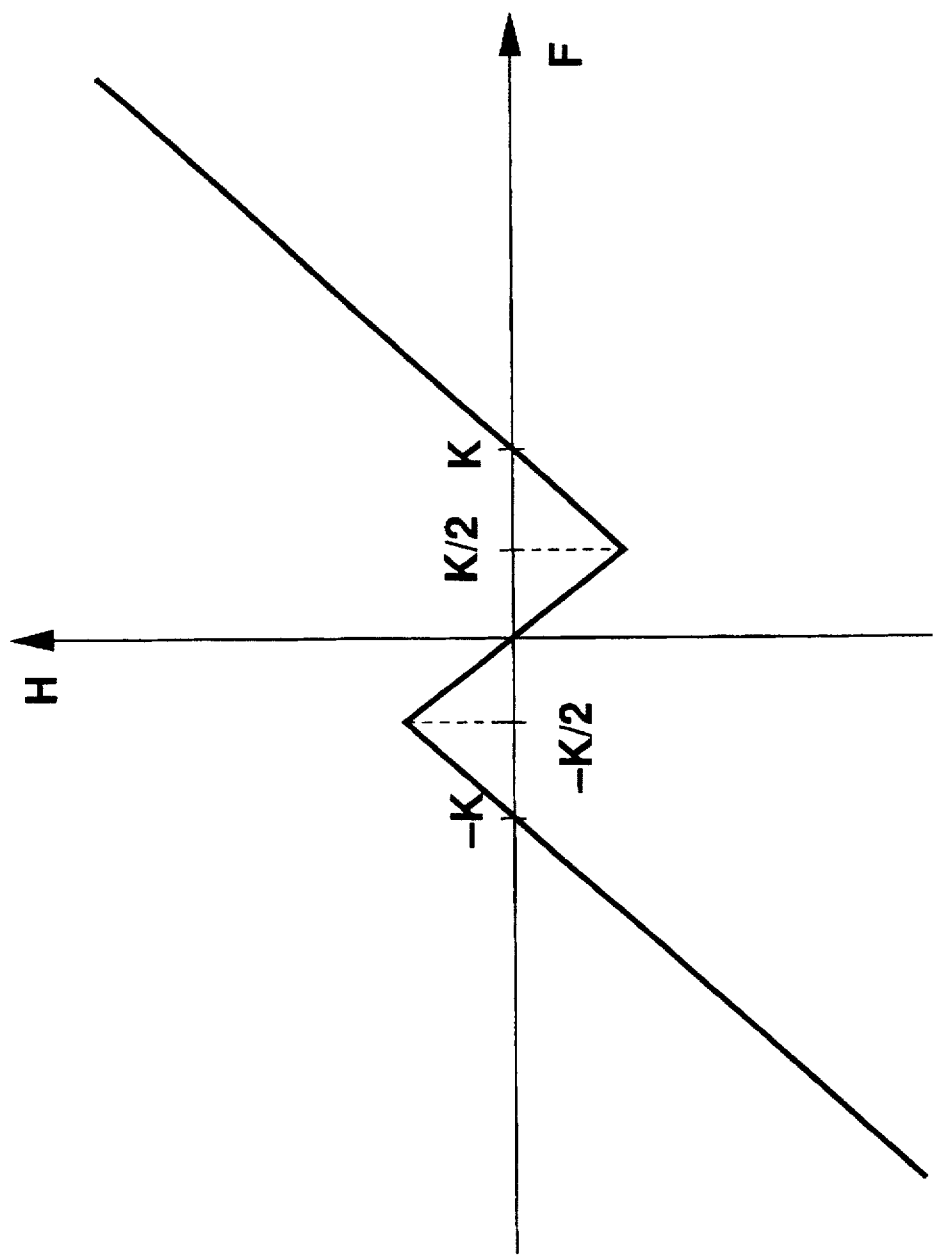
FIG. 70 is a graphic diagram showing a relationship between a high-frequency component F and a judging coefficient K and correcting data according to an embodiment of this invention.
Figure 71:
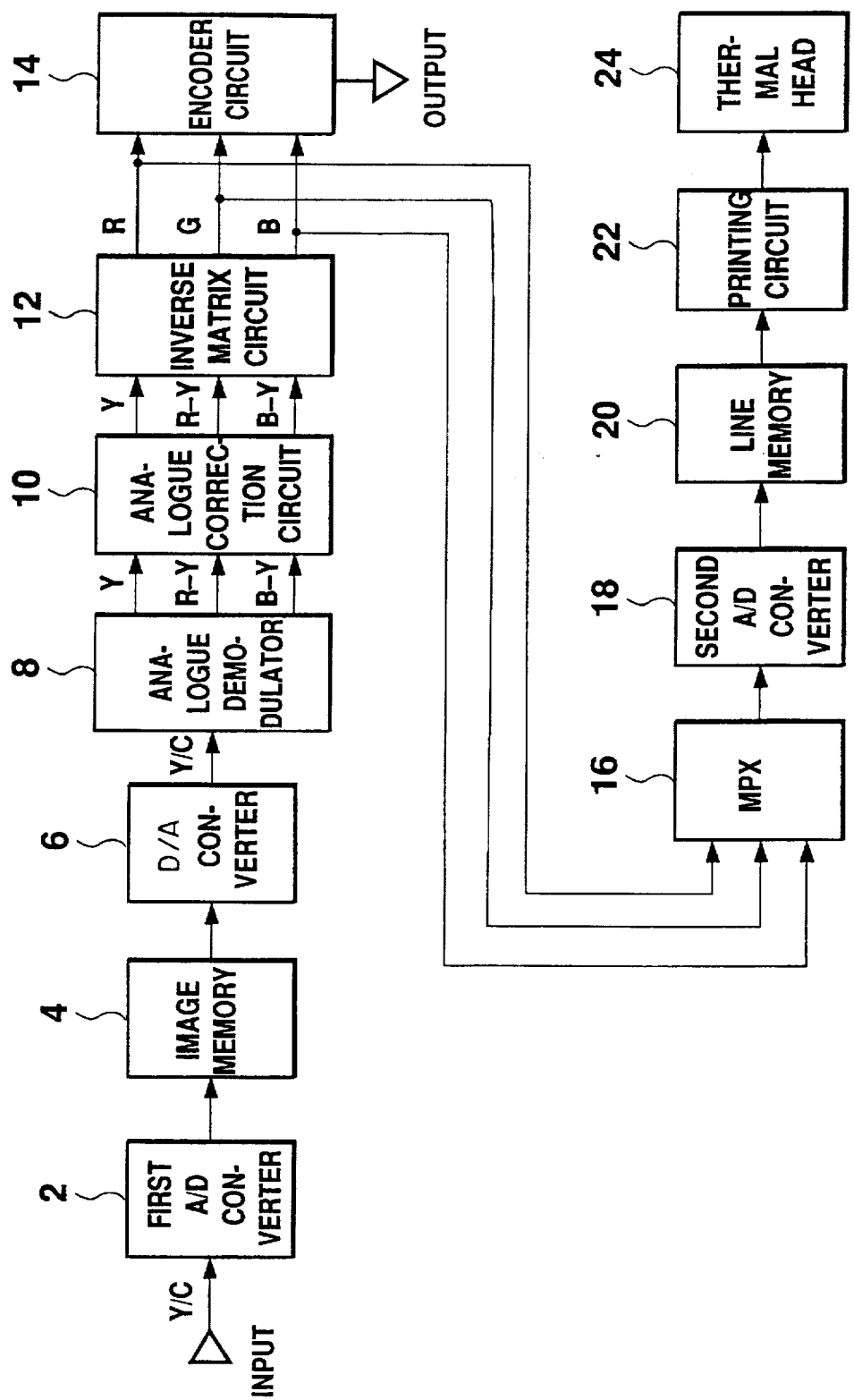
FIG. 71 is a block diagram showing a conventional signal processing apparatus for a video printer.
Figure 72:
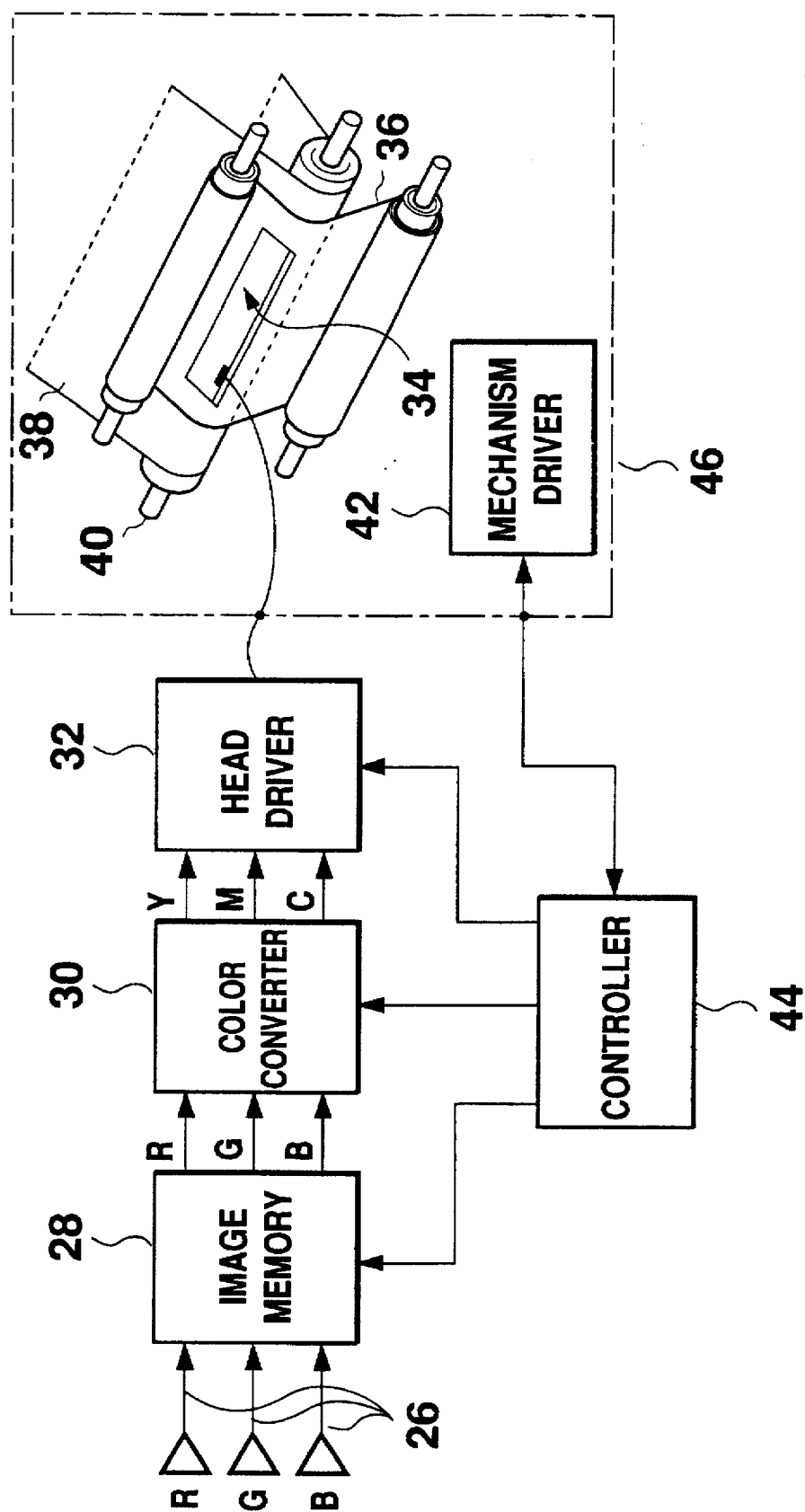
FIG. 72 is a block diagram showing a conventional image recording apparatus.
Figure 73:
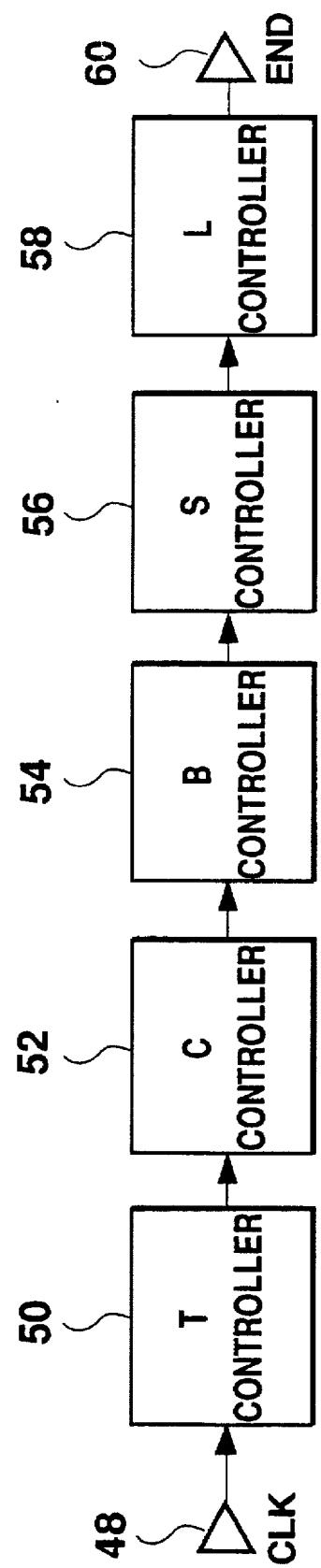
FIG. 73 is a block diagram showing a conventional heat controlling circuit for a thermal head.
Figure 74:
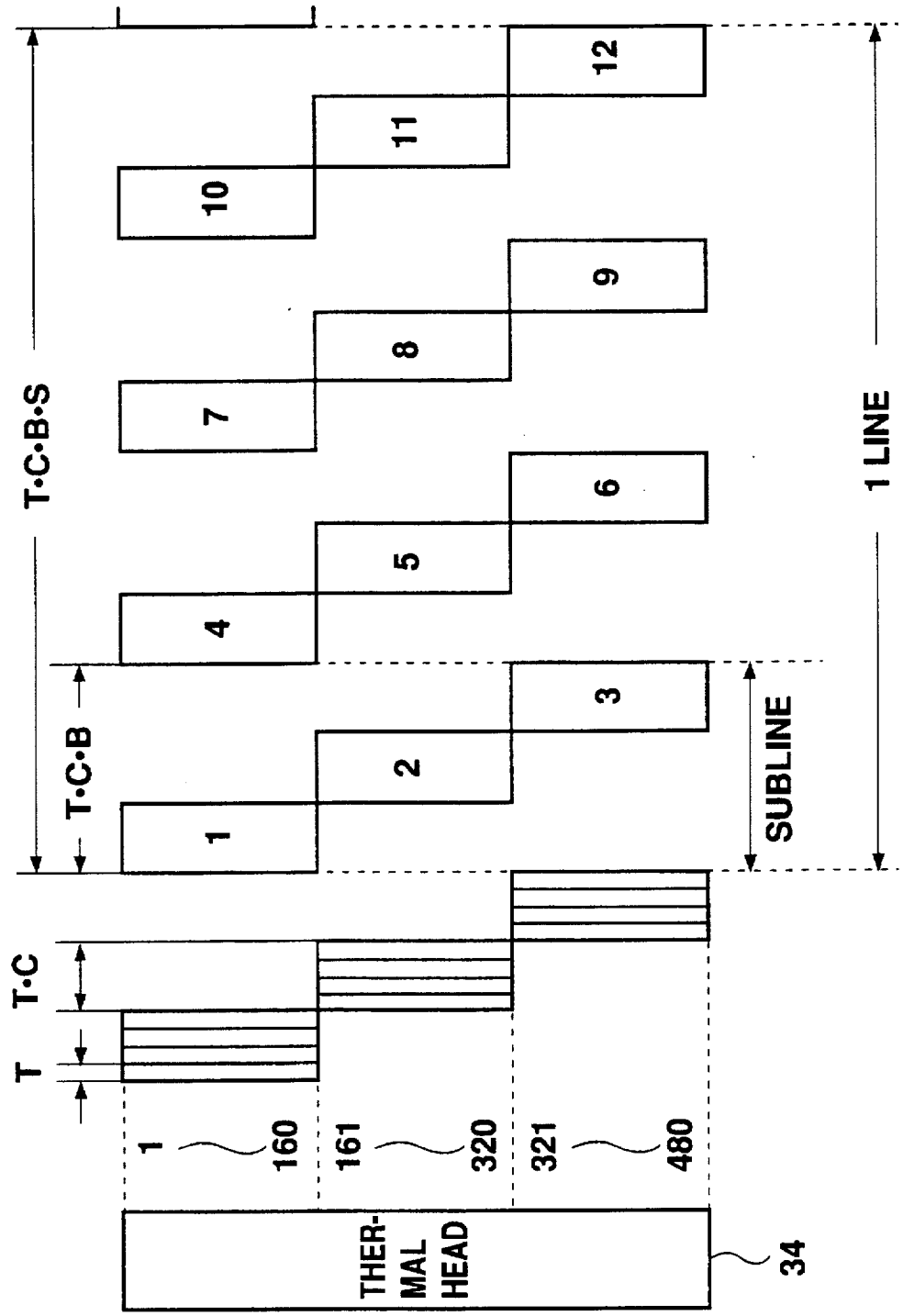
FIG. 74 is a schematic view showing a two-dimensional time progress in a conventional heat controlling circuit.
Figure 75:
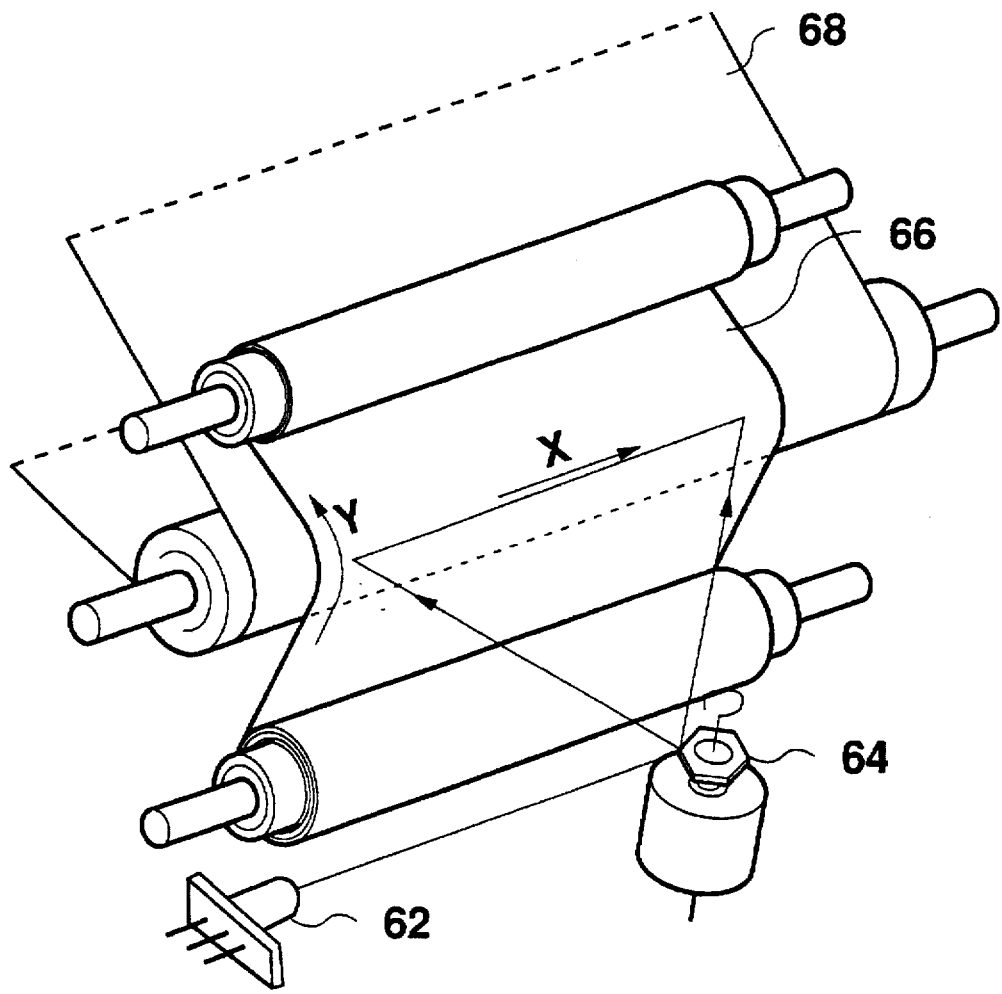
FIG. 75 is a perspective view showing principal parts of a conventional image signal processing apparatus.
Figure 76:
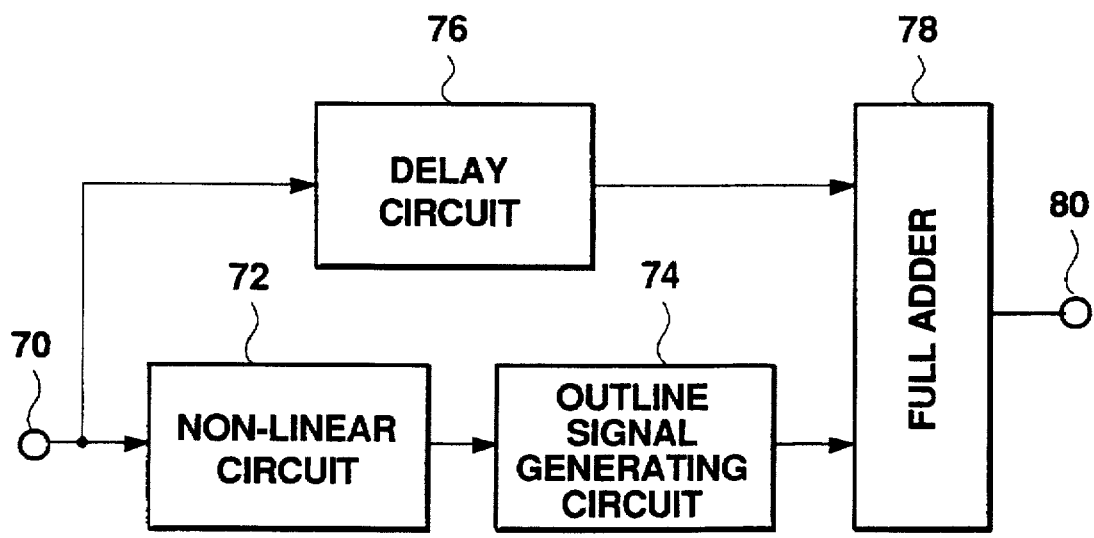
FIG. 76 is a block diagram showing a conventional image signal processing apparatus.
Figure 77:
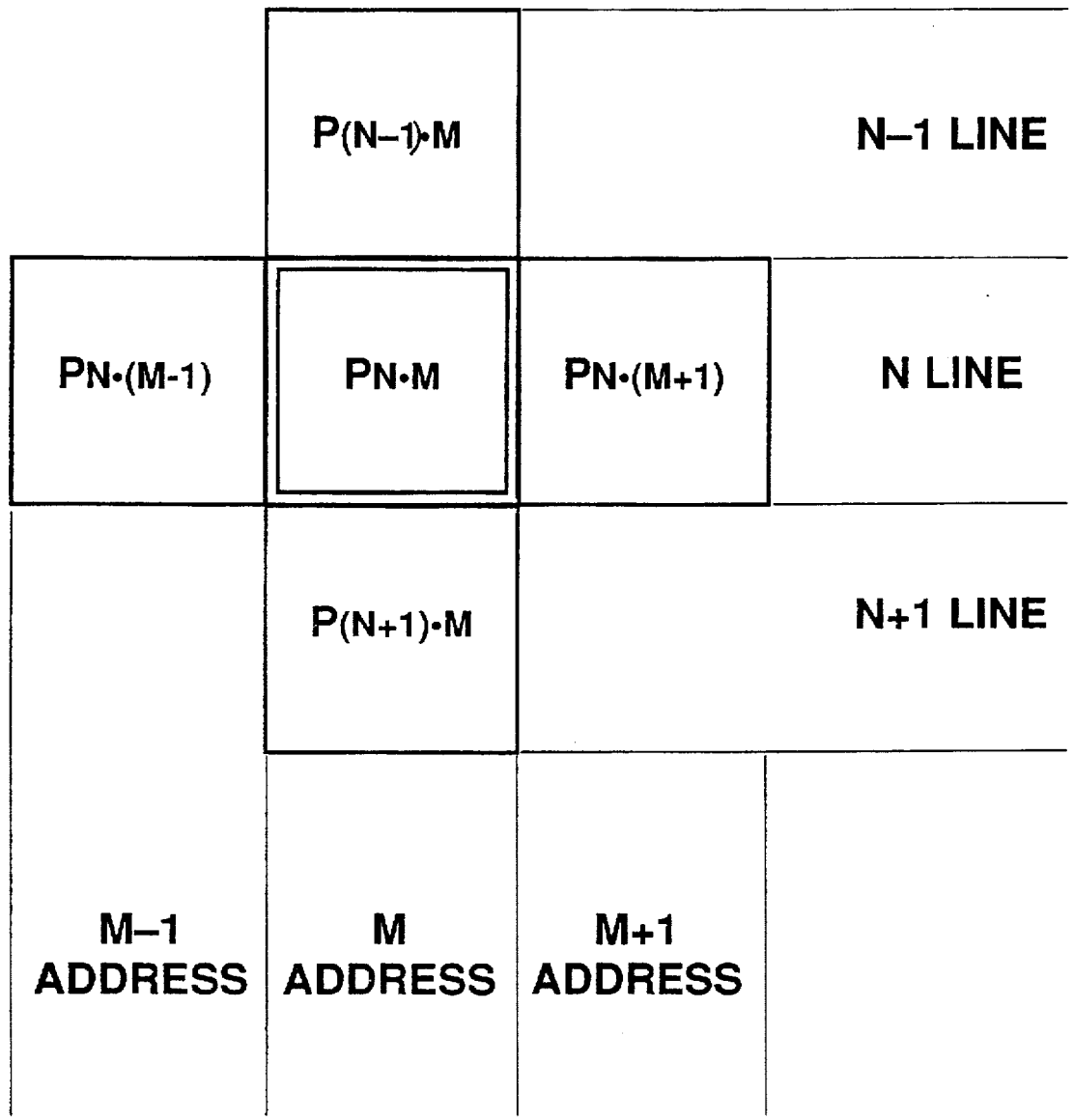
FIG. 77 is a schematic view showing an example of a part of digital image data.

FIG. 70 shows a relationship between the absolute value |F| of the high-frequency component F and the discriminating coefficient K and the corrected data H. In FIG. 70, a smoothed image can be obtained when −K<F<K, and an outline-emphasized image can be obtained when F<−K or K<F. And, when F=−K or F=K, non-corrected image is obtained.

Further, when the discriminating coefficient K is zero, the outline is emphasized to the maximum, and the larger the K, the smoother the image. Namely, more desirable image can be obtained by setting the discriminating coefficient K to smaller value for a low-noise image, and the same to larger value for a high-noise image.

In the aforementioned embodiment, the discriminating coefficient generator 896 receives key input. Alternatively, it is also possible to regulate the voltage by using a variable resistor, and to quantize the output voltage by an A/D converter so as to generate the discriminating coefficient K. Namely, any man-machine interface means can be used.

Further, for the differential filter 894 for extracting the high-frequency component, those having any composition and coefficient can be adopted.

As mentioned above, according to this invention, using of coherent laser light enhances the light convergence to provide image recording with stable dots.

Further according to this invention, the user can change the contents of the image processing applied on the designated area for special effect.

Furthermore, as image correcting process, the outline emphasis operation and the soothing operation can be simultaneously carried out, thereby enabling the user to control desirably the image in a wide range.

What is claimed is:

1. An image recording apparatus for generating a hardcopy of a desired image from an input signal, comprising:

first means for controlling a heating reference time T;

second means for controlling a number C of consecutive heating reference times;

means for controlling a number B of recording element groups in a thermal head;

third means for controlling a number of recording element sub-lines S; and fourth means for controlling a number of recording lines L; wherein the recording operation for the desired image is performed within a predetermined time period P based on said heating reference time T, said number C, said number B, said number of recording element sub-lines S, and said number of recording lines L, and at least one of said first second and third means is a variable controller which varies a respective one of said heating reference time T, said number C, and said number of recording element sub-lines S based on a type of said input signal.

2. The image recording apparatus of claim 1 wherein said first means is a variable controller variably controlling said heating reference time T based on said type of said input signal such that the recording operation is performed within the predetermined time period P.

3. The image recording apparatus of claim 1 wherein said second means is a variable controller variably controlling said number C based on said type of said input signal such that the recording operation is performed within the predetermined time period P.

4. The image recording apparatus of claim 1 wherein said third means is a variable controller variably controlling said number of recording element sub-lines S based on said type of said input signal such that the recording operation is performed within the predetermined time period P.

5. The image recording apparatus of claim 1 wherein said first means is a first variable controller variably controlling said heating reference time T based on said type of said input signal; and said means is a second variable controller variably controlling said number of recording element sub-lines S based on said type of said input signal such that the recording operation is performed within the predetermined time period P.

6. An image recording apparatus for generating a hardcopy of a desired image from an input signal, comprising:

first means for controlling a heating reference time T;

second means for controlling a number C of consecutive heating reference times;

third means for controlling a number of recording element sub-lines S; and fourth means for controlling a number of recording lines L; wherein the recording operation for said desired image is performed within a predetermined time period P based on said heating reference time T, said number C, said number of recording element sub-lines S, and said number of recording lines L, and at least one of said first second and third means is a variable controller which varies a respective one of said heating reference time T, said number C, and said number of recording element sub-lines S based on a type of signal forming said desired image.

7. The image recording apparatus of claim 6 wherein said first means is a first variable controller variably controlling said heating reference time T based on said type of said input signal; and said second means is a second variable controller variably controlling said number C based on said type of said input signal such that the recording operation is performed within the predetermined time period P.

8. The image recording apparatus of claim 6 wherein said second means is a first variable controller variably controlling said number C based on said type of said input signal; and said third means is a second variable controller variably controlling said number of recording element sub-lines S based on said type of said input signal such that the recording operation is performed within the predetermined time period P.

9. The image recording apparatus of claim 6 wherein said first means is a first variable controller variably controlling said heating reference time T based on said type of said input signal;

said second means is a second variable controller variably controlling said number C based on said type of said input signal; and said third means is a third variable controller variably controlling said number of recording element sub-lines S based on said type of said input signal such that the recording operation is performed within the predetermined time period P.

10. An image recording apparatus for generating a hardcopy of a desired image from an input signal, comprising:

first means for controlling a heating reference time T; and second means for controlling a number of recording lines L; wherein the recording of said desired image is performed within a predetermined time period P based on said heating reference time T and said number of recording lines L, and said first means is a variable controller which varies said heating reference time T based on a type of signal forming said desired image.

* * * * *